United States Patent
Ohmori et al.

(10) Patent No.: US 7,974,926 B2
(45) Date of Patent: Jul. 5, 2011

(54) CONTENT USE SYSTEM, INFORMATION TERMINAL, AND SETTLEMENT SYSTEM

(75) Inventors: Motoji Ohmori, Osaka (JP); Masaya Miyazaki, Osaka (JP); Toshihisa Nakano, Osaka (JP); Yoshikatsu Ito, Osaka (JP); Masaya Yamamoto, Osaka (JP); Osamu Sasaki, Chiba (JP); Shunji Harada, Osaka (JP)

(73) Assignee: Panasonic Corporation, Osaka (JP)

( * ) Notice: Subject to any disclaimer, the term of this patent is extended or adjusted under 35 U.S.C. 154(b) by 1117 days.

(21) Appl. No.: 10/590,915

(22) PCT Filed: Mar. 17, 2005

(86) PCT No.: PCT/JP2005/004799

§ 371 (c)(1), (2), (4) Date: Aug. 29, 2006

(87) PCT Pub. No.: WO2005/091193

PCT Pub. Date: Sep. 29, 2005

(65) Prior Publication Data

US 2007/0192255 A1    Aug. 16, 2007

(30) Foreign Application Priority Data

Mar. 22, 2004    (JP) .................... 2004-083634

(51) Int. Cl.
 H04K 1/00    (2006.01)
 H04L 9/08    (2006.01)
(52) U.S. Cl. .................. 705/52; 705/39; 709/227
(58) Field of Classification Search .............. 705/39, 705/52
See application file for complete search history.

(56) References Cited

U.S. PATENT DOCUMENTS

| | | | |
|---|---|---|---|
| 7,010,809 B2 * | 3/2006 | Hori et al. ............... | 726/26 |
| 7,139,372 B2 * | 11/2006 | Chakravorty et al. ... | 379/114.01 |
| 7,171,477 B2 * | 1/2007 | Hori et al. ............... | 709/227 |
| 7,363,035 B2 * | 4/2008 | Reilly .................... | 455/432.3 |
| 2001/0037452 A1 * | 11/2001 | Go et al. ................. | 713/168 |
| 2003/0083954 A1 | 5/2003 | Namba | |
| 2003/0105835 A1 * | 6/2003 | Hori et al. ............... | 709/219 |
| 2003/0110126 A1 * | 6/2003 | Dunkeld et al. ........ | 705/39 |
| 2004/0010467 A1 * | 1/2004 | Hori et al. ............... | 705/50 |
| 2004/0030601 A1 * | 2/2004 | Pond et al. .............. | 705/16 |
| 2004/0088510 A1 * | 5/2004 | Hori ....................... | 711/165 |

(Continued)

FOREIGN PATENT DOCUMENTS

| | | |
|---|---|---|
| JP | 2001-134684 | 5/2001 |
| JP | 2002-197397 | 7/2002 |
| JP | 2002-207702 | 7/2002 |

(Continued)

OTHER PUBLICATIONS

How computers work, White, 1999.*

*Primary Examiner* — Evens J Augustin

(74) *Attorney, Agent, or Firm* — Wenderoth, Lind & Ponack, L.L.P.

(57) ABSTRACT

Provided is a new system for content use and settlement. A user requests a mobile telephone charge management server (3000) to perform proxy settlement for goods purchased using mobile telephones 1 (4100), 2 (4200) and 3 (4300). The mobile telephone charge management server (3000) makes an inquiry to a registration server (3100) as to whether or not proxy settlement is possible. When proxy settlement is not possible, the mobile telephone performs settlement using electronic money that has been deposited therein.

13 Claims, 34 Drawing Sheets

U.S. PATENT DOCUMENTS

| | | | |
|---|---|---|---|
| 2004/0093374 A1* | 5/2004 | Miyazaki | 709/203 |
| 2004/0153422 A1 | 8/2004 | Sakamura et al. | |
| 2004/0185830 A1* | 9/2004 | Joao et al. | 455/410 |
| 2006/0126422 A1* | 6/2006 | Takagi et al. | 365/232 |
| 2006/0178930 A1* | 8/2006 | Kim | 705/14 |
| 2008/0027842 A1* | 1/2008 | Suginaka | 705/35 |

FOREIGN PATENT DOCUMENTS

| | | |
|---|---|---|
| JP | 2002-298041 | 10/2002 |
| JP | 2003-203133 | 7/2003 |
| JP | 2003-233535 | 8/2003 |
| JP | 2003-337912 | 11/2003 |

\* cited by examiner

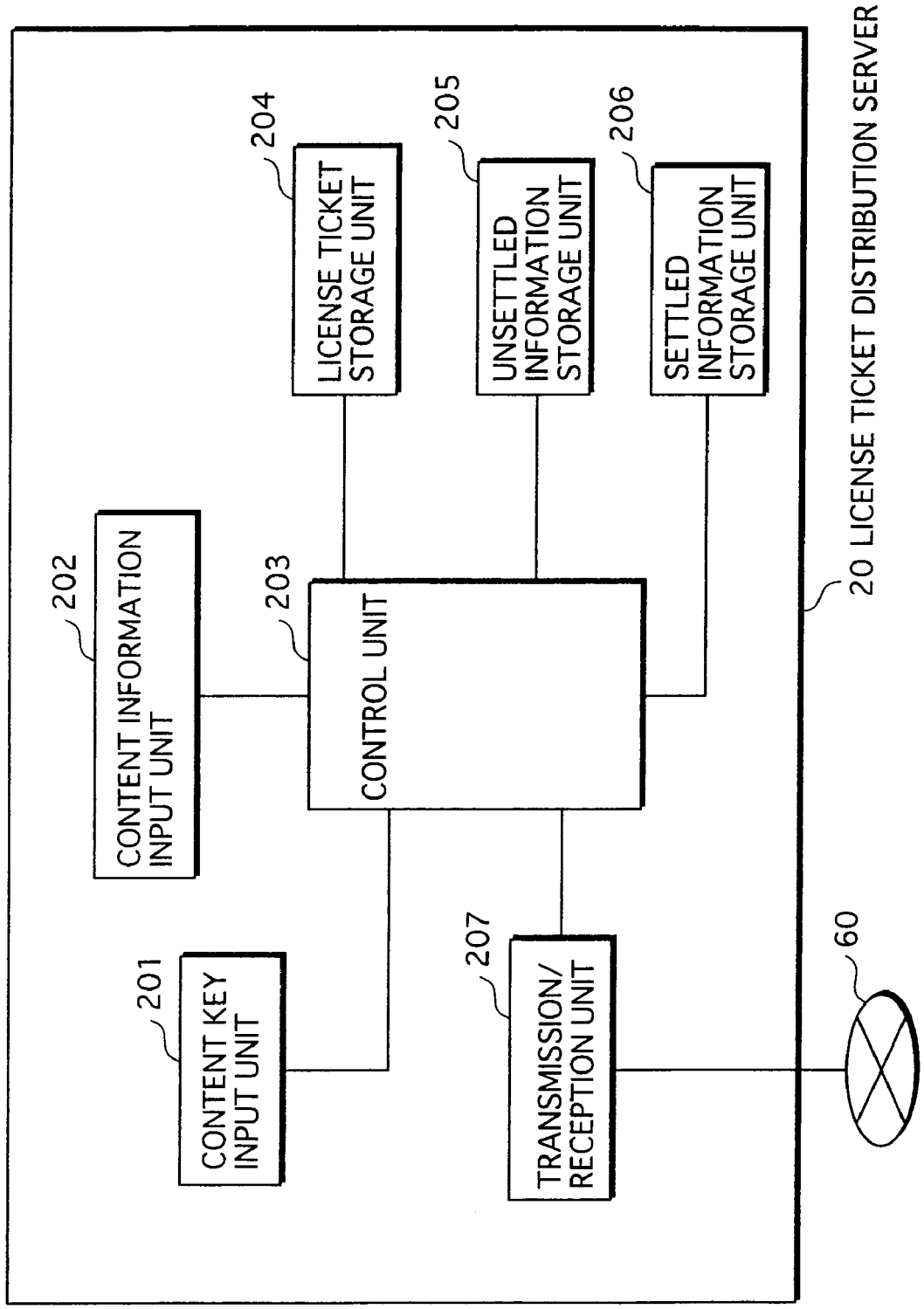

FIG.3A

210 UNSETTLED INFORMATION

| LICENSE TICKET TRANSMISSION DATE | TICKET NUMBER | TRANSMISSION-DESTINATION ADDRESS |
|---|---|---|
| 2004. 2. 11 | NO_1 | matsushita@xx.xxx |

FIG.3B

220 SETTLED INFORMATION

| LICENSE TICKET TRANSMISSION DATE | TICKET NUMBER | TRANSMISSION-DESTINATION ADDRESS | SETTLEMENT COMPLETION DATE |
|---|---|---|---|
| 2004. 2. 11 | NO_1 | matsushita@xx.xxx | 2004. 2. 18 |

FIG.4

230 LICENSE TICKET TABLE

| TICKET NUMBER | CONTENT ID | CONTENT KEY | COPYRIGHT INFORMATION | CHARGE |
|---|---|---|---|---|
| NO_1 | ID_0001 | hc426D99ro7v | 3 TIMES | 1000 YEN |
| NO_2 | ID_0002 | Tao510Fe82n9 | 1 TIME | 400 YEN |
| NO_3 | ID_0003 | Ms895on73de1 | 10 TIMES | 1500 YEN |
| ... | ... | ... | ... | ... |

231 LICENSE TICKET

SERVICE USAGE FOR FEBRUARY

SUBSCRIBED TELEPHONE NUMBER    090-xxxx-xxxx

MOBILE TELEPHONE USAGE CHARGE

| | |
|---|---|
| BASIC CHARGE | 2,000 YEN |
| CALL CHARGE | 2,150 YEN |
| VOICE MAIL SERVICE | 300 YEN |
| PACKET COMMUNICATION CHARGE | 430 YEN |
| | 4,880 YEN |

CONTENT USAGE CHARGE

| | |
|---|---|
| 2004. 2. 11 | 1,000 YEN |
| | 1,000 YEN |

| | |
|---|---|
| FEBRUARY BILLING AMOUNT | 5,880 YEN |

FIG.8

250 LICENSE TICKET DOCKET

| TICKET NUMBER | CONTENT CHARGE | EMAIL ADDRESS | DATE |
|---|---|---|---|
| NO_1 | 1000 YEN | matsushita@xx.xxx | 2004. 2. 11 |

FIG.24

4130 LICENSE TICKET DOCKET

| TICKET NUMBER | CONTENT CHARGE | EMAIL ADDRESS | DATE | SERVER INFORMATION |
|---|---|---|---|---|
| NO_1 | 1000 YEN | matsushita@xx.xxx | 2005.3.22 | ID_2000 |

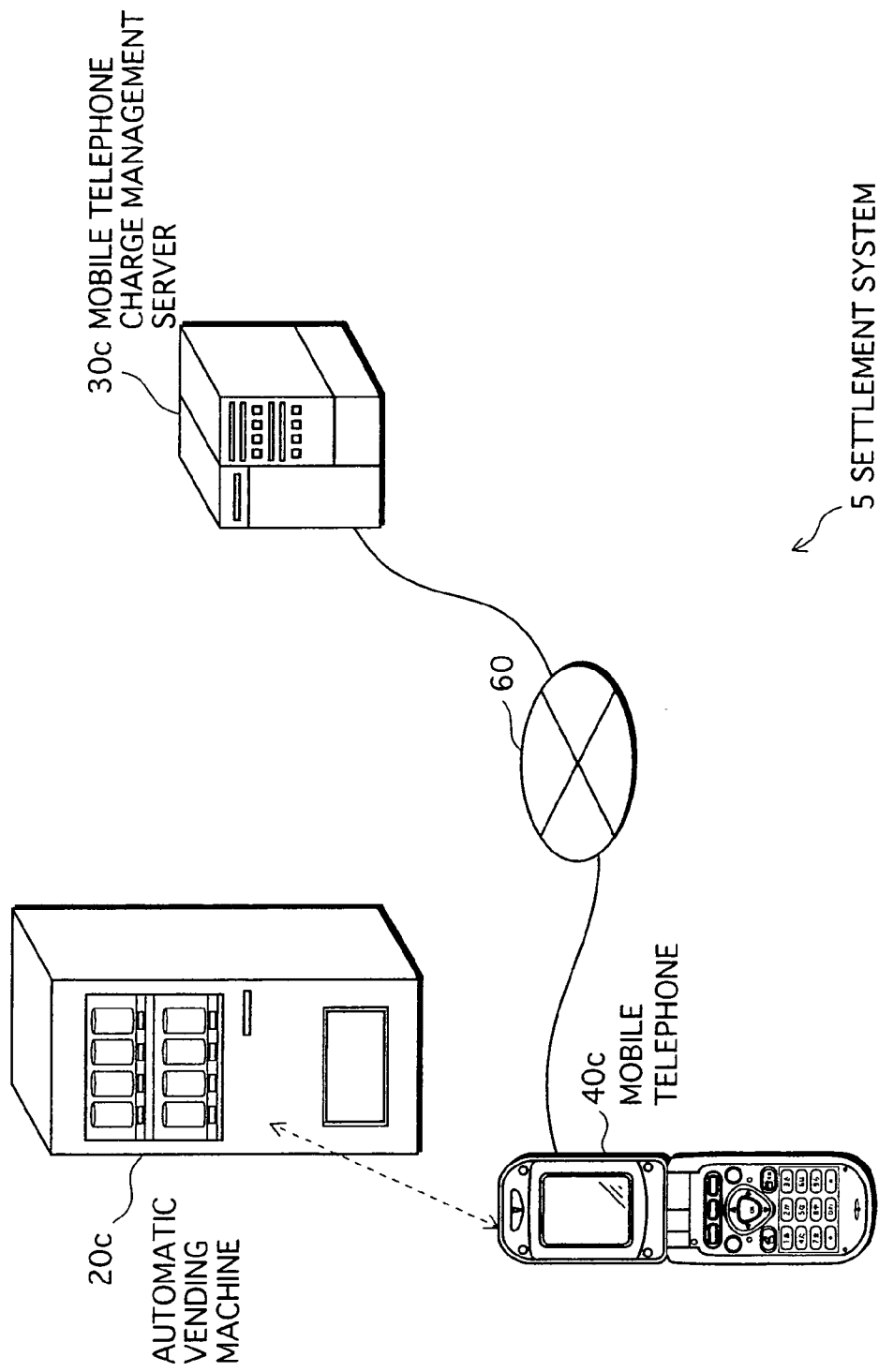

CONTENT USE SYSTEM, INFORMATION TERMINAL, AND SETTLEMENT SYSTEM

TECHNICAL FIELD

The present invention relates to a system for purchasing goods, and in particular to a technique for purchasing goods with use of a mobile information terminal.

BACKGROUND ART

With the spread of broadband, digital content distribution services are expected to become increasingly prevalent. Currently, settlement for content provided to a user is mainly made by credit card. Since the user is required to notify the content distributor of his/her credit card number when joining the distributor's service, many users are anxious (about security.

Patent Document 1 discloses a settlement method for purchasing goods with a mobile information terminal. With this method, at the time of purchasing goods, the mobile information terminal transmits a user ID and the like to a service provision apparatus that provides the goods, and the service provision apparatus transmits a goods settlement request that includes the user ID to a communications enterprise's apparatus. Proxy settlement for the goods is performed between the communications enterprise and the service provider, and settlement for the goods is performed subsequently between the communications enterprise and the user.

Patent Document 1: Japanese Laid Open Application No. 2001-134684

Patent Document 2: Japanese Laid Open Application No. 2002-298041

Problem the Invention Aims to Solve

While methods such as the aforementioned are presently being implemented or suggested, the way in which settlement for content is made is an important issue when it comes to content distribution services being embraced by users and popularized.

In view of this issue, the present invention has an object of providing a varied content usage system that provides the user with a variety of settlement methods.

Means to Solve the Problem

In order to achieve the stated object, the present invention is a content usage system, including: a server apparatus operable to transmit usage information to an information terminal, the usage information relating to usage of content; the information terminal that includes: a purchasing unit operable to purchase the usage information from the server apparatus; and an output unit operable to output the purchased usage information to a usage apparatus that is to use the content, and the usage apparatus that includes: a content obtaining unit operable to obtain the content; a reception unit operable to receive the usage information from the information terminal; and a usage unit operable to use the content in accordance with the usage information.

Furthermore, in order to achieve the stated object, the present invention is an information terminal that transfers usage information relating to usage of content, including: a purchasing unit operable to purchase the usage information from an external server apparatus; and an output unit operable to output the purchased usage information to a usage apparatus that is to use the content.

Here, the purchasing unit may include: a usage information reception sub-unit operable to receive the usage information from the server apparatus; and a proxy settlement request sub-unit operable to transmit settlement request information to a settlement apparatus of a communications enterprise that provides service to the information terminal, the settlement request information showing a request for proxy settlement for the usage information.

Here, the output unit may include: a permitted-apparatus storage sub-unit operable to store identification information showing an apparatus to which transmission of the usage information is permitted; an identification information reception sub-unit operable to receive, from the usage apparatus, usage apparatus identification information that identifies the usage apparatus; a judgment sub-unit operable to judge whether or not the received usage apparatus identification information is stored in the permitted-apparatus storage sub-unit; and an output sub-unit operable to output the usage information to the usage apparatus when a result of the judgment by the judgment sub-unit is affirmative.

Effects of the Invention

The present invention is a content usage system, including: a server apparatus operable to transmit usage information to an information terminal, the usage information relating to usage of content; the information terminal that includes: a purchasing unit operable to purchase the usage information from the server apparatus; and an output unit operable to output the purchased usage information to a usage apparatus that is to use the content, and the usage apparatus that includes: a content obtaining unit operable to obtain the content; a reception unit operable to receive the usage information from the information terminal; and a usage unit operable to use the content in accordance with the usage information.

According to this structure, a new content usage system in which the content and the usage information have different distribution paths is provided. Furthermore, due to the different distribution paths for the content and the usage information, even if the data of either the content or the usage rights is intercepted during distribution, a situation in which the content is used illegally can be prevented.

Furthermore, the present invention is an information terminal that transfers usage information relating to usage of content, including: a purchasing unit operable to purchase the usage information from an external server apparatus; and an output unit operable to output the purchased usage information to a usage apparatus that is to use the content.

According to this structure, the mobile information terminal can transfer the obtained usage information to an external apparatus. The only information that the mobile information terminal transfers is the usage information; it does not transfer the content itself. Therefore, even if the usage information is intercepted, a situation in which the content is used illegally can be prevented.

Here, the purchasing unit may include: a usage information reception sub-unit operable to receive the usage information from the server apparatus; and a proxy settlement request sub-unit operable to transmit settlement request information to a settlement apparatus of a communications enterprise that provides service to the information terminal, the settlement request information showing a request for proxy settlement for the usage information.

Furthermore, the purchasing unit may further include: a not-possible notification reception sub-unit operable to receive proxy settlement not-possible information from the settlement apparatus when the settlement apparatus judges that proxy settlement is not possible.

According these structures, a new settlement method is provided with which a request is made to the settlement apparatus for proxy settlement with respect to usage information that a user purchased using the mobile terminal.

Here, the information terminal may further include: a storage unit that is tamper-resistant, which is a state of being unable to be read or tampered with from outside, and is operable to store electronic money information therein, wherein the purchasing unit further includes: an electronic money settlement sub-unit operable to, when the not-possible notification reception unit receives not-possible information, perform settlement for the usage information with use of the electronic money information stored in the storage unit, in place of the processing by the proxy settlement request sub-unit.

According to this structure, the user is able to perform settlement using the electronic money information stored in the mobile information terminal even if proxy settlement is not possible. Therefore, compared to settlement such as that performed using a credit card, leaking of personal information can be prevented, and settlement can be performed simply. This heightens convenience for the user.

Here, the information terminal may further include: a storage unit that is tamper-resistant, which is a state of being unable to be read or tampered with from outside, and is operable to store electronic money information therein, wherein the purchasing unit performs settlement for the usage information with use of the electronic money information stored in the storage unit.

According to this structure, the user is able to perform settlement using the electronic money information stored in the mobile information terminal. Therefore, compared to settlement such as that performed using a credit card, leaking of personal information can be prevented, and settlement can be performed simply. This heightens convenience for the user.

Here, the output unit may include: a permitted-apparatus storage sub-unit operable to store identification information that identifies an apparatus to which transmission of the usage information is permitted; an identification information reception sub-unit operable to receive, from the usage apparatus, usage apparatus identification information that identifies the usage apparatus; a judgment sub-unit operable to judge whether or not the received usage apparatus identification information is stored in the permitted-apparatus storage sub-unit; and an output sub-unit operable to output the usage information to the usage apparatus when a result of the judgment by the judgment sub-unit is affirmative.

According to this structure, usage information can be transferred to an appropriate usage apparatus to which transmission of usage information has been judged to be permitted.

Here, the output unit may further include: a permission reception sub-unit operable to receive, from the usage apparatus, a signal showing that transmission of the usage information is permitted, and the output may sub-unit output the usage information to the usage apparatus when the result of the judgment by the judgment sub-unit is affirmative and the permission reception sub-unit has received the signal.

According to this structure, even if the mobile information terminal permits transmission of usage information, transfer of the usage information can be suppressed if transmission of usage information from the usage apparatus side is refused. This prevents usage information transfer that is seen to be inappropriate from the point of view of the usage apparatus side.

Here, the purchasing unit may further include: a usage information reception sub-unit operable to receive the usage information from the server apparatus; and a proxy settlement request sub-unit operable to transmit settlement request information to a settlement apparatus of a communications enterprise that provides service to the information terminal, the settlement request information showing a request for proxy settlement for the usage information.

According to this structure, a new settlement method is provided with which a request is made to the settlement apparatus for proxy settlement with respect to usage information that a user purchased using the mobile terminal.

Here, the information terminal may further include: a storage unit that is tamper-resistant, which is a state of being unable to be read or tampered with from outside, and is operable to store electronic money information therein, wherein the purchasing unit further includes: a not-possible notification reception sub-unit operable to receive proxy settlement not-possible information from the settlement apparatus when the settlement apparatus judges that proxy settlement is not possible; and an electronic money settlement sub-unit operable to, when the not-possible notification reception sub-unit receives not-possible information, perform settlement of the usage information with use of the electronic money information stored in the storage unit, in place of the processing by the proxy settlement storage unit.

According to this structure, the user is able to perform settlement using the electronic money information stored in the mobile information terminal even if proxy settlement is not possible. Therefore, compared to settlement such as that performed using a credit card, leaking of personal information can be prevented, and settlement can be performed simply. This heightens convenience for the user.

Here, the usage information may include identification information of an apparatus to which transmission of the usage information is permitted, and the output unit may further include: an identification information reception sub-unit operable to receive, from the usage apparatus, usage apparatus identification information that identifies the usage apparatus; a judgment sub-unit operable to judge whether or not the received usage apparatus identification information matches the identification information included in the usage information; and an output sub-unit operable to output the usage information to the usage apparatus when a result of the judgment by the judgment sub-unit is affirmative.

According to this structure, an apparatus that to which transmission of the usage information is not permitted can be prevented from illegitimately obtaining the usage information via a legitimate apparatus to which transmission of the usage information is permitted.

BRIEF DESCRIPTION OF THE DRAWINGS

FIG. 2 is a block diagram showing the structure of a license ticket distribution server 20;

FIG. 3A shows the data structure of unsettled information 210, and FIG. 3B shows the data structure of settled information 220;

FIG. 4 shows the data structure of a license ticket table 230;

FIG. 6 shows an example of a bill 240 sent to a user;

FIG. 8 shows the data structure of a license ticket docket 250;

FIG. 11 is a block diagram showing the structure of a license ticket distribution server 20a;

FIG. 12 is a block diagram showing the structure of a mobile telephone 40a;

FIG. 24 shows the data structure of a license ticket docket 4130;

FIG. 34 is a system structural diagram showing the structure of a settlement system 5 that is a modification example of the embodiments.

DESCRIPTIONS OF NUMERICAL REFERENCES

Figure 1:
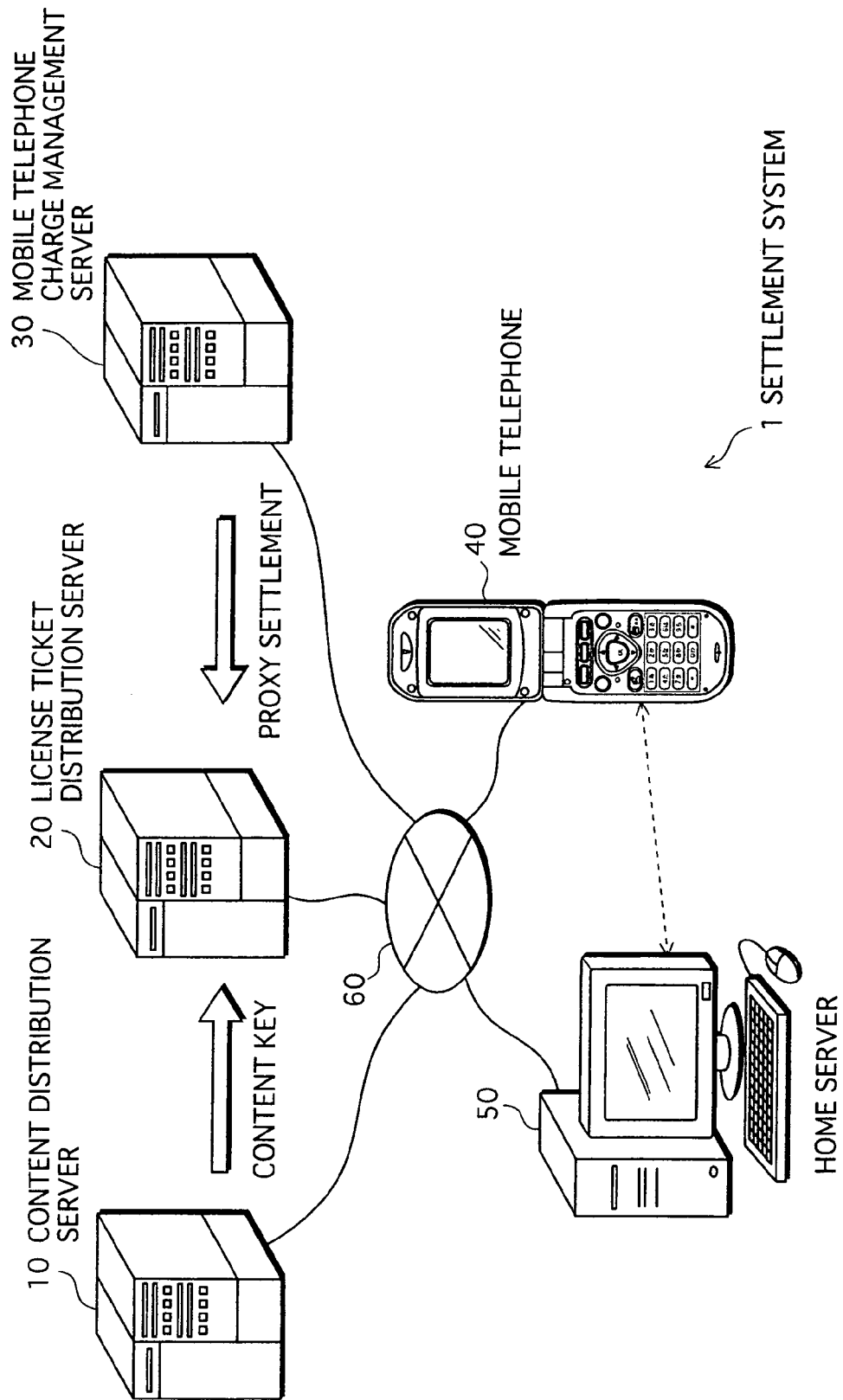
FIG. 1 is a system structural diagram showing the structure of a settlement system 1.

1 Settlement system
2 Settlement system
3 Settlement system
4 Settlement system
5 Settlement system
10 Content distribution server
10a Content distribution server
10b Content distribution server
20 License ticket distribution server
20a License ticket distribution server
20b License ticket distribution server
20c Vending machine
30 Mobile telephone charge management server
30a Electronic money deposit apparatus
30b Electronic money deposit apparatus
30c Mobile telephone charge management server
40 Mobile telephone
40a Mobile telephone
40b Mobile telephone
40c Mobile telephone
50 Home server
50a Home server
50b Home server
60 Network
70b Memory card
1000 Content distribution server
2000 License ticket distribution server
3000 Mobile telephone charge management server
3100 Registration server
4000 Gateway server
4100 Mobile telephone 1
4200 Mobile telephone 2
4300 Mobile telephone 3
5000 Router
5100 Home server 1
5200 Home server 2
5300 Home server 3
6000 Network
7000 Electronic money deposit apparatus

BEST MODE FOR CARRYING OUT THE INVENTION

First Embodiment

The following describes a settlement system 1 as a first embodiment of the present invention with reference to the drawings.

FIG. 1 is a system structural diagram showing the structure of the settlement system 1. As shown in FIG. 1, the settlement system 1 is composed of a content distribution server 10, a license ticket distribution server 20, a mobile telephone charge management server 30, a mobile telephone 40, and a home server 50.

The content server 10, the license ticket distribution server 20, the mobile telephone change management server 30 and the home server 50 are each connected to a network 60, and the mobile telephone 40 is able to connect to the network 60 via a gateway server (not illustrated). The gateway server converts information transmitted by the mobile telephone 40 to the protocol of the network 60, and transmits the information via the network 60 to the apparatus that is the reception-destination thereof. Here, a specific example of the network 60 is the Internet.

<Structure>

The following describes the structure of each apparatus in the settlement system 1.

1. Content Distribution Server 10

The content distribution server 10 is possessed by a content distributor who provides digital content to users at a charge. The digital content is content such as movies that has been encoded in accordance with the MPEG-2 standard. Hereinafter this digital content is simply referred to as "content". The content distribution server 10 is, specifically, a computer system composed of a microprocessor, a ROM, a RAM, a hard disk unit, a network connection unit, and so on. Note that the structure of the content distribution server 10 is not illustrated.

The content distribution server 10 stores a plurality of encrypted contents in correspondence with content IDs. Each encrypted content has been generated by encrypting content with a contest key. Each content key is key information that is unique to the corresponding content. Furthermore, the content IDs correspond one-to-one to the contents, each content ID being information for uniquely identifying the corresponding content.

The content distribution server 10 notifies the content keys used to generate the encrypted contents to the license ticket distribution server 20 in correspondence with the content IDs. Any method that is secure and reliable may be used for notifying the content keys.

The content distribution server 10 receives a content request via the network 60 from the home server 50, which is possessed by a user. The content request includes a content ID. The content distribution server 10 reads the encrypted content identified by the content ID included in the received content request, and transmits the read encrypted content via the network 60 to the home server 50. More specifically, the content distribution server 10 receives a content request that includes "ID_0001" from the home server 50, reads the encrypted content identified by "ID_0001", and transmits the read encrypted content to the home server 50.

2. License Ticket Distribution Server 20

The license ticket distribution server 20 generates and distributes license tickets. Here, as one example, the content distribution server 10 and the license ticket distribution server 20 are possessed by the same enterprise. A license ticket is information that includes a content key necessary to decrypt encrypted content that the user's home server 50 obtained from the content distribution server 10.

FIG. 2 is a function block diagram showing the structure of the license ticket distribution server 20 functionally. As shown in FIG. 2, the license ticket distribution server 20 is composed of a content key input unit 201, a content information input unit 202, a control unit 203, a license ticket storage unit 204, an unsettled information storage unit 205, a settled information storage unit 206, and a transmission/reception unit 207. The license ticket distribution server 20 is, specifically, a computer system composed of a microprocessor, a ROM, a RAM and so on.

(1) Content Key Input Unit 201

The content key input unit 201 securely and reliably receives input of a content ID and a content key from the content distribution server 10. Here, the content key input unit 201 is, specifically, a drive that reads content IDs and content keys from a medium such as a CD-ROM or a flexible disk. Note that the content key input unit 201 is not limited to being a drive that reads information from a medium, and may instead be a keyboard, a mouse, or the like by which content IDs and content keys are input by hand. Alternatively, the content key input unit 201 may be a network connection unit that receives content IDs or content keys from the content distribution server 10 via a secure communication path on a network.

The content key input unit 201 receives the medium on which the content IDs and the content keys are stored, and reads the content keys and the content IDs from the medium. The content key input unit 201 outputs the read content IDs and the read content keys to the control unit 203. Note that the content ID "ID_0001" and the corresponding content key "hc426D99*ro*7*v*" are included on the media.

(2) Content Information Input Unit 202

The content information input unit 202 is a keyboard, a mouse, or the like, and receives input of content information according to operations of the keyboard, the mouse or the like. Here, the content information is made up of copyright information and a charge. The copyright information shows how may times content may be played, and the charge shows an amount required from the user as a price for receiving provision of a license ticket. The charge is also referred to as "content charge" hereinafter. Note that the copyright information is not limited to showing how many times the content may be played, but may instead be copy control information such as whether the content is permitted to be copied, or the number of times that the content may be copied. Alternatively, the copyright information may be information showing a time period for which the content may be played.

The content information input unit 202 receives input of content information in correspondence with a content ID, and outputs the content ID and the content information to the control unit 203. Specifically, the content information input unit 202 is receives content information "copyright information: 3 times" and "charge: 1000 yen" in correspondence with the content ID "ID_0001", and outputs "ID_0001, 3 times, 1000 yen" to the control unit 203.

(3) Control Unit 203

The control unit 203 is made up of a microprocessor and a control program, and performs the following processing by the microprocessor executing the program.

(a) The control unit 203 receives content IDs and content keys from the content key input unit 201, and receives content IDs and content information from the content information input unit 202. The control unit 203 puts each pair of a content key and content information whose content IDs match in correspondence, and attaches a ticket number thereto to generate a license ticket. The control unit 203 outputs each generated license ticket to the license ticket storage unit 204.

An example of the license ticket generated by the control unit 203 is a license ticket 231 shown in FIG. 4. The license ticket 231 is composed of a ticket number "NO_1", a content ID "ID_0001", a content key "hc426D99*ro*7*v*", copyright information "3 times" and a charge "1000 yen".

Note that whereas the content ID is information for uniquely identifying the content, the ticket number is information for uniquely identifying the license ticket. Even, for example, in the case of identical contents that are identified by identical content IDs, different license tickets are generated and the license tickets are given different ticket numbers if the copyright information and charges differ.

(b) The control unit 203 receives a ticket request, which includes a ticket number, via the network 60 and the transmission/reception unit 207 from the mobile telephone 40 possessed by the user. The control unit 203 reads the ticket number from the ticket request, and reads the license ticket identified by the read ticket number from the license ticket storage unit 204. The control unit 203 transmits the read license ticket via the transmission/reception unit 207 and the network 60 to the mobile telephone 40.

Specifically, on receiving the ticket request that includes the ticket number "NO_1" from the mobile telephone 40, the control unit 203 reads the license ticket 231 that includes the ticket number "NO_1" from the license ticket storage unit 204, and transmits the read license ticket 231 to the mobile telephone 40.

(c) Having transmitted the license ticket to the mobile telephone 40, the control unit 203 generates unsettled information, and outputs the generated unsettled information to the unsettled information storage unit 205.

Specifically, on transmitting the license ticket 231 to the mobile telephone 40, the control unit 203 generates unsettled information 210 shown in FIG. 3A. The unsettled information 210 is composed of a license ticket transmission date "2004/2/11", a ticket number "NO_1", and a transmission-destination address "matsushita@xx.xxx". This expresses that a license ticket corresponding to a ticket number NO_1 was transmitted on Feb. 11, 2004 from the license ticket distribution server 20 to the email address matsushita@xx.xxx, and that settlement is not complete.

(d) On settlement of charges being performed by the mobile telephone charge management server 30, the control unit 203 receives settlement completion notification via the network 60 and the transmission/reception unit 207. The settlement completion notification includes a license ticket transmission date that is the date on which settlement for the license ticket was completed, a ticket number and a transmission-destination address. In the present embodiment, settlement of the content charge is performed via a bank, and the control unit 203 receives the settlement completion notification from a bank terminal. Note that the bank terminal is not illustrated in the system structural diagram of FIG. 1.

On receiving the settlement completion notification, the control unit 203 reads, from the unsettled information storage unit 205, unsettled information that includes an identical license ticket transmission date, ticket number and transmission-destination address to the license ticket transmission date, ticket number and transmission-destination address included in the settlement completion notification. The control unit 203 attaches the settlement completion date to the read unsettled information to generate settled information, and outputs the generated settled information to the settled information storage unit 206. The settlement completion date may be information included in the settlement completion notification or may be information generated from a date and time managed by the control unit 203. On outputting the generated settled information to the settled information storage unit 206, the control unit 203 destroys the corresponding unsettled information in the unsettled information storage unit 205.

Specifically, on receiving settlement completion notification that includes a license ticket date "2004/2/11", a ticket number "NO_1" and a transmission-destination address "matsushita@xx.xxx" from the bank terminal, the control unit 203 reads unsettled information 210 that includes this received information from the unsettled information storage unit 205. The control unit 203 attaches a settlement completion date "2004/2/18" to the unsettled information 210 to generate settled information 220 shown in FIG. 3B, and outputs the generated settled information 220 to the settled information storage unit 206. The control unit 203 destroys the unsettled information 210 in the unsettled information storage unit 205.

(4) License Ticket Storage Unit 204

The license ticket storage unit 204 stores a license ticket table 230 in a storage area that cannot be accessed from outside. FIG. 4 shows the data structure of the license ticket table 230. The license ticket table 230 has a plurality of license tickets output by the control unit 203. As described earlier, each license ticket is composed of a ticket number, a content ID, a content key, copyright information, and a charge. Each time a license ticket is output by the control unit 203, the license ticket storage unit 204 adds the output license ticket to the license ticket table 230.

The license ticket storage unit 204 is referable from the control unit 203, and the stored license tickets are read by the control unit 203.

(5) Unsettled Information Storage Unit 205

The unsettled information storage unit 205 is a storage area that cannot be accessed from outside. When unsettled information 210 is output by the control unit 203, the unsettled information storage unit 205 stores the unsettled information 210 internally. The unsettled information 210 shows that settlement for the license ticket shown by the information is not complete. When settlement is complete, the information is read by the control unit 203 and then destroyed.

(6) Settled Information Storage Unit 206

The settled information storage unit 206 is a storage area that cannot be accessed from outside. When the settled information 220 is output by the control unit 203, the settled information storage unit 206 stores the settled information 220 internally.

(7) Transmission/Reception Unit 207

The transmission/reception unit 207 is connected to the network 60, and performs transmission and reception of information with the mobile telephone 40 via the gateway server (not illustrated). Specifically, the transmission/reception unit 207 receives a ticket request from the mobile telephone 40, and outputs the received ticket request to the control unit 203. Furthermore, the transmission/reception unit 207 receives a license ticket corresponding to the ticket request, from the control unit 203, and transmits the received license ticket to the mobile telephone 40.

Furthermore, the transmission/reception unit 207 receives settlement completion notification from the bank terminal (not illustrated) via the network 60, and outputs the received settlement completion notification to the control unit 203.

3. Mobile Telephone Charge Management Server 30

The mobile telephone charge management server 30 is possessed by a communications enterprise to which the user of the mobile telephone 40 subscribes and that provides service to the mobile telephone 40. The mobile telephone charge management server 30 pays content charges for to a license ticket provided to the mobile telephone 40 by the license ticket distribution server 20, to the content distributor on behalf of the user, and then bills the user once a month for the content charges that it has settled on behalf of the user together with service charges for telephone calls and the like.

Figure 5:
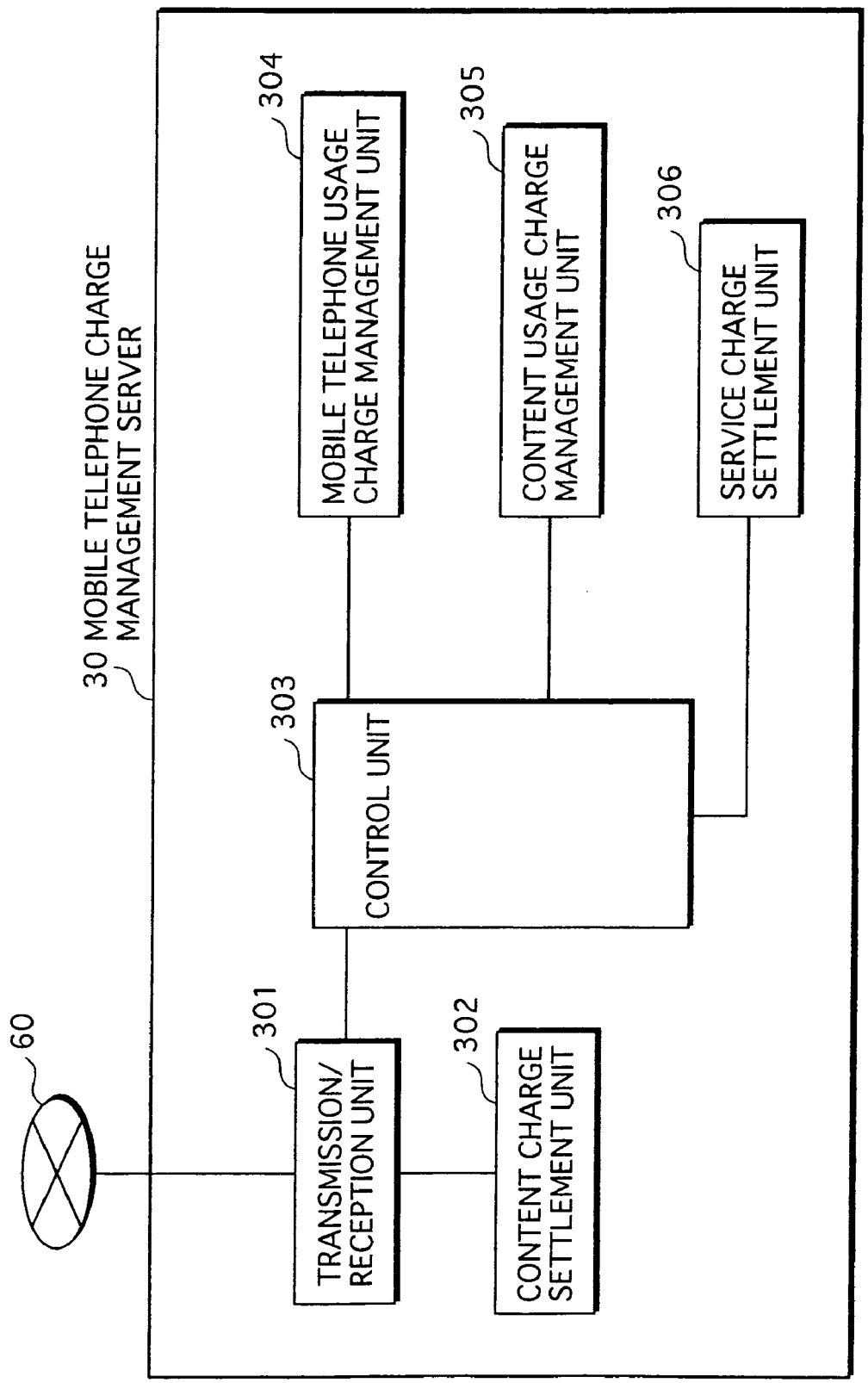
FIG. 5 is a block diagram showing the structure of a mobile telephone charge management server 30.

FIG. 5 is a functional block diagram showing the structure of the mobile telephone charge management server 30 functionally. As shown in FIG. 5, the mobile telephone charge management server 30 is composed of a transmission/reception unit 301, content charge settlement unit 302, a control unit 303, a mobile telephone usage charge management unit 304, a content usage charge management unit 305, and a service charge settlement unit 306. The mobile telephone charge management server 30 is, specifically, a computer system composed of a microprocessor, a ROM, a RAM, and so on.

(1) Transmission/Reception Unit 301

The transmission/reception unit 301 is connected to the network 60, and receives a license ticket docket from the mobile telephone 40 via the gateway server (not illustrated). The license ticket docket is information showing that the mobile telephone 40 has received the license ticket from the license ticket distribution server 20 and that the communications enterprise is being requested to perform proxy settlement for the content charge of the received license ticket.

Specifically, transmission/reception unit 301 receives a license ticket docket 250 shown in FIG. 8 from the mobile telephone 40. The license ticket docket 250 is composed of the ticket number "NO_1" of the license ticket received by the mobile telephone 40, a content charge "1000 yen" relating to the license ticket, an email address "matsushita@xx.xxx" for specifying the mobile telephone 40, and a date 2004/2/11" on the mobile telephone 40 received the license ticket.

The transmission/reception unit 301 outputs the received license ticket docket to the content charge settlement unit 302 and the control unit 303.

Furthermore, the transmission/reception unit 301 receives, from the gateway server, a call time of a call made by the mobile telephone 40, and a transmitted packet count and a received packet count of packet communication by the mobile telephone 40. The transmission/reception unit 301 outputs the received call time, received packet count and transmitted packet count to the control unit 303. Note that the transmission/reception unit 301 receives a call time each time a call is made, and receives a transmitted packet count and a received packet count each time packet communication is made.

In addition, the transmission/reception unit 301 transmits the settlement request output by the content charge settlement unit 302, to the bank terminal via the network 60. Note that the bank terminal performs settlement in accordance with the settlement request, and transmits settlement completion notification to the license ticket distribution server 20.

(2) Content Charge Settlement Unit 302

On receiving the license ticket docket 250 from the transmission/reception unit 301, the content charge settlement unit 302 generates a settlement request.

The settlement request includes a transfer-destination account number, a transfer-source account number, a transfer amount, a license ticket reception date, an email address, and a ticket number. Here, the transfer-destination account number is the account number of the content distributor, and the transfer-source account number is the account number of the communication enterprise. The transfer amount is the content charge "1000 yen" included in the license ticket docket 250, the license ticket reception date is the date "2004/2/11" included in the license ticket docket 250, and the email address is the email address "matsushita@xx.xxx" of the mobile telephone 40.

The content charge settlement unit 302 transmits the generated settlement request to the bank terminal via the transmission/reception unit 301 and the network 60.

(3) Control Unit 303

The control unit 303 is made up of a microprocessor and a control program, and performs the following processing by the microprocessor executing the program.

(a) On receiving a call time of a call made by the mobile telephone 40, the control unit 303 calculates a call charge, and outputs the calculated call charge in correspondence with the telephone number of the mobile telephone 40 to the mobile telephone usage charge management unit 304. Furthermore, on receiving a transmitted packet count and a received packet count relating to packet communication by the mobile telephone 40 from the transmission/reception unit 301, the control unit 303 calculates a packet communication charge, and outputs the calculated packet communication charge in correspondence with the telephone number of the mobile telephone 40 to the mobile telephone usage charge management unit 304.

Note that the telephone number "090-xxxx-xxxx" of the mobile telephone 40 and the email address "matsushita@xx.xxx" of the mobile telephone 40 are stored in correspondence in the control unit 303.

(b) The control unit 303 receives the license ticket docket 250 from the transmission/reception unit 301, and extracts the content charge "1000 yen" and the date "2004/2/11" from the received license ticket docket 250. Furthermore, the control unit 303 reads the telephone number "090-xxxx-xxxx" corresponding to the mail address "matsushita@xx.xxx" included in the license ticket docket 250. The control unit 303 outputs the extracted content charge and date in correspondence with the read telephone number, in other words "090-xxxx-xxxx, 1000 yen, 2004/2/11" to the content usage charge management unit 305.

The control unit 303 totals the call charges that the mobile telephone usage charge management unit 304 manages with respect to the mobile telephone 40, in order to calculate a call charge for one month. Furthermore, the control unit 303 totals the packet communication charges for the mobile telephone 40 managed by the mobile telephone usage charge management unit 304 in order to calculate a packet communication charge for one month. The control unit 303 then adds the calculated call charge for the month and the calculated packet communication charge for the month to a basic charge and a monthly usage charge for additional services, both of which are in the subscription held by the mobile telephone 40. The calculated total is the mobile telephone usage charge of the mobile telephone 40 for the month.

A specific example of this is as follows:

| | |
|---|---:|
| Call charge for February | 2150 yen |
| Packet communication charge for February | 430 yen |
| Subscription Basic charge | 2000 yen |
| Monthly usage charge for subscribed voice mail service | 300 yen |

The total of these, "4880 yen", is the mobile telephone usage charge for the mobile telephone 40 for February.

The control unit 303 outputs "call charge 2150 yen, packet communication charge 430 yen, basic charge 2000 yen, voicemail service 300 yen, mobile telephone usage charge 4880" in correspondence with the telephone number "090-xxxx-xxxx" of the mobile telephone 40 to the service charge settlement unit 306.

Furthermore, the control unit 303 reads the date and content charge for each content relating to each license ticket obtained by the mobile telephone 40 during the month, from the content usage charge management unit 305. The control unit 303 totals all the read content charges to calculate a content usage charge for the month.

The control unit 303 sends each set of a date and content charge read from the content usage charge management unit 305 and the calculated content usage charge in correspondence with the telephone number of the mobile telephone 40 to the service charge settlement unit 306.

Specifically, the control unit 303 sends "set of date and content charge (2004/2/11, 1000 yen), content usage charge 1000 yen" in correspondence with the telephone number "090-xxxx-xxxx" of the mobile telephone 40 to the service charge settlement unit 306.

Note that the control unit 303 performs the described processing once a month.

(4) Mobile Telephone Usage Charge Management Unit 304

The mobile telephone usage charge management unit 304 manages a subscription basic charge, a subscribed additional services monthly usage charge, a call charge, and a packet communication charge for each telephone number that is subscribed to the communications enterprise.

Here, each time one of the mobile telephones makes a call, the mobile telephone usage charge management unit 304 receives a call charge for the call from the control unit 303, and accumulates the received call charges. Similarly, each time one of the mobile telephones performs packet communication, the mobile telephone usage charge management unit 304 receives a packet communication charge for the packet communication from the control unit 303, and accumulates the received communication charges.

Note that when the accumulated call charges and the accumulated packet communication charges are read once a month by the control unit 303, the mobile telephone usage charge management unit 304 destroys the accumulated call charges and the accumulated packet communication charges.

(5) Content Usage Charge Management Unit 305

The content usage charge management unit 305 manages, for each telephone number that is subscribed to the communications enterprise, content charges and dates relating to a license tickets obtained by the mobile telephone of the mobile telephone number. Note that each date is the date on which the mobile telephone obtained the corresponding license ticket.

Here, each time the control unit 303 outputs a telephone number, a date and a content charge, the content usage charge management unit 305 accumulates the content charge and date with respect to the telephone number.

Note that the content usage charge management unit 305 destroys the accumulated content charges and dates when they are read once a month by the control unit 303.

(6) Service Charge Settlement Unit 306

The service charge settlement unit 306 generates a bill to be sent to the user, based on information received from the control unit 303.

A specific example is described of service charges for February for the mobile telephone 40.

The service charge settlement unit 306 receives "call charge 2150 yen, packet communication charge 430 yen, basic charge 2000 yen, voice mail service 300 yen, mobile telephone usage charge 4880 yen" and the telephone number "090-xxxx-xxxx" of the mobile telephone 40 from the control unit 303.

Furthermore, the service charge settlement unit 306 receives "a set of date and content charge (2004/2/11, 1000 yen), content usage charge 1000 yen", and the telephone number "090-xxxx-xxxx" of the mobile telephone 40 from the control unit 303.

The service charge settlement unit 306 adds the received mobile telephone usage charge 4880 yen and the content usage charge 1000 yen to calculate a service usage charge "5880 yen". Based on this information, the service charge settlement unit 306 generates a bill 240 such as shown in FIG. 6. The bill 240 is one example of the bill that the service charge settlement unit 306 generates.

The communications enterprise bills the user for a service usage charge that is the total of the mobile telephone usage charge and the content usage charge, based on the bill 240 generated by the service charge settlement unit 306.

4. Mobile Telephone 40

The mobile telephone 40 is portable telephone that performs communication using radio waves, and is, specifically, a computer system composed of a microprocessor, a ROM, a RAM, a liquid crystal display unit, a key operation unit, an antenna, and so on. Here, the mobile telephone 40 is assumed to be possessed by the same user as the home server 50.

Figure 7:
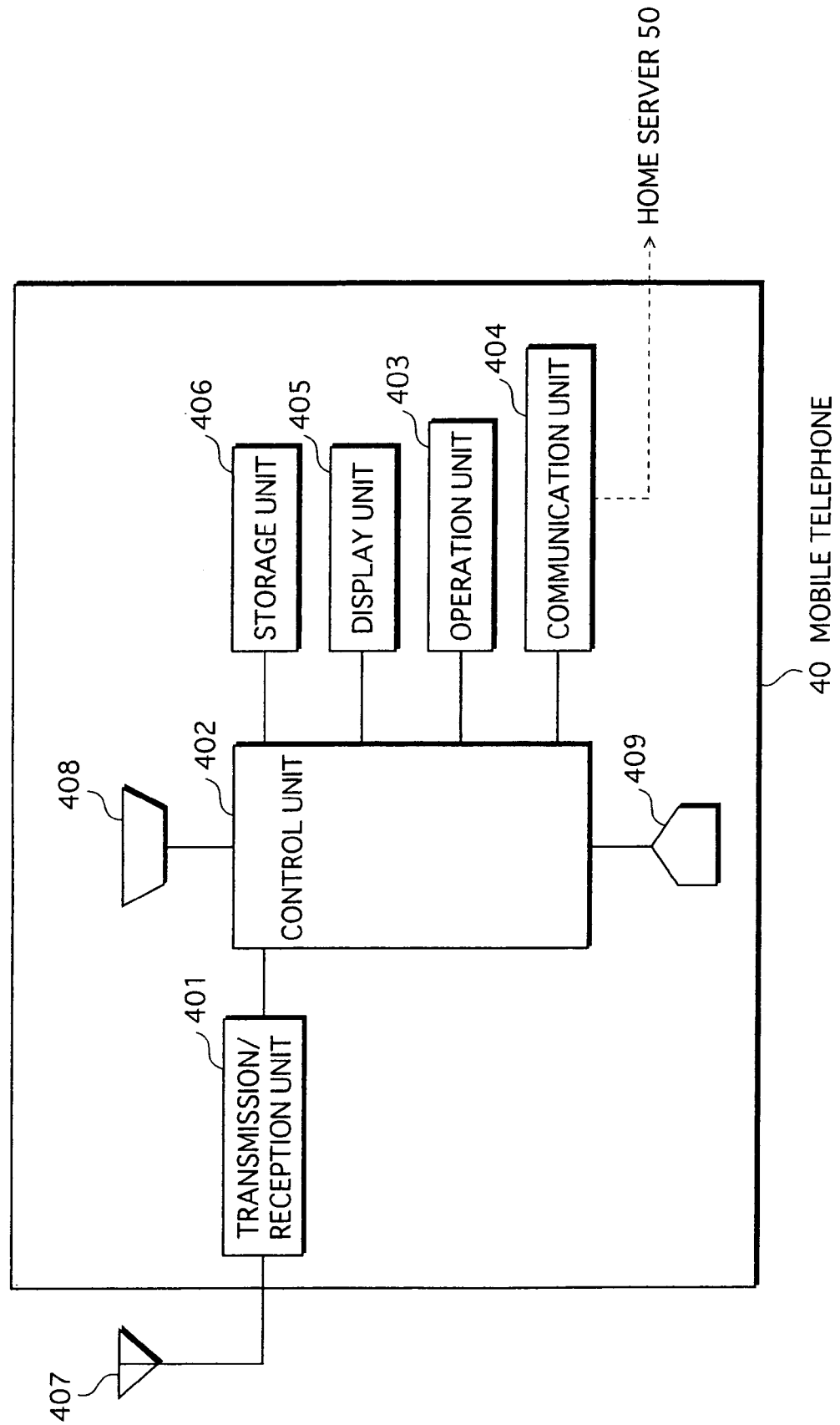
FIG. 7 is a block diagram showing the structure of a mobile telephone 40.

FIG. 7 is a block diagram showing the structure of the mobile telephone 40. As shown in FIG. 7, the mobile telephone 40 is composed of a transmission/reception unit 401, a control unit 402, an operation unit 403, a communication unit 404, a display unit 405, a storage unit 406, an antenna 407, a speaker 408, and a microphone 409.

(1) Transmission/Reception Unit 401

The transmission/reception unit 401 has communication functions including mail transmission/reception and Internet connection, and performs transmission and reception with the gateway server (not illustrated) using radio waves. The transmission/reception unit 401 is able to connect to the network 60 via the gateway server.

Specifically, the transmission/reception unit 401 receives a ticket request from the control unit 402, and transmits the received ticket request to the license ticket distribution server 20 via the gateway server and the network 60. The ticket request includes the ticket number "NO_1". Furthermore, the transmission/reception unit 401 receives the license ticket 231 from the license ticket distribution server 20, and outputs the received license ticket 231 to the control unit 402. The transmission/reception unit 401 also receives the license ticket docket 250 from the control unit 402, and transmits the received license ticket docket 250 to the mobile telephone charge management server 30.

(2) Control Unit 402

The control unit 402 is made up of a microprocessor and a control program, and performs the following processing by the microprocessor executing the program.

(a) The control unit 402, as shown in FIG. 7, is connected to the transmission/reception unit 401, the operation unit 403, the communication unit 404, the display unit 405, the storage unit 406, the speaker 408 and the microphone 409, and, in coordination with these compositional elements, controls functions of the mobile telephone 40 such as email transmission/reception, Internet connection, and telephone book management.

(b) The control unit 402 receives the ticket number "NO_1" from the operation unit 403, and generates a ticket request that includes the received ticket number "NO_1", and outputs the generated ticket request to the transmission/reception unit 301.

(c) On receiving the license ticket 231 from the transmission/reception unit 401, the control unit 402 generates the license ticket docket 250 such as shown n FIG. 8, based on the received license ticket 231.

Specifically, on receiving the license ticket 231 (see FIG. 4), the control unit 402 reads the ticket number "NO_1" and the content charge "1000 yen" from the license ticket 231, and reads the internally-stored mail address "matsushita@xx.xxx" of the mobile telephone 40 and the internally-stored date "2004/2/11".

The control unit 402 generates the license ticket docket 250 composed of the ticket number "NO_1", the content charge "1000 yen", the mail address "matsushita@xx.xxx" and the date "2004/2/11", and outputs the generated license ticket docket 250 to the transmission/reception unit 401.

(d) The control unit 402 further outputs the license ticket 231 received from the transmission/reception unit 401 to the communication unit 404.

(3) Operation Unit 403

The operation unit 403 includes a plurality of buttons such as numeric buttons, an on-hook button, an off-hook button and function buttons. The buttons are provided on an operation surface of the mobile telephone 40. The operation unit 403 receives an input of a ticket number corresponding to a license ticket desired by the user, according to the user pressing the buttons, and outputs the received ticket number to the control unit 402.

Specifically, by viewing the website of the content distributor displayed on the home server 50, the user discovers that the ticket number showing the desired license ticket is "NO_1". The operation unit 403 receives input of the ticket number "NO_1" according to an operation from the user while a screen for inputting a ticket number is displayed on the display unit 405, and outputs the received ticket number "NO_1" to the control unit 402.

(4) Communication Unit 404

The communication unit 404, which includes the antenna, receives the license ticket 231 from the control unit 402, and transmits the received license ticket 231 to the home server 50 using short-range wireless communication. Note that the short-range wireless communication used by the communication unit 404 is achieved by non-contact IC card communication, infrared communication, Bluetooth, or the like.

(5) Display Unit 405

The display unit 405, which includes the liquid crystal display, generates a screen based on screen control information output by the control unit 402, and displays the generated screen on the liquid crystal display. One example of a screen that the display unit 405 displays on the liquid crystal display is the screen for inputting a ticket number.

(6) Storage Unit 406

The storage unit 406 has an area for storing data, and stores data output from the control unit 402.

5. Home server 50

The home server 50 is a computer system composed of a microprocessor, a ROM, a RAM, a hard disk unit, a display unit, a network connection unit, keyboard, a mouse, and so on, and is assumed to be a personal computer in the present case. Note that the structure of the home server 50 is not illustrated.

A user selects a desired piece of content by viewing the content distributor's website which is displayed on a display of the home server 50. The website displayed on the display shows, for instance, a title, a subtitle, performers, a creator, a comment, and corresponding license ticket information (ticket number, number of times viewable, price) for each of a plurality of contents. The user uses a mouse or the like to select a title of one of the contents displayed on the screen.

When a piece of content has been selected by the user, the home server 50 generates a content request that includes a content ID "ID_0001" that identifies the selected content.

The home server 50, which is connected to the network 60 by a high-speed communication line, transmits the generated content request to the content distribution server 10 via the network 60. The home server 50 receives encrypted content from the content distribution server 10 and stores the received encrypted content internally. The encrypted content is the content that corresponds to the content ID "ID_0001" and has been encrypted.

The home server 50, which has a function of performing short-range wireless communication with the mobile telephone 40, receives the license ticket 231 transmitted by the mobile telephone 40 using short-range wireless communication. The license ticket 231, as shown in FIG. 4, includes a content key "hc426D99*ro7v*" that corresponds to the content ID "ID_0001".

The home server 50 reads the content key "hc426D99*ro7v*" from the received license ticket 231. The home server 50 further reads the internally stored encrypted content, and, using the content key "hc426D99*ro7v*" as a decryption key, applies a decryption algorithm D to the read encrypted content, thereby generating content. Note that the decryption algorithm D is for decrypting a ciphertext encrypted according to an encryption algorithm E to generate a plaintext.

The home server 50 reads the copyright information from the license ticket 231, and plays the decrypted content within the scope of the read copyright information.

<Operations>

Figure 9:
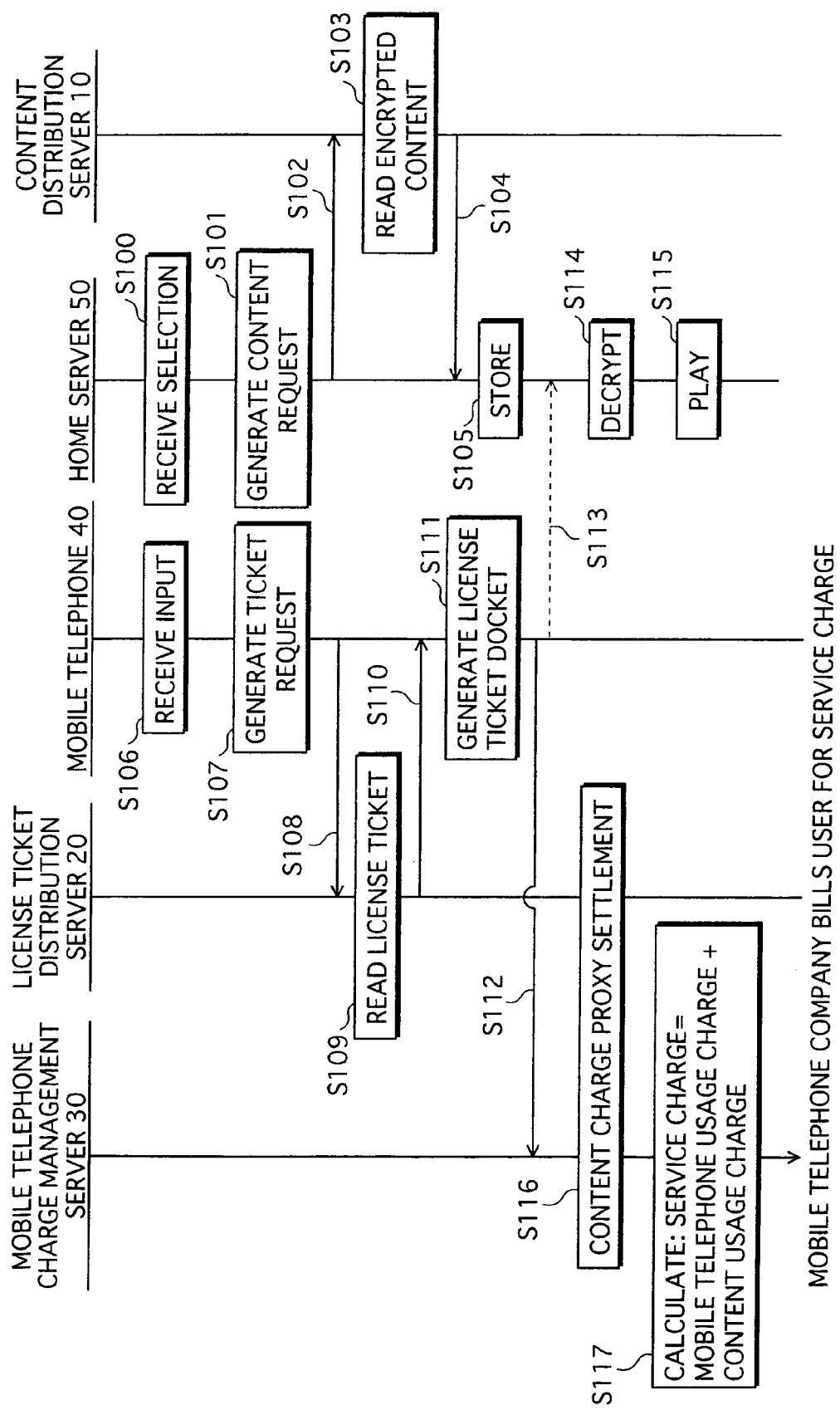
FIG. 9 is a flowchart showing operations of the settlement system 1.

The following describes operations of the settlement system 1 with use of the flowchart shown in FIG. 9.

The user selects content to be used, by viewing the website of the content distributor with use of the home server 50. The home server 50 receives a selection of content according to an input by the user (step S100).

The home server 50 generates a content request that includes the content ID "ID_0001" that identifies the content for which the selection was received (step S101), transmits the generated content request to the content distribution server 10 via the network 60, and the content distribution server 10 receives the content request (step S102).

The content distribution server 10 reads the content ID from the received content request, and reads the encrypted content identified by the read content ID "ID_0001" from a content storage area (step S103). The content distribution server 10 transmits the read encrypted content to the 50, and the home server 50 receives the encrypted content (step S104). The home server 50 stores the received encrypted content internally (step S105).

Meanwhile, while viewing the content distributor's website displayed on the home server 50, the user inputs the ticket number "NO_1" corresponding to the content selected at step S100 into the mobile telephone 40 by operating the operation unit 403.

On receiving the input of the ticket number "NO_1" (step S106), the mobile telephone 40 generates a ticket request that includes the received ticket number "NO_1" (step S107). The mobile telephone 40 transmits the generated ticket request to the license ticket distribution server 20 via the gateway server and the network 60, and the license ticket distribution server 20 receives the ticket request (step S108).

The license ticket distribution server 20 reads the ticket number "NO_1" from the received ticket request, and reads the license ticket 231 that includes the ticket number "NO_1" from the license ticket table 230 (step S109). The license ticket distribution server 20 transmits the read license ticket 231 to the mobile telephone 40 via the network 60 and the gateway server, and the mobile telephone 40 receives the license ticket 231 (step S110).

The mobile telephone 40 generates the license ticket docket 250 (see FIG. 8) that shows that it has received the license ticket 231 and that it is requesting proxy settlement for the license ticket 231 (step 111). The mobile telephone 40 transmits the generated license ticket docket 250 via the gateway server and the network 60 to the mobile telephone charge management server 30, and the mobile telephone charge management server 30 receives the license ticket docket 250 (step S112).

Furthermore, the mobile telephone 40 transmits the license ticket 231 received from the license ticket distribution server 20 at step S110 to the home server 50 by short-range wireless communication via the communication unit 404, and the home server 50 receives the license ticket 231 (step S113). The home server 50 decrypts the piece of encrypted content stored at step S105, with use of the content key included in the license ticket 231 (step S114). The home server 50 plays the decrypted content within the scope of the copyright information included in the license ticket 231 (step S115).

Meanwhile, having received the license ticket docket 250 from the mobile telephone 40 at step S112, the mobile telephone charge management server 30 performs proxy settlement of the content charge for the license ticket 231 with the license ticket distribution server 20 via the bank terminal (step S116). Subsequently, the mobile telephone charge management server 30 adds the mobile telephone usage charge, which is composed of the call charge, the packet communication charge and the like, to the content charge settled at step S116, thereby calculating a service charge, and generates a bill 240 such as shown in FIG. 6 (step S117).

Subsequently, the communications enterprise bills the user for the service charge based on the bill 240 generated at step S117.

Second Embodiment

The following describes a settlement system 2 as a second embodiment of the present invention with reference to the drawings.

Figure 10:
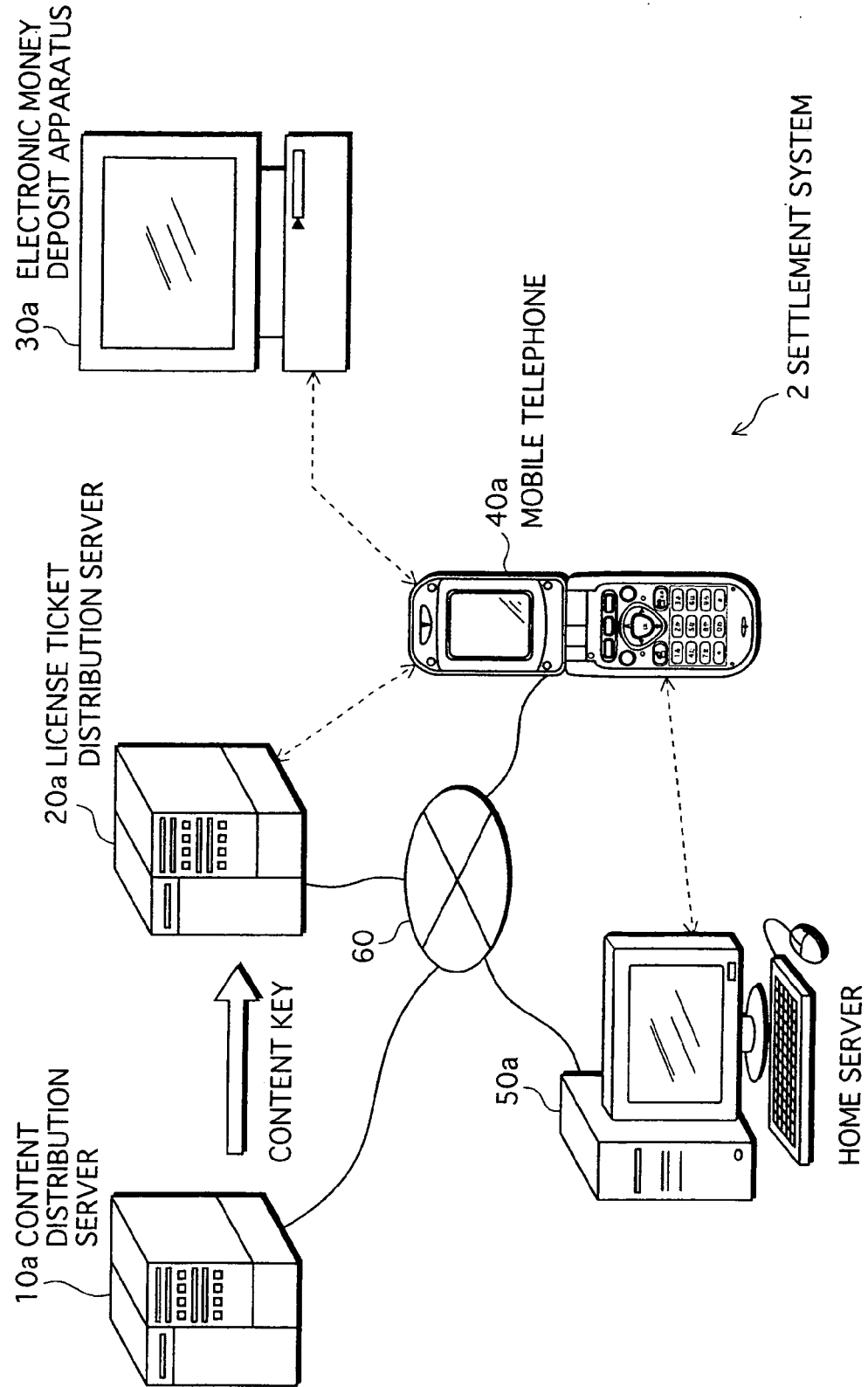
FIG. 10 is system structural diagram showing the structure of a settlement system 2.

FIG. 10 is a system structural diagram showing the structure of the settlement system 2. As shown in FIG. 10, the settlement system 2 is composed of a content distribution server 10a, a license ticket distribution server 20a, an electronic money deposit apparatus 30a, a mobile telephone 40a, and a home server 50a. The content distribution server 10a, the license ticket distribution server 20a and the home server 50a are each connected to the network 60, and the mobile telephone 40a is able to connect to the network 60 via a gateway server (not illustrated).

In the settlement system 1, settlement of content charges is performed by the communications enterprise's mobile telephone charge management server 30 performing proxy settlement for the content charges on behalf of the user, and then billing the user once a month for a service charge that is a total of the mobile telephone usage charge and the content usage charge. However, in the settlement system 2, settlement of content charges is performed not via a communications enterprise's apparatus, but by using electronic money information deposited in a tamper-resistant area of the mobile telephone 40a. The electronic money information is digital data that expresses a monetary value.

<Structure>

The following describes the structure of the settlement system 2. Note that since the content distribution server 10a and the home server 50a have the same functions as the content distribution server 10 and the home server 50 described in the first embodiment, a description thereof is omitted here.

1. License Ticket Distribution Server 20a

Figure 11:
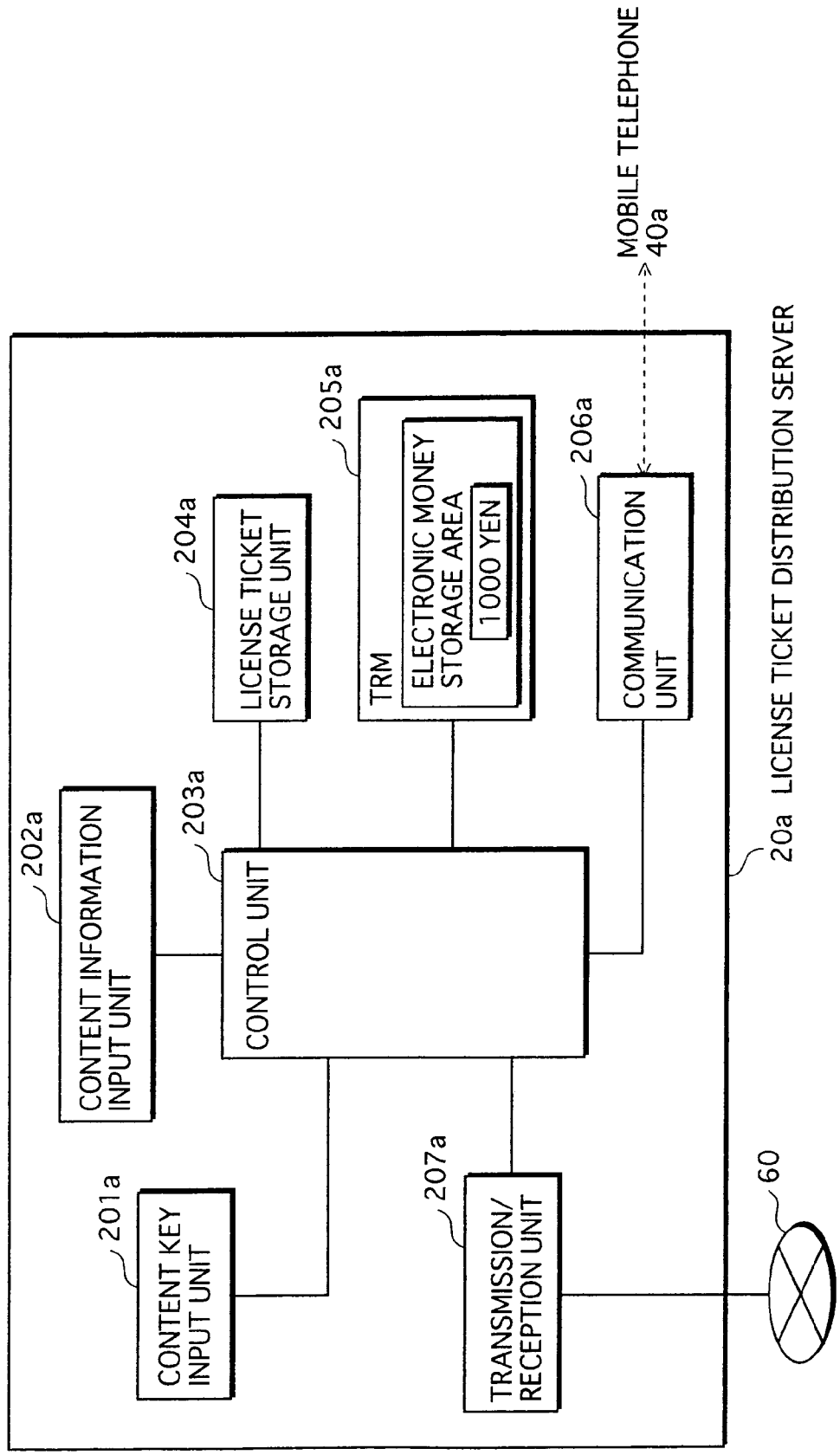

FIG. 11 is a function block diagram showing the structure of the license ticket distribution server 20a functionally. As shown in FIG. 11, the license ticket distribution server 20a is composed of a content key input unit 201a, a content information input unit 202a, a control unit 203a, a license ticket storage unit 204a, a TRM (tamper-resistant module) 205a, a communication unit 206a, and a transmission/reception unit 207a.

Since, among the stated compositional elements, the content key input unit 201a, the content information input unit 202a, the license ticket storage unit 204a and the transmission/reception unit 207a have the same functions and structure as the content key input unit 201, the content information input unit 202, the license ticket storage unit 204 and the transmission/reception unit 207 in the first embodiment, descriptions thereof are omitted here.

(1) Control Unit 203a

The control unit 203a is made up of a microprocessor and a control program, and performs the following processing by the microprocessor executing the control program.

(a) As in the first embodiment, the control unit 203a receives content IDs and content keys from the content key input unit 201a, and receives contents IDs and content information from the content information input unit 202a. The control unit 203a puts each pair of a content key and content information whose content IDs match in correspondence, and attaches a ticket number thereto to generate a license ticket. The control unit 203a outputs the generated license ticket to the license ticket storage unit 204a.

(b) The control unit 203a receives electronic money transmission information from the mobile telephone 40a via the communication unit 206a. Here, the received electronic money transmission information includes electronic money information showing "1000 yen" and a ticket number "NO_1".

The control unit 203a refers to the license ticket table 230 (see FIG. 4) stored in the license ticket storage unit 204a to check whether the content charge in the license ticket 231 that includes the ticket number "NO_1" matches the amount shown by the electronic money information included in the received electronic money transmission information. When the two match, the control unit 203a reads the electronic money information "1000 yen" from the received electronic money transmission information, and outputs the read electronic money information "1000 yen" to the TRM 205a.

In addition, the control unit 203a generates receipt information showing that it has received the electronic money information showing "1000 yen", and returns the generated receipt information to the mobile telephone 40 via the communication unit 206a.

(c) The control unit 203a receives a ticket request from the mobile telephone 40a via the network 60 and the transmission/reception unit 207a. The ticket request includes the ticket number "NO_1" and the receipt information. The control unit 203a reads the ticket number "NO_1" from the ticket request, and reads the license ticket 231 that includes the ticket number from the license ticket storage unit 204a. The control unit 203a transmits the read license ticket 231 to the mobile telephone 40a via the transmission/reception unit 207a and the network 60.

(2) TRM 205a

The TRM 205a is composed of a tamper-resistant IC chip and electronic money storage area. The TRM 205a receives the electronic money information from the control unit 203a, and adds the electronic money information to already-stored electronic money information.

The electronic money information stored in the TRM 205a is unable to be rewritten from outside the license ticket distribution server 20a.

(3) Communication Unit 206a

The communication unit 206a performs short-range wireless communication with a communication unit 404a of the mobile telephone 40a. The communication unit 206a outputs information received from the mobile telephone 40a to the control unit 203a.

2. Electronic Money Deposit Apparatus 30a

The electronic money deposit apparatus 30a is computer system composed of a microprocessor, a ROM, a RAM, and soon, and, specifically, includes a touch panel for displaying a screen and receiving operations from a user, and a money slot for receiving coins and notes from the user.

The electronic money deposit apparatus is located where it can be easily used by users, inside a convenience store, for instance. The electronic money deposit apparatus performs short-range wireless communication with the user's mobile telephone 40a, and deposits electronic money in a TRM 410a in the mobile telephone 40a.

Note that since the electronic money deposit apparatus 30a can be implemented with a commonly-known technique, the structure thereof is not illustrated. Furthermore, a detailed description of the electronic money deposit apparatus 30a is omitted.

3. Mobile Telephone 40a

Figure 12:
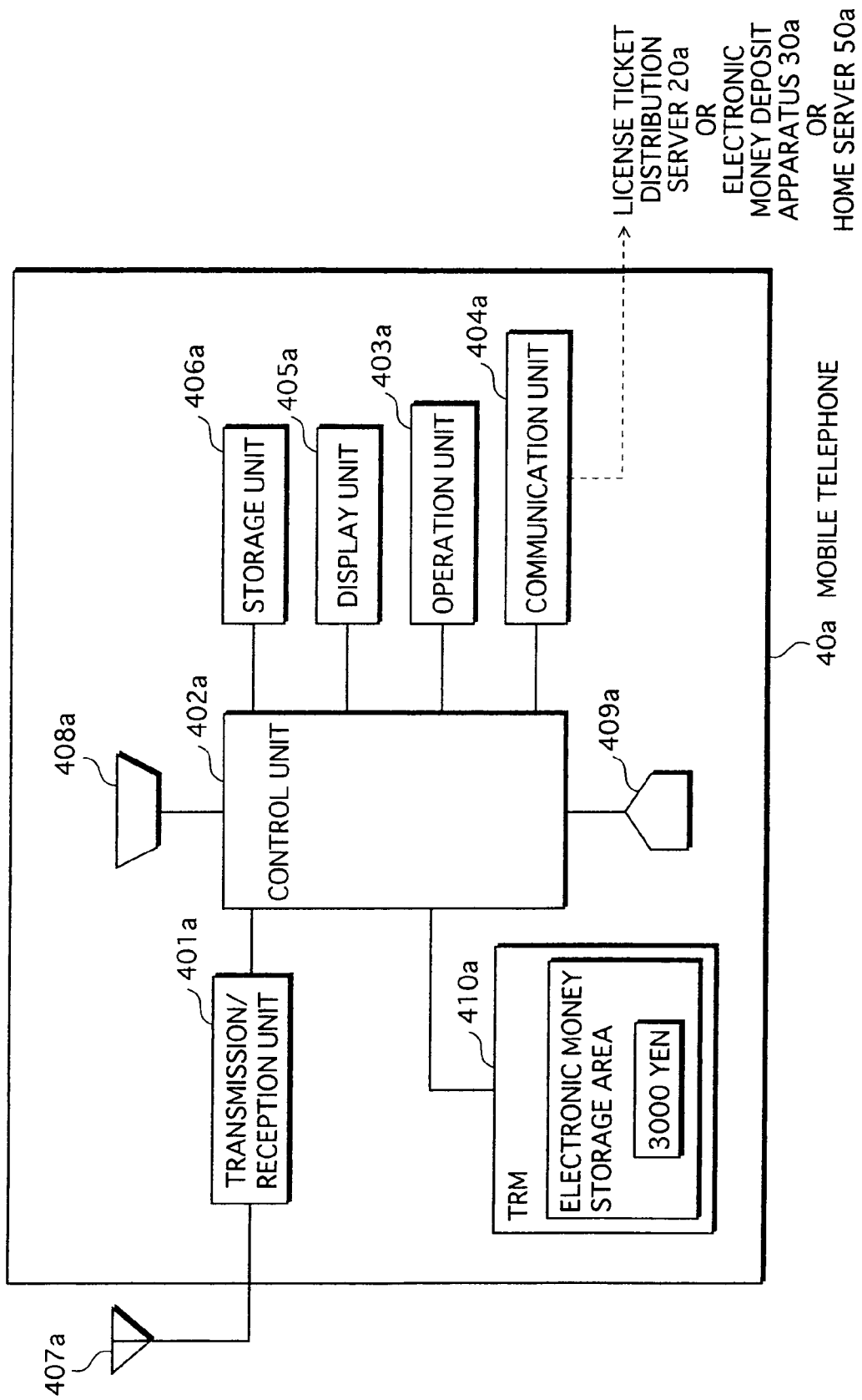

FIG. 12 is a function block diagram showing the structure of the mobile telephone 40a functionally. As shown in FIG. 12, the mobile telephone 40a is composed of a transmission/reception unit 401a, a control unit 402a, a operation unit 403a, a communication unit 404a, a display unit 405a, a storage unit 406a, an antenna 407a, a speaker 408a, a microphone 409a and a TRM 410a.

Since, of the stated compositional elements, the transmission/reception unit 401a, the operation unit 403a, the display unit 405a, the storage unit 406a, the antenna 407a, the speaker 408a and the microphone 409a have the same functions and structure as the transmission/reception unit 401, the operation unit 403, the display unit 405, the storage unit 406, the antenna 407, the speaker 408 and the microphone 409 of the first embodiment, descriptions thereof are omitted.

(1) Control Unit 402a

The control unit 402a is made up of a microprocessor and a control program, and performs the following processing by the microprocessor executing the program.

(a) In processing for depositing electronic money information in the TRM 410a, the control unit 402a performs input and output of information between the electronic money deposit apparatus 30a and the TRM 410a. Specifically, the control unit 402a performs input and output of information such as information showing that a deposit request has been received, information showing the balance in the TRM 410, and electronic money information deposited in the TRM 410a.

(b) In processing for obtaining the license ticket 231, the control unit 402a receives electronic money information "1000 yen" output from the TRM 410a and the ticket number "NO_1" output by the operation unit 403a, and generates electronic money transmission information that includes these. The control unit 402a transmits the generated electronic money transmission information via the communication unit 404a to the license ticket distribution server 20a.

In addition, the control unit 402a receives receipt information corresponding to the electronic money transmission information, via the communication unit 404a from the license ticket distribution server 20a. The receipt information is information showing that the electronic money information "1000 yen" has been received as payment for the license ticket 231 corresponding to the ticket number "NO_1".

(c) Furthermore, in processing for obtaining the license ticket 231, the control unit 402a generates a ticket request made up of the ticket number "NO_1" and the receipt information. The control unit 402a transmits the generated ticket request to the license ticket distribution server 20a via the transmission/reception unit 401a and the network 60.

In addition, the control unit 402a receives the license ticket 231 from the license ticket distribution server 20a via the network 60 and the transmission/reception unit 401a. The control unit 402a transmits the received license ticket 231 via the communication unit 404a to the home server 50a.

(2) Communication Unit 404a

The communication unit 404a, which has an antenna, receives the license ticket 231 from the control unit 402a, and transmits the received license ticket 231 to the home server 50a using short-range wireless communication.

Furthermore, the communication unit 404a receives the electronic money transmission information from the control unit 402a, and transmits the received electronic money transmission information to the electronic money deposit apparatus 30a using short-range wireless communication. In addition, the communication unit 404a receives the receipt information from the electronic money deposit apparatus 30a using short-range wireless communication.

Note that the short-range wireless communication used by the communication unit 404a is achieved by non-contact IC card communication, infrared communication, Bluetooth, or the like.

(3) TRM 410a

The TRM 410a is composed of a tamper-resistant IC chip and electronic money storage area. The TRM 410a stores electronic money information that expresses a monetary value. As one example, in FIG. 12 electronic money information showing "3000 yen" is stored in the electronic money storage area.

The electronic money information stored in the TRM 410a is added to and subtracted from in deposit processing and payment processing, but cannot be rewritten from outside the mobile telephone 40a. In other words, the electronic money information stored in the TRM 410a cannot be tampered with.

Note that the user is able to use the electronic money deposit apparatus 30a to make a balance inquiry regarding the electronic money information stored in the TRM 410a.

The following describes the TRM 410a in deposit processing and payment processing.

(Deposit processing) On receiving the electronic money information from the control unit 402a, the TRM 410a adds the amount shown by the received electronic money information to the amount shown by the electronic money information already stored in the electronic money storage area, and stores electronic money information showing the amount resulting from the addition, in the electronic money storage area in place of the electronic money information that had been stored up until that point.

Taking an example of the TRM 410a already storing electronic money information showing "1000 yen" in the electronic money storage area, if the TRM 410a receives electronic money information showing "2000 yen" from the control unit 402a, the TRM 410a adds the received "2000 yen" to the "1000 yen" that has been stored up to that point, and stores electronic money information showing "3000 yen" in the electronic money storage area.

(Payment processing) On receiving an instruction from the control unit 402a to pay "1000 yen", which is the content charge relating to the license ticket 231, the TRM 410a subtracts "1000 yen" from the electronic money information "3000 yen" stored in the electronic money storage area, and stores electronic money information showing the resultant amount "2000 yen" in place of the electronic money information that had been stored up to that point. In addition, the TRM 410a outputs electronic money information showing "1000 yen" to the control unit 402a.

<Operations>

Figure 13:
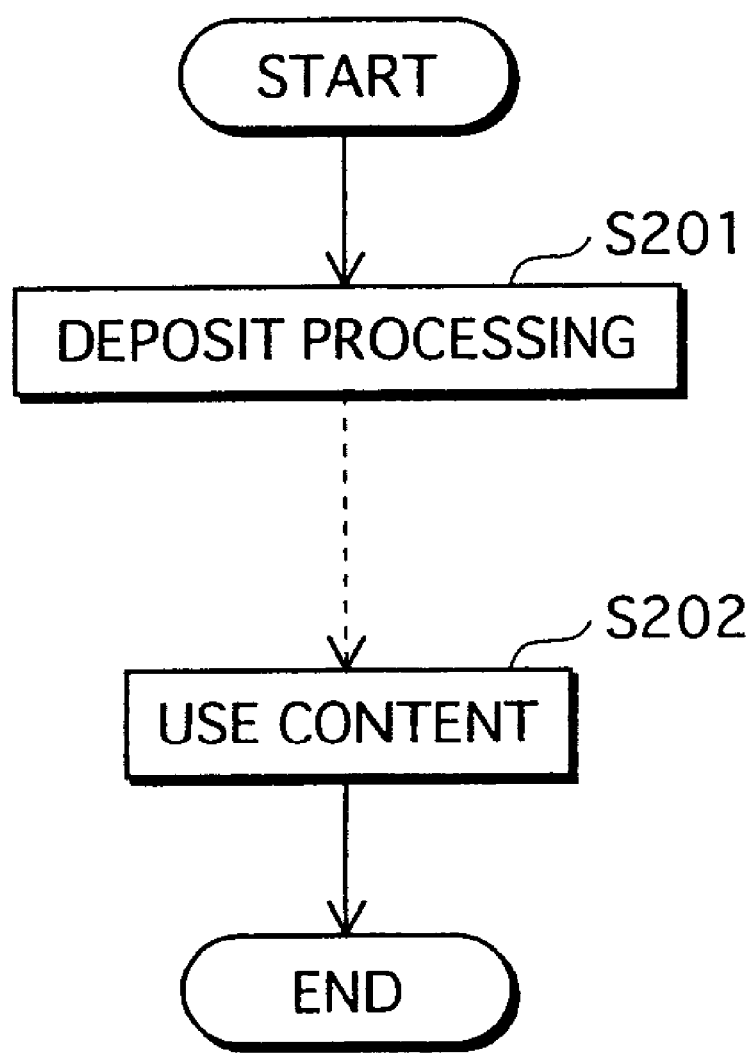
FIG. 13 is a flowchart showing overall operations of the settlement system 2.
Figure 14:
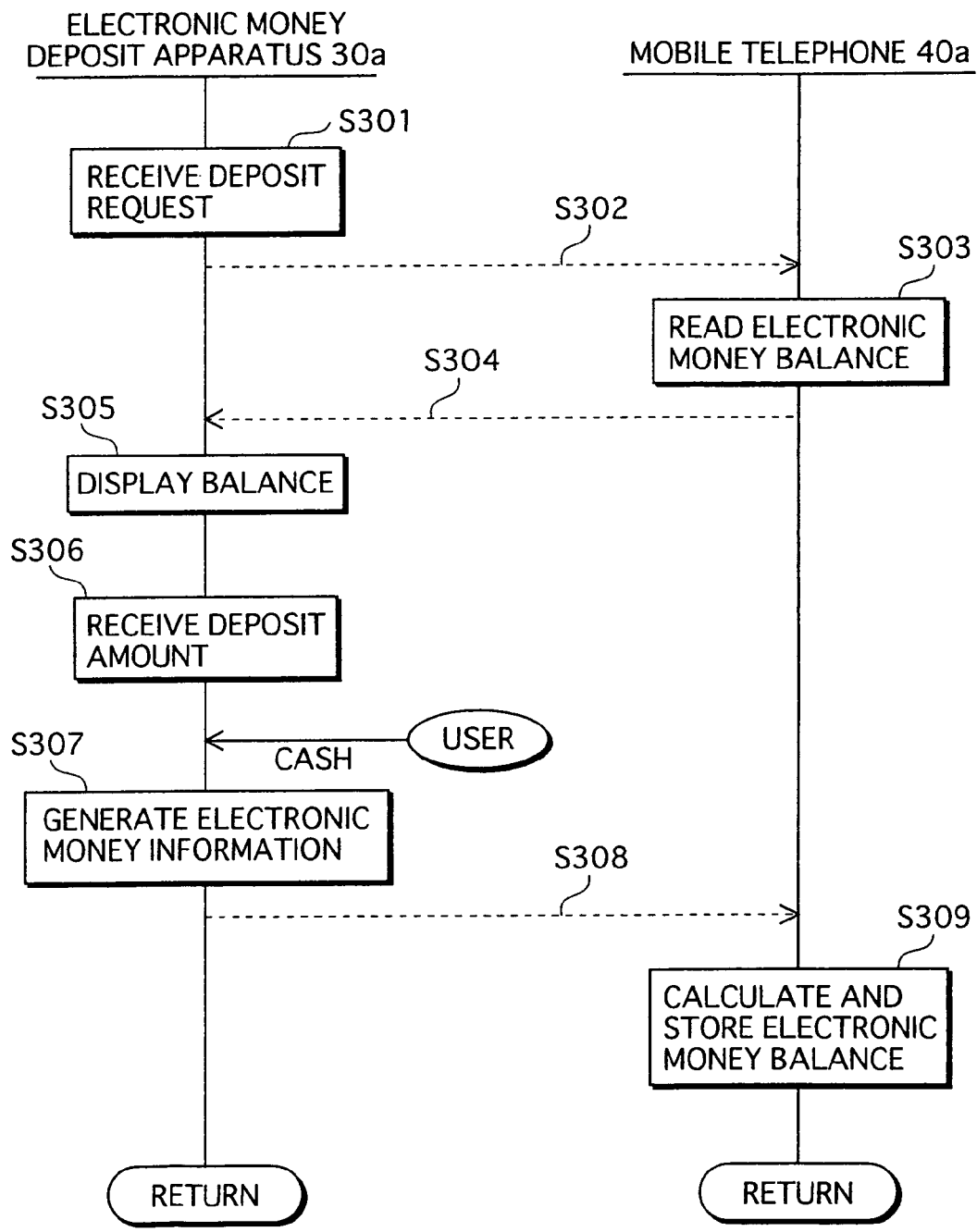
FIG. 14 is a flowchart showing operations for deposit processing in the settlement system 2.
Figure 15:
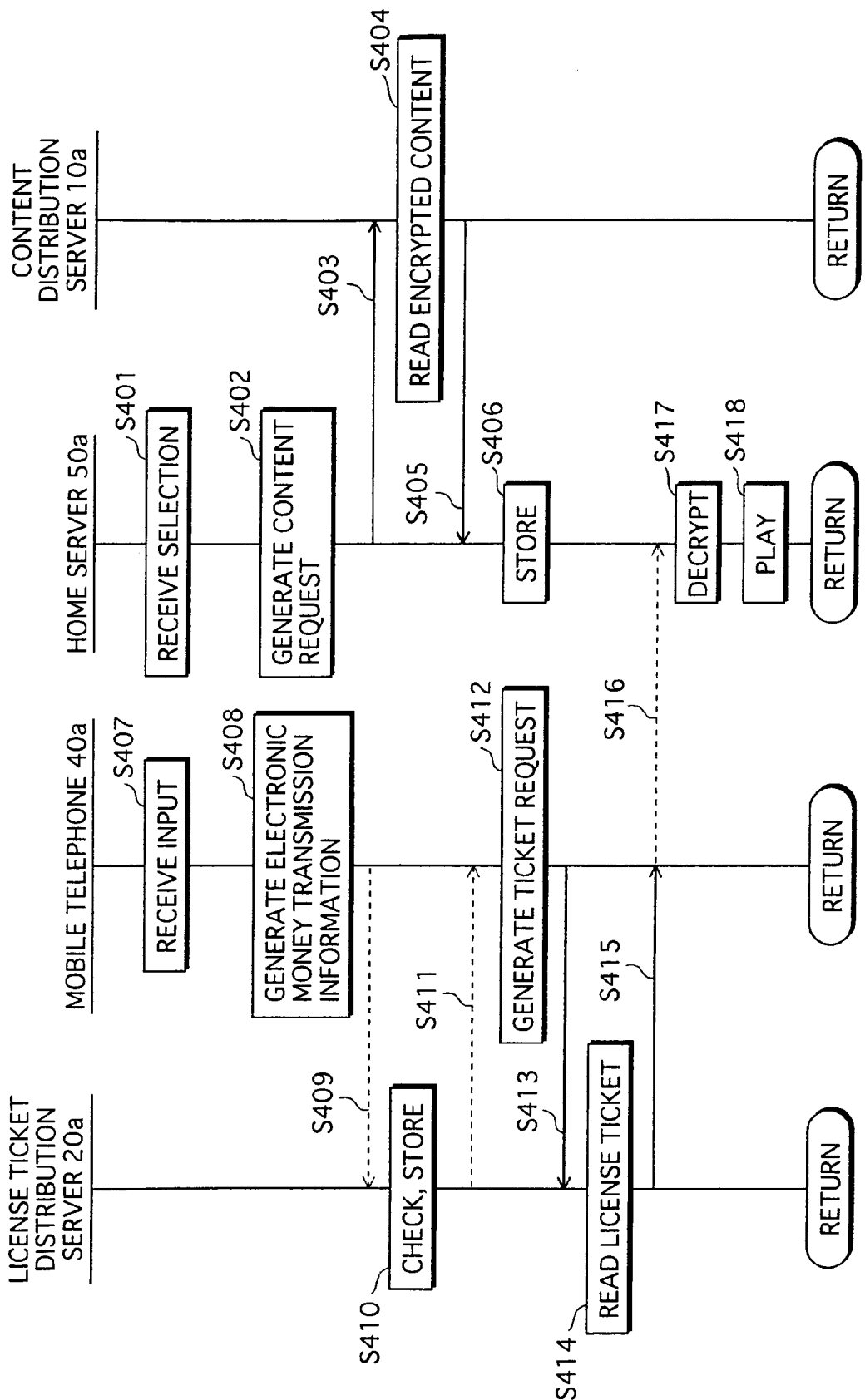
FIG. 15 is a flowchart showing operations for content usage in the settlement system 2.

The following describes operations of the settlement system 2 with use of the flowcharts in FIG. 13 to FIG. 15.

1. Overall Operations

FIG. 13 is a flowchart showing operations of the system overall. The settlement system 2 first performs deposit processing for depositing electronic money information into the TRM 410a of the mobile telephone 40a (step S201), and then performs content usage processing such as content distribution, license ticket distribution, decryption and playback (step S202).

2. Operations in Deposit Processing

FIG. 14 is a flowchart showing operations in deposit processing. Note that the operations described here are the details of step S201 in the flowchart shown in FIG. 13. Deposit processing for depositing electronic money information in the TRM 410a of the mobile telephone 40a is performed between the electronic money deposit apparatus 30a and the mobile telephone 40a. Note that during this processing the electronic money deposit apparatus 30a and the mobile telephone 40a are at a distance at which mutual short-range wireless communication is possible.

The electronic money deposit apparatus 30a receives a deposit request according to a patch panel on the screen being operated by the user (step S301). The electronic money deposit apparatus 30a transmits information showing that a deposit request has been received to the mobile telephone 40a according to short-range wireless communication, and the communication unit 404a of the mobile telephone 40a receives the information (step S302).

On receiving, via the control unit 402a, the information showing that a deposit request has been received, the TRM 410a of the mobile telephone 40a reads the balance of the electronic money information stored in the electronic money storage area (step S303), and outputs information showing the balance to the control unit 402a. As a specific example, assuming that the balance of the electronic money information is "1000 yen", the control unit 402a transmits information showing that the balance of the electronic money information is "1000 yen" via the communication unit 404a to the electronic money deposit apparatus 30a, and the electronic money deposit apparatus 30a receives the information showing that the balance is "1000 yen" (step S304).

Based on the information received at step S304, the electronic money deposit apparatus 30a displays on the screen that the balance of the electronic money information stored in the mobile telephone 40a is "1000 yen" (step S305). Next, the electronic money deposit apparatus 30a displays, on the screen, a screen for receiving a designation of a deposit amount from the user, and receives the designation of the deposit amount by having the user operate the touch panel (step S306). As a specific example, the user designates "2000 yen" as the deposit amount, and inserts currency to the value of the designated amount "2000 yen" in the money slot provided in the electronic money deposit apparatus 30a.

On receiving currency (coins and/or notes), the electronic money deposit apparatus 30a checks the amount, and if the amount matches the deposit amount "2000 yen" designated at step S306, generates electronic money information showing "2000 yen" (step S307). The electronic money deposit apparatus 30a transmits the generated electronic money information showing "2000 yen" to the mobile telephone 40a using short-range wireless communication, and the communication unit 404a of the mobile telephone 40a receives the electronic money information showing "2000 yen" (step S308).

The control unit 402a of the mobile telephone 40a receives the electronic money information showing "2000 yen" via the communication unit 404a, and outputs the electronic money information showing the "2000 yen" to the TRM 410a. On receiving the electronic money information showing "2000 yen", the TRM 410a adds "2000 yen" to the balance "1000 yen" read at step S303, and generates electronic money information showing the resultant amount "3000 yen". The TRM 410a stores the generated electronic money information "3000 yen" in the electronic money storage area (step S309).

3. Operations in Content Usage Processing

FIG. 15 shows operations in content usage processing. Note that the operations described here are the details of step S202 shown in FIG. 13.

While viewing the content distributor's website using the home server 50a, the user selects content that he/she wishes to use. The home server 50a receives the selection of the content according to an input by the user (step S401).

The home server 50a generates a content request that includes the content ID "ID_0001" identifying the piece of content of which the selection was received (step S402), transmits the generated content request via the network 60 to the content distribution server 10a, and the content distribution server 10a receives the content request (step S403).

The content distribution server 10a reads the content ID from the received content request, and reads the encrypted content identified by the read content ID "ID_0001" from the content storage area (step S404). The content distribution server 10a transmits the read encrypted content to the home server 50a, and the home server 50a receives the encrypted content (step S405). The home server 50 stores the received piece of encrypted content internally (step S406).

Meanwhile, while viewing the content distributor's website displayed on the home server 50a, the user inputs the ticket number "NO_1" of the license ticket corresponding to the content selected at step S401, into the mobile telephone 40a by operating the operation unit 403a. The user also inputs the content charge "1000 yen" relating to the license ticket identified by the ticket number "NO_1" into the mobile telephone 40a by operating the operation unit 403a.

The mobile telephone 40a receives input of the ticket number "NO_1" and the content charge "1000 yen" (step S407).

The control unit 402a of the mobile telephone 40a outputs, to the TRM 410a, an instruction to read electronic money information equivalent to the content charge "1000 yen" received at step S407, and receives the electronic money information showing "1000 yen" from the TRM 410a. The control unit 402a generates electronic money transmission information that includes the electronic money information "1000 yen" and the ticket number "NO_1" (step S408). The communication unit 404a transmits the electronic money transmission information to the license ticket distribution server 20a using short-range wireless communication, and the license ticket distribution server 20a receives the electronic money transmission information (step S409).

The control unit 203a of the license ticket distribution server 20a checks the electronic money transmission information received at step S409. The control unit 203a outputs the electronic money information "1000 yen" included in the electronic money transmission information to the TRM 205a, and the TRM 205a stores the electronic money information "1000 yen" received from the control unit 203a in the internal electronic money storage area (step S410).

Subsequently, the control unit 203a generates receipt information showing that it has received the electronic money information "1000 yen". The communication unit 206a transmits the receipt information to the mobile telephone 40a using short-range wireless communication, and the mobile telephone 40a receives the receipt information (step S411).

Next, the mobile telephone 40a generates a ticket request that includes the ticket number "NO_1" and the receipt information received at step S411 (step S412). The mobile telephone 40a transmits the generated ticket request via the gateway server and the network 60 to the license ticket distribution server 20a, and the license ticket distribution server 20a receives the ticket request (step S413).

The control unit 203a of the license ticket distribution server 20a reads the receipt information from the received ticket request, and checks that the receipt information is the receipt information issued by the control unit 203a itself. Then the control unit 203a reads ticket number "NO_1" from the ticket request, and reads the license ticket 231 that includes the ticket number "NO_1" from the license ticket storage unit 204a (step S414). The control unit 203a transmits the read license ticket 231 via the transmission/reception unit 207a and the network 60 to the mobile telephone 40a, and the mobile telephone 40a receives the license ticket 231 (step S415).

The control unit 402a of the mobile telephone 40a receives the license ticket 231 from the transmission/reception unit 401a and outputs the received license ticket 231 to the communication unit 404a. The communication unit 404a transmits the license ticket 231 to the home server 50a using short-range radio communication (step S416).

The home server 50a decrypts the encrypted content stored at step S406, using the content key included in the license ticket 231 (step S417). The home server 50a plays the decrypted content within the scope of the copyright information included in the license ticket 231 (step S418).

Third Embodiment

The following describes a settlement system 3 as a third embodiment of the present invention with reference to the drawings.

Figure 16:
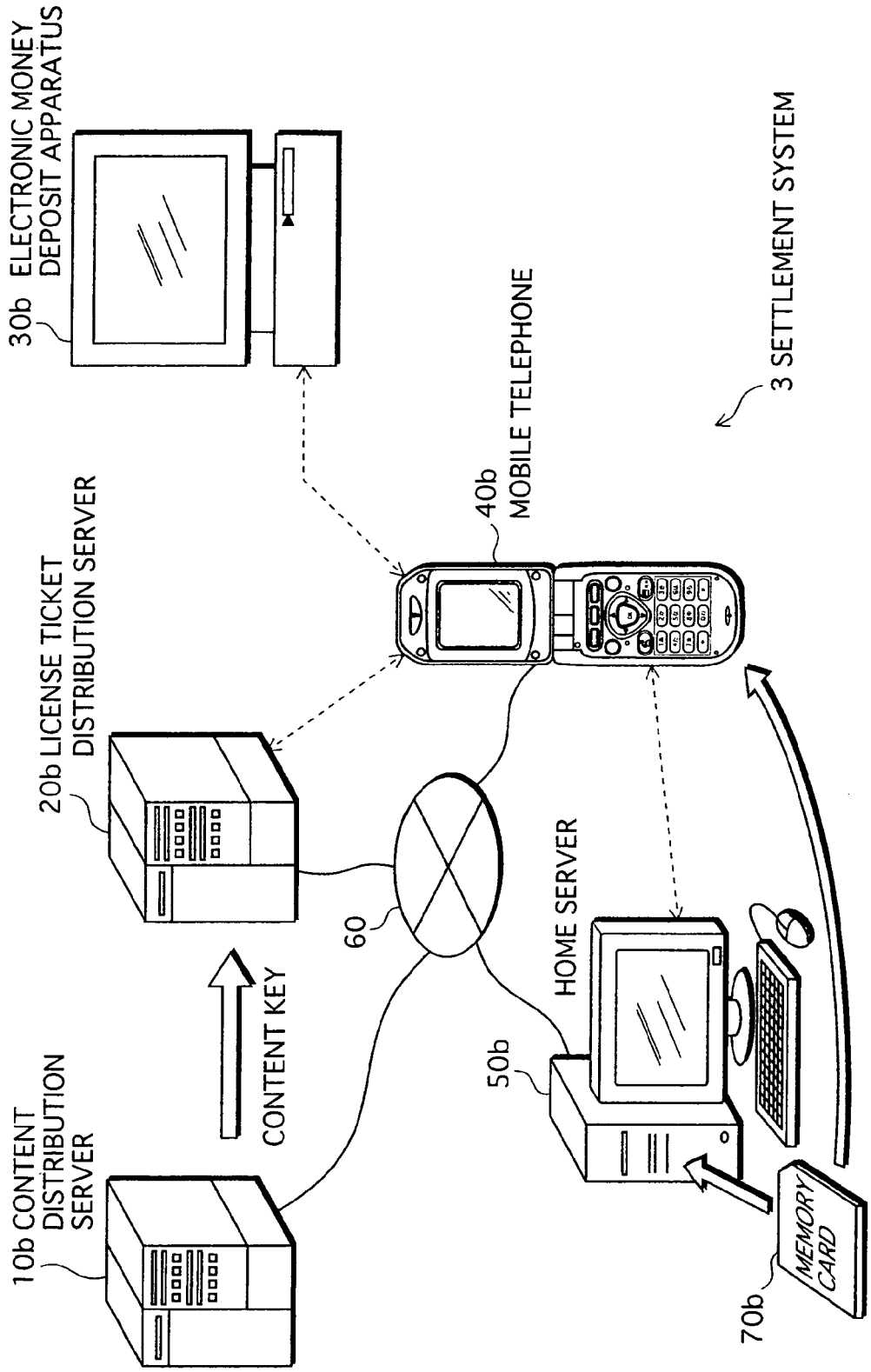
FIG. 16 is a system structural diagram showing the structure of a settlement system 3.

FIG. 16 is a system structural diagram showing the structure of the settlement system 3. As shown in FIG. 16, the settlement system 3 is composed of a content distribution server 10b, a license ticket distribution server 20b, a electronic money deposit apparatus 30b, a mobile telephone 40b, a home server 50b, and a memory card 70b. The content distribution server 10b, the license ticket distribution server 20b and the home server 50b are each connected to the network 60, and the mobile telephone 40b is able to connect to the network 60 via the gateway server (not illustrated).

The settlement system 3 performs settlement for content using electronic money information deposited in a tamper-resistant area of the mobile telephone 40b in the same way as the settlement system 2. The settlement system 3 differs from the settlement system 2 in that content is played by the mobile telephone 40b, not the home server 50b.

<Structure>

The following describes the structure of the settlement system 3. Note that since the content distribution server 10b has the same structure and functions as the content distribution server 10 described in the first embodiment, and the license ticket distribution server 20b and the electronic money deposit apparatus 30b have the same structure and functions as the license ticket distribution server 20a and the electronic money deposit apparatus 30a described in the second embodiment, descriptions thereof are omitted.

1. Home Server 50b

As in the first and second embodiments, the home server 50b requests content from the content distribution server 10b, and receives encrypted content from the content distribution server 10b. The encrypted content obtained from the content distribution server 10b is digital content that has been encoded in accordance with the MPEG-2 standard and then encrypted with a corresponding content key.

The home server 50b differs from the first and second embodiment in that it includes a conversion unit and a memory card input/output unit.

The conversion unit has a function of converting MPEG-2 digital data to MPEG-4 digital data, and is realized with a conversion circuit, conversion software, or the like. On receiving the encrypted content from the content distribution server 10b, the conversion unit coverts the obtained encrypted content from the content distribution server 10b to MPEG-4 digital data.

The memory card input/output unit is realized with a card slot in which the memory card 70b is insertable, a memory card driver, and so on. The memory card input/output unit writes the encrypted content that has been converted by the conversion unit to the memory card 70b while the memory card 70b is in an inserted state therein.

2. Memory Card 70b

The memory card 70b is a card-type recording medium used to transfer the encrypted content from the home server 50b to the mobile telephone 40b.

The memory card 70b is inserted in the memory card input/output unit of the home server 50b, and the encrypted content is written thereto by the home server 50b. The memory card 70b is then inserted in a memory card input/output unit 411b of the mobile telephone 40b, and the stored encrypted content is read by the mobile telephone 40b.

3. Mobile Telephone 40b

Figure 17:
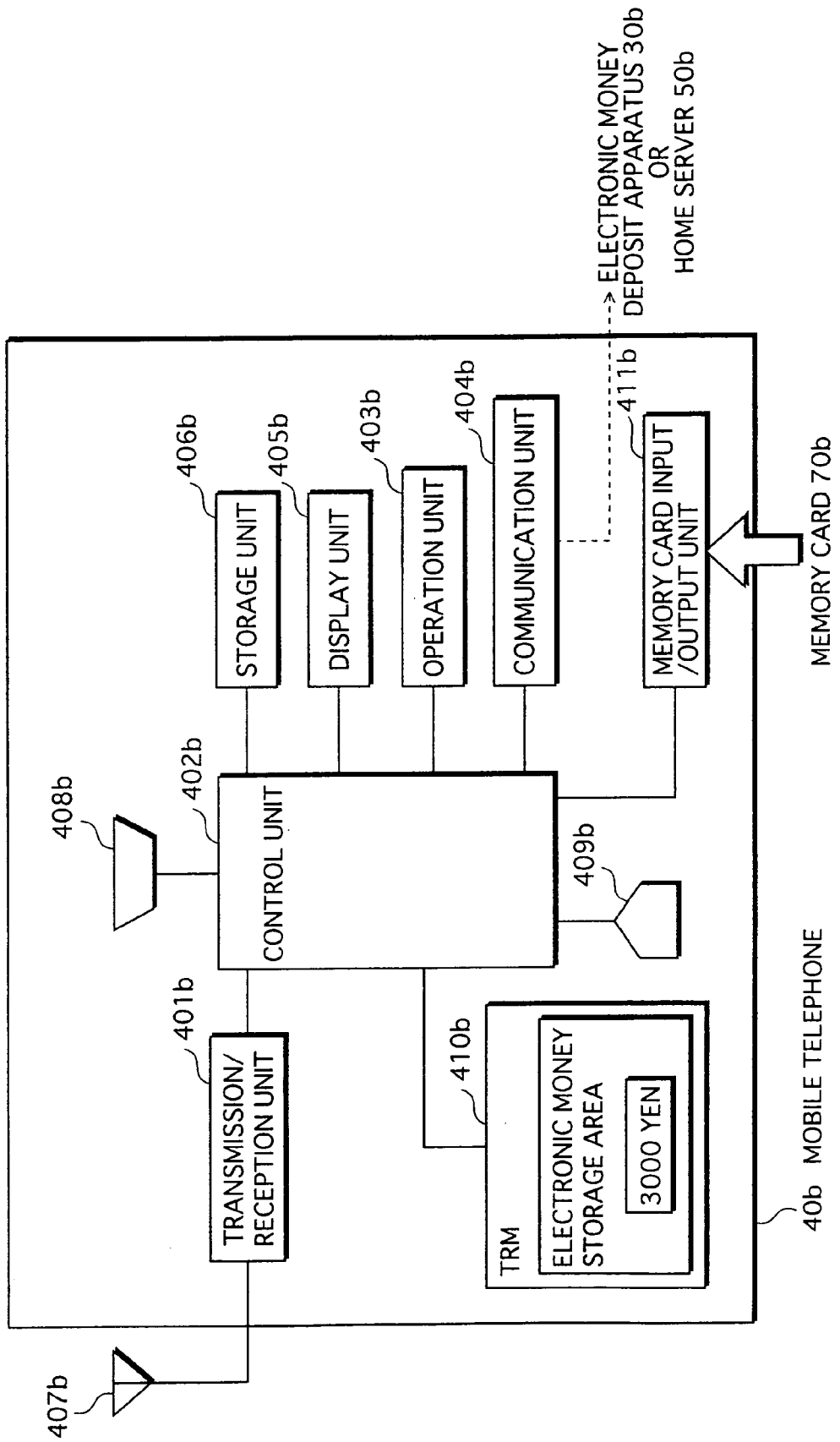
FIG. 17 is a block diagram showing the structure of a mobile telephone 40b.

FIG. 17 is a functional block diagram showing the structure of the mobile telephone 40b functionally. As shown in FIG. 17, the mobile telephone 40b is composed of transmission/reception unit 401b, a control unit 402b, a operation unit 403b, a communication unit 404b, a display unit 405b, a storage unit 406b, an antenna 407b, a speaker 408b, a microphone 409b, TRM 410b, and the memory card input/output unit 411b.

Of the stated compositional elements, the transmission/reception unit 401b, the operation unit 403b, the storage unit 406b, the antenna 407b and the microphone 409b have the same functions and structure as the transmission/reception unit 401, the operation unit 403, the storage unit 406, the antenna 407 and the microphone 409 in the first embodiment, and the TRM 410b has the same functions and structure as the TRM 410a in the second embodiment, and therefore descriptions of these are omitted.

(1) Memory Card Input/Output Unit 411b

The memory card input/output unit 411b is composed of a card slot in which the memory card 70b is insertable, a memory card driver, and so on. Upon the memory card 70b on which encrypted content is stored being inserted in the card slot, the memory card input/output unit 411b reads the encrypted content from the memory card 70b, and outputs the read encrypted content to the control unit 402b.

(2) Control Unit 402b

The control unit 402b is composed of a microprocessor, a control program, and so on, and controls the mobile telephone 40b overall by the microprocessor executing the control program. Note that the following description focuses on structure and function of the control unit 402b that differ from the control unit 402 in the second embodiment, and omits a description of the functions that are the same as the control unit 402 in the second embodiment.

(a) The control unit 402b has a decryption unit. The decryption unit receives the encrypted content from the memory card input/output unit 411b. The decryption unit also reads the content key "hc426D99ro7v" from the license ticket 231 received via the transmission/reception unit 401. The decryption unit decrypts the encrypted content using the content key "hc426D99ro7v" as a decryption key. The decryption unit outputs the decrypted content to a decoding unit described next.

(b) The control unit 402b has a decoding unit. The decoding unit receives the decrypted content from the decryption unit, and decodes the received decrypted content, thereby generating a video signal and an audio signal. The decoding unit outputs the video signal to the display unit 405b and the audio signal to the speaker 408b.

(3) Display Unit 405*b* and Speaker 408*b*

The display unit 405*b* receives the video signal from the decoding unit of the control unit 402*b*, and outputs the received video signal to the display.

The speaker 408*b* receives the audio signal from the decoding unit of the control unit 402*b*, and outputs the received audio signal.

<Operations>

Figure 18:
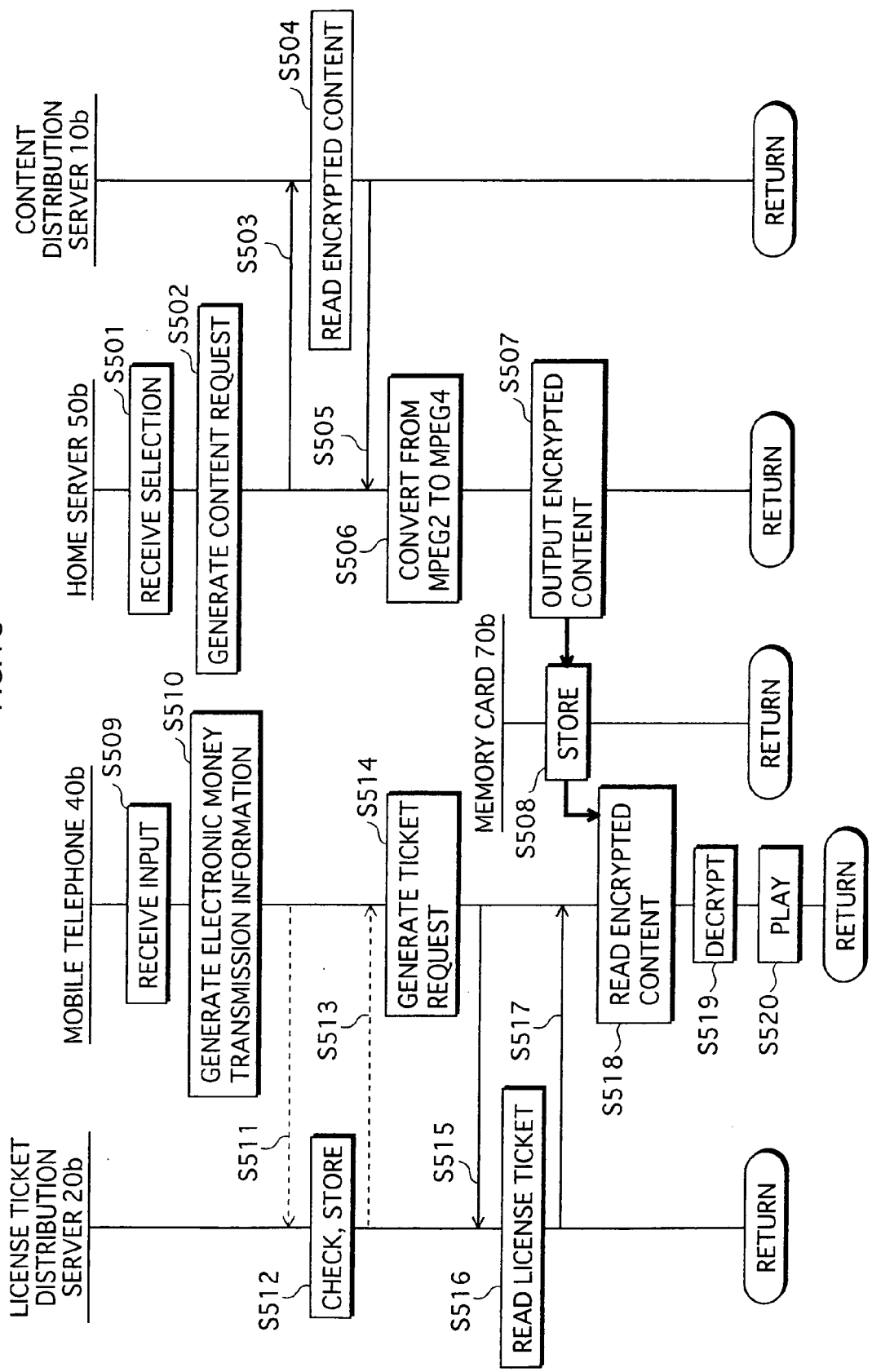
FIG. 18 is a flowchart showing operations of a settlement system 3.

The following describes operations of the settlement system 3 with use of the flowchart shown in FIG. 18.

While viewing the content distributor's website using the home server 50*b*, the user selects content that he/she wishes to use. The home server 50*b* receives the selection of the content according to an input by the user (step S501).

The home server 50*b* generates a content request that includes the content ID "ID_0001" identifying the content of which the selection was received (step S502), transmits the generated content request to the content distribution server 10*b* via the network 60, and the content distribution server 10*b* receives the content request (step S503).

The content distribution server 10*b* reads the content ID from the received content request, and reads the encrypted content identified by the read content ID "ID_0001" from the content storage area (step S504). The content distribution server 10*b* transmits the read encrypted content to the home server 50*b*, and the home server 50*b* receives the encrypted content (step S505).

The home server 50*b* coverts the received encrypted content from MPEG-2 to MPEG-4 (step S506), and outputs the converted encrypted content to the memory card 70*b* which is inserted in the card slot (step S507).

The memory card 70*b* stores the encrypted content output by the home server 50*b* (step S508).

Meanwhile, while viewing the content distributor's website displayed on the home server 50*b*, the user inputs the ticket number "NO_1" of the license ticket corresponding to the content selected at step S501, into the mobile telephone 40*b* by operating the operation unit 403*b*. The user also inputs the content charge "1000 yen" relating to the license ticket identified by the ticket number "NO_1" into the mobile telephone 40*b* by operating the operation unit 403*b*.

The mobile telephone 40*b* receives input of the content number "NO_1" and the content charge "1000 yen" (step S509).

The control unit 402*b* of the mobile telephone 40*b* outputs, to the TRM 410*b*, an instruction to read electronic money information equivalent to the content charge "1000 yen" received at step S509, and receives the electronic money information showing "1000 yen" from the TRM 410*b*. The control unit 402*b* generates electronic money transmission information that includes the electronic money information "1000 yen" and the ticket number "NO_1" (step S510). The communication unit 404*b* transmits the electronic money transmission information to the license ticket distribution server 20*b* using short-range wireless communication, and the license ticket distribution server 20*b* receives the electronic money transmission information (step S511).

The license ticket distribution server 20*b* checks the electronic money transmission information received at step S409. The license ticket distribution server 20*b* stores the electronic money information "1000 yen" included in the electronic money transmission information in an internal tamper-resistant module (step S12).

The license ticket distribution server 20*b* then generates receipt information showing that is has received the electronic money information "1000 yen", transmits the generated receipt information to the mobile telephone 40*b* using short-range wireless communication, and the mobile telephone 40*b* receives the receipt information (step S513).

Next, the mobile telephone 40*b* generates a ticket request that includes the ticket number "NO_1" and the receipt information received at step S513 (step S514). The mobile telephone 40*b* transmits the generated ticket request via the gateway server and the network 60 to the license ticket distribution server 20*b*, and the license ticket distribution server 20*b* receives the ticket request (step S515).

The license ticket distribution server 20*b* reads the receipt information from the received ticket request, and checks that the receipt information is the receipt information issued by the license ticket distribution server 20*b* itself. Then the license ticket distribution server 20*b* reads ticket number "NO_1" from the ticket request, and reads the license ticket 231 that includes the ticket number "NO_1" from an internal license ticket storage area (step S516). The license ticket distribution server 20*b* transmits the read license ticket 231 via the network 60 to the mobile telephone 40*a*, and the mobile telephone 40*a* receives the license ticket 231 (step S517).

The user inserts the memory card 70*b* in which the encrypted content is stored into the memory card input/output unit 411*b* of the mobile telephone 40*b*.

The memory card input/output unit 411*b* reads the encrypted content from the memory card 70*b* (step S518).

The control unit 402*b* of the mobile telephone 40*b* receives the license ticket 231 received at step S517 from the transmission/reception unit 401*b*, and reads the content key from the received license ticket 231. The control unit 402*b* decrypts the encrypted content read at step S518, using the read content key "hc426D99ro7v" (step S519). The control unit 402*b* decodes the decrypted content, and plays the decoded content within the scope of the copyright information in the license ticket 231 (step S520).

Fourth Embodiment

The following describes a settlement system 4 as a fourth embodiment of the present invention with reference to the drawings.

Figure 19:
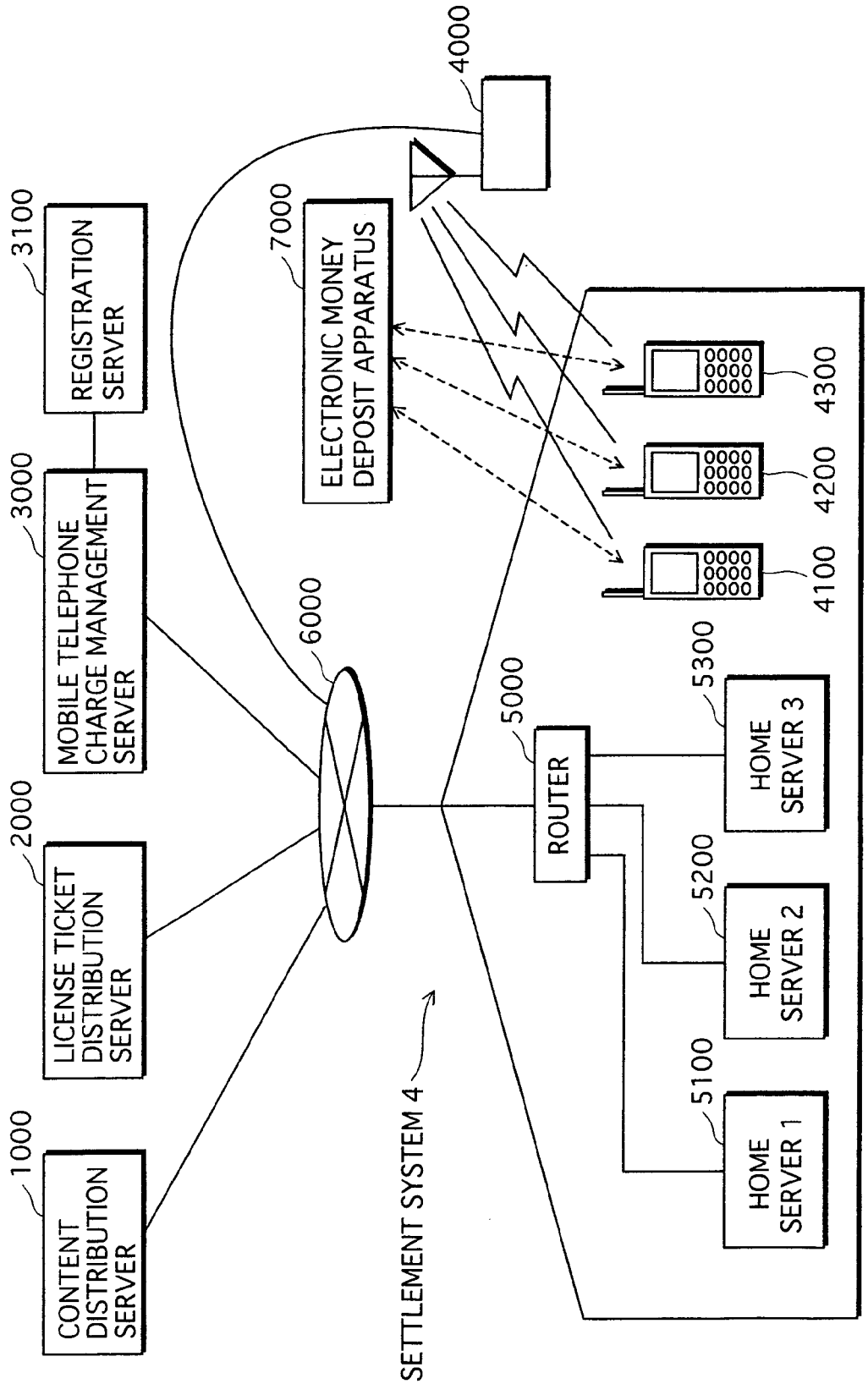
FIG. 19 is a system structural diagram showing a settlement system 4.

FIG. 19 is a system structural diagram showing the structure of the settlement system 4. As shown in FIG. 19, the settlement system 4 is composed of a content distribution server 1000, a license ticket distribution server 2000, a mobile telephone charge management server 3000, a registration server 3100, a gateway server 4000, a mobile telephone 1 (4100), a mobile telephone 2 (4200), a mobile telephone 3 (4300), a router 5000, a home server 1 (5100), home server 2 (5200), a home server 3 (5300), and an electronic money deposit apparatus 7000.

The content distribution server 1000, the license ticket distribution server 2000, the mobile telephone charge management server 3000, and the gateway server 4000 are connected to a network 6000. The mobile telephone 1 (4100), the mobile telephone 2 (4200) and the mobile telephone 3 (4300) are each able to connect to the network 6000 via the gateway server 4000, and the home server 1 (5100), the home server 2 (5200) and the home server 3 (5300) each connect to the network 6000 via the router 5000.

Of the devices surrounded by the solid line in FIG. 19, the router 5000, the home server 1 (5100), the home server 2 (5200) and the home server 3 (5300) exist in a home. Although the mobile telephone 1 (4100), the mobile telephone 2 (4200) and the mobile telephone 3 (4300) are portable telephones that are carried around by users, and therefore they do not necessarily exist in the home, these are assumed to be devices that are used by a family here.

Whereas systems that include one mobile telephone and one home server are described in the previous embodiment, the settlement system 4 includes a plurality of mobile telephones and a plurality of home servers. Furthermore, whereas the settlement system 1 has a structure in which the communications enterprise performs proxy settlement for content usage charges, and the settlement system 2 and the settlement system 3 have a structure in which content usage charges are paid using electronic money deposited in the mobile telephone, the settlement system 4 is combination of these. The settlement system 4 has a structure in which under a particular condition the communications enterprise performs proxy settlement of content usage charges, and under another particular condition, electronic money deposited in the mobile telephone is used to pay content usage charges.

<Structure>

The following describes the structure of each device in the settlement system 4.

1. Content Distribution Server 1000

The content distribution server 1000 has the same structure and functions as the content distribution server 10 described in the first embodiment, and therefore a description thereof is omitted.

2. License Ticket Distribution Server 2000

Figure 20:
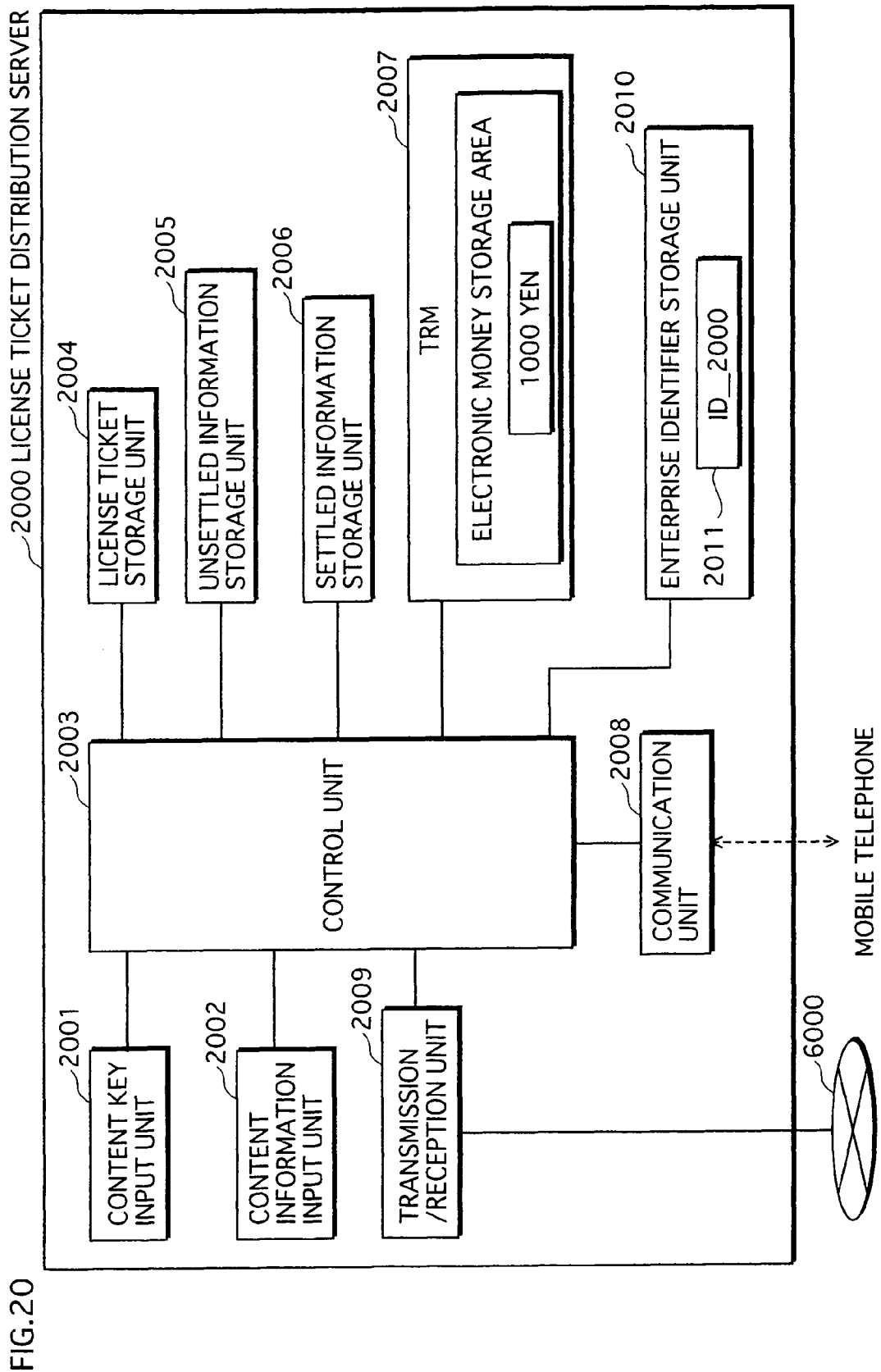
FIG. 20 is a function block diagram showing the structure of a license ticket distribution server 2000 functionally.

FIG. 20 is a function block diagram showing the structure of the license ticket distribution server 2000 functionally.

As shown in FIG. 20, the license ticket distribution server 2000 is composed of a content key input unit 2001, a content information input unit 2002, a control unit 2003, a license ticket storage unit 2004, an unsettled information storage unit 2005, a settled information storage unit 2006, a TRM 2007, a communication unit 2008, a transmission/reception unit 2009, and an enterprise identifier storage unit 2010.

The content key input unit 2001, the content information input unit 2002, the license ticket storage unit 2004, the unsettled information storage unit 2005, the settled information storage unit 2006 and the transmission/reception unit 2009 have the same structure and functions as the content key input unit 201, the content information input unit 202, the license ticket storage unit 204, the unsettled information storage unit 205, the settled information storage unit 206 and the transmission/reception unit 209, respectively, that are compositional elements of the license ticket distribution server 20 of the first embodiment shown in FIG. 2.

Furthermore, the TRM 2007 and the communication unit 2008 have the same structure and functions as the TRM 205a and the communication unit 206a, respectively, that are compositional elements of the license ticket distribution server 20a of the second embodiment shown in FIG. 11.

The enterprise identifier storage unit 2010 is a compositional element that is unique to the fourth embodiment. The enterprise identifier storage unit 2010 is composed of a ROM, and stores an enterprise identifier internally. The enterprise identifier stored in the enterprise identifier storage unit 2010 is information for uniquely identifying the enterprise that performs a license distribution service using the license ticket distribution server 2000. As shown in FIG. 20, the enterprise identifier that uniquely identifies the enterprise is ID_2000 (2011). ID_2000 (2011) is, for instance, a number assigned by an organization that accredits enterprises that perform quality service. In this case, the number of the ID_2000 (2011) has been securely written to the enterprise identifier storage unit 2010. Note that the ID_2000 (2011) written to the enterprise identifier storage unit 2010 is assumed to be unable to be tampered with by the user. Note also that the enterprise identifier is not limited to being a number assigned in the stated manner, but the network address of the license ticket distribution server 2000 or the like may be used.

The control unit 2003 is composed of a microprocessor, a ROM, a RAM and so on. The control unit 2003 receives a ticket request that includes the ticket number, via the transmission/reception unit 2009 and the network 6000 from the mobile telephone 1 (4100), the mobile telephone 2 (4200) or the mobile telephone 3 (4300).

On receiving the ticket request, the control unit 2003 extracts the ticket number from the ticket request, and reads the license ticket corresponding to the extracted ticket number from the license ticket storage unit 2004. The control unit 2003 also reads the ID_2000 (2011) from the enterprise identifier storage unit 2010.

The control unit 2003 transmits the read license ticket and ID_2000 (2011) via the transmission/reception unit 2009 and the network 6000 to the mobile telephone that is the request-source.

3. Mobile Telephone Charge Management Server 3000 and Registration Server 3100

The following describes the mobile telephone charge management server 3000 and the registration server 3100.

The users who possess the mobile telephone 1 (4100), the mobile telephone 2 (4200) and the mobile telephone 3 (4300) have subscriptions for the mobile telephone charge management server 3000 and the registration server 3100, and the mobile telephone charge management server 3000 and the registration server 3100 are possessed by a communications enterprise that provides service to the users.

3-1 Mobile Telephone Charge Management Server 3000

Figure 21:
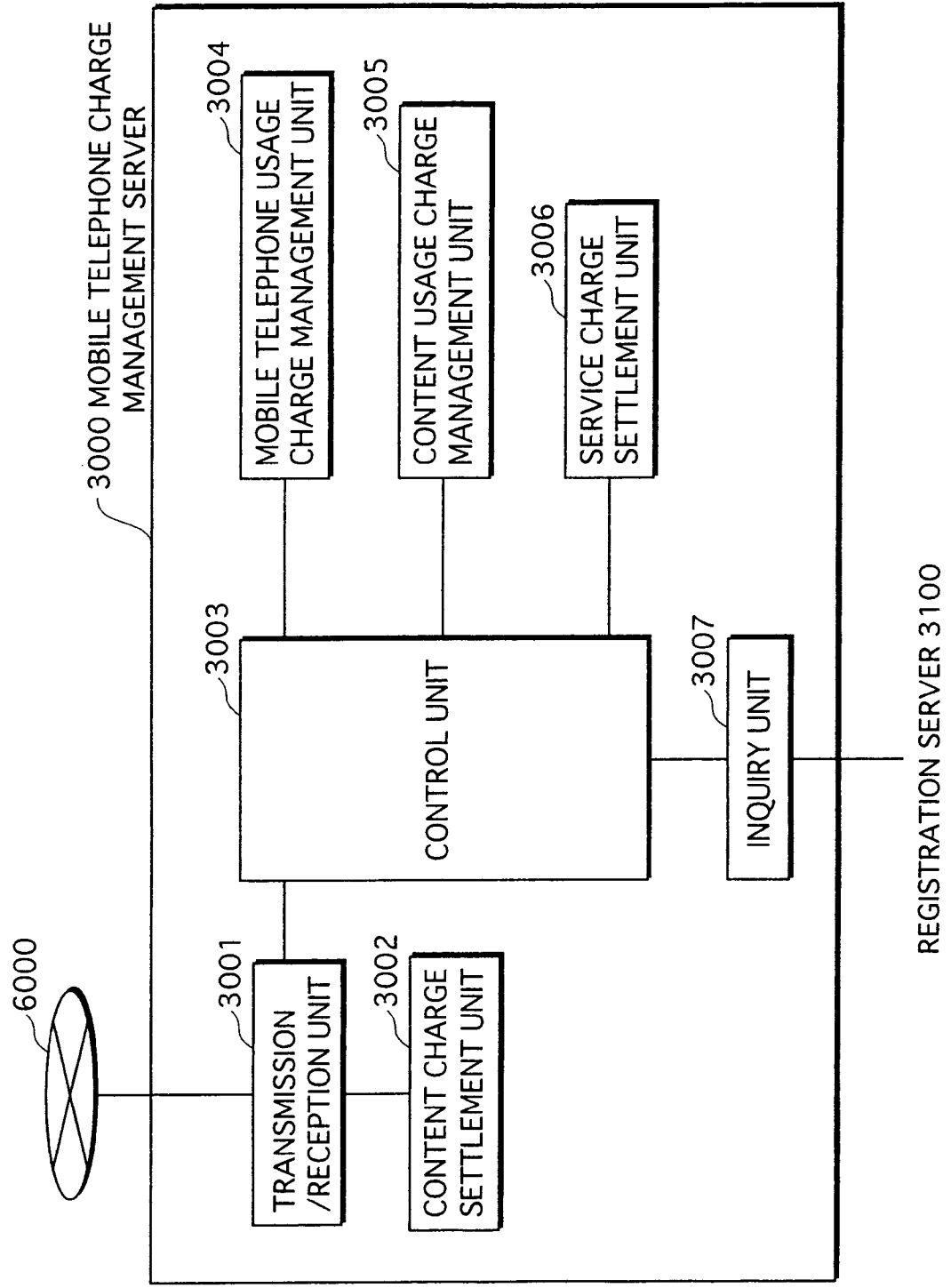
FIG. 21 is a function block diagram showing the structure of mobile telephone charge management server 3000.

FIG. 21 is a function block diagram showing the structure of the mobile telephone charge management server 3000 functionally. As shown in FIG. 21, the mobile telephone charge management server 3000 is composed of a transmission/reception unit 3001, a content charge settlement unit 3002, a control unit 3003, a mobile telephone usage charge management unit 3004, a content usage charge management unit 3005, a service charge settlement unit 3006, and an inquiry unit 3007.

The transmission/reception unit 3001, the content charge settlement unit 3002, the mobile telephone usage charge management unit 3004, the content usage charge management unit 3005 and the service charge settlement unit 3006 have the same structure and functions as the transmission/reception unit 301, the content charge settlement unit 302, the mobile telephone usage charge management unit 304, the content usage charge management unit 305 and the service charge settlement unit 306, respectively, that are compositional elements of the mobile telephone charge management server 30 of the first embodiment shown in FIG. 5.

The control unit 3003 is composed of a microprocessor, a ROM, a RAM, and so on. The control unit 3003 receives a license ticket docket via the transmission/reception unit 3001 and the network 6000 from the mobile telephone 1 (4100), the mobile telephone 2 (4200) and the mobile telephone 3 (4300). On receiving the license ticket docket, the control unit 3003 extracts the enterprise identifier from an enterprise information field in the license ticket docket, and outputs the extracted enterprise identifier to the inquiry unit 3007.

One example of the license ticket docket received from one of the mobile telephones is a license ticket docket 4130 shown in FIG. 24. Upon receiving the license ticket docket 4130, the control unit 3003 extracts the ID_2000 from the enterprise identifier field, and outputs the extracted ID_2000 to the inquiry unit 3007. Note that details of the license ticket docket 4130 are given later.

On receiving a signal showing "proxy settlement not possible" from the inquiry unit 3007, the control unit 3003 notifies the mobile telephone to that effect via the transmission/reception unit 3001 and the network 6000. On receiving a signal showing "proxy settlement possible" from the inquiry unit 3007, the control unit 3003 adds the content charge to the mobile telephone charge to calculate a service charge in the same manner as the control unit 303 of the mobile telephone charge management server 30 described in the first embodiment.

The inquiry unit 3007 is a compositional element that is unique to the fourth embodiment. The inquiry unit 3007 is composed of a LAN connection unit and so on, and is connected to the registration server 3100 via a LAN.

The inquiry unit 3007 receives the enterprise identifier that the control unit 3003 extracted from the license ticket docket from the control unit 3003. The inquiry unit 3007 generates an inquiry request that includes the received enterprise identifier. The inquiry request is information to the effect that an inquiry is being made as to whether or not proxy settlement can be executed with the enterprise identified by the enterprise identifier. The inquiry unit 3007 transmits the generated inquiry request via the LAN to the registration server 3100.

Furthermore, the inquiry unit 3007 receives reply information that is a reply to the inquiry request, from the registration server 3100. The reply information includes either "0" or "1", "0" showing that proxy settlement is not possible, and "1" showing that proxy settlement is possible.

On receiving reply information that includes "0" from the registration server 3100, the inquiry unit 3007 outputs a signal showing "proxy settlement not possible" to the control unit 3003. On the other hand, on receiving reply information including "1" from the registration server 3100, the inquiry unit 3007 outputs a signal showing "proxy settlement possible" to the control unit 3003.

3-2 Registration Server 3100

Figure 22:
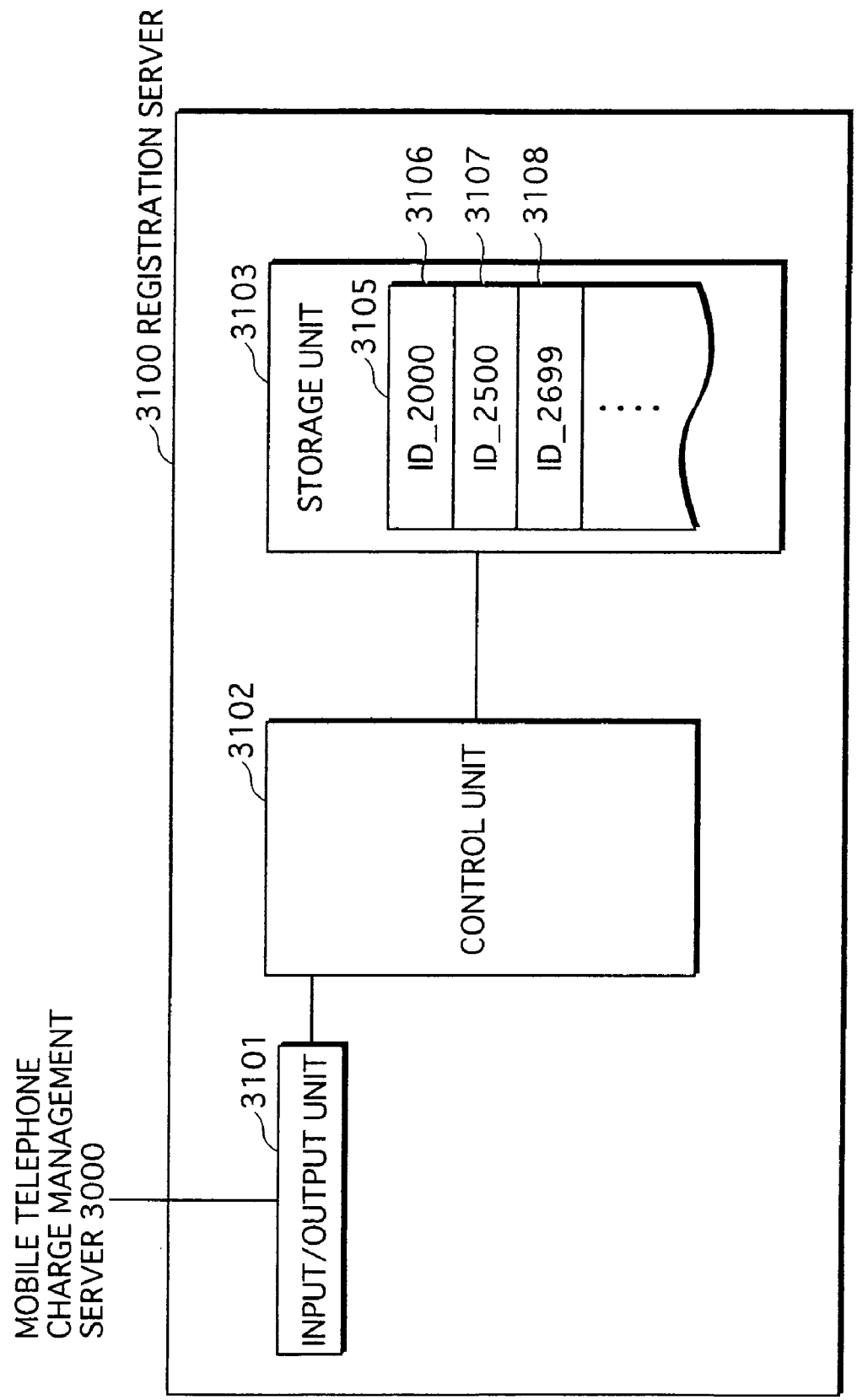
FIG. 22 is a function block diagram showing the structure of a registration server 3100 functionally.

FIG. 22 is a function block diagram showing the structure of the registration server 3100 functionally. As shown in FIG. 22, the registration server 3100 is composed of an input/output unit 3101, a control unit 3102, and a storage unit 3103. The registration server 3100 is, specifically, a computer system composed of a microprocessor, a ROM, a RAM, a hard disk unit, and so on.

(1) Input/Output Unit 3101

The input/output unit 3101 is composed of a LAN connection unit and so on, and performs communication with the mobile telephone charge management server 3000 via the LAN.

Specifically, the input/output unit 3101 receives an inquiry request from the mobile telephone charge management server 3000, and outputs the received inquiry request to the control unit 3102. Furthermore, the input/output unit 3101 transmits reply information received from the control unit 3102 to the mobile telephone charge management server 3000.

(2) Control Unit 3102

The control unit 3102 is composed of a microprocessor, a ROM, a RAM and so on.

The control unit 3102 receives an inquiry request from the input/output unit 3101. On receiving the inquiry request, the control unit 3102 extracts the enterprise identifier from the received inquiry request. The control unit 3102 further reads a registration table 3105 from the storage unit 3103, and judges whether or not the extracted enterprise identifier is registered in the read registration table 3105.

When the enterprise identifier is judged to be included in the registration table 3105, the control unit 3102 generates reply information that includes "1", and when the enterprise identifier is judged to not be included in the registration table 3105, the control unit 3102 generates reply information that includes "0". The control unit 3102 outputs the generated reply information to the input/output unit 3101.

Here, a case in which the control unit 3102 extracts an enterprise identifier ID_2000 from the inquiry request is taken as one example. As shown in FIG. 22, the registration table 3105 includes the ID_2000 (3106). Therefore, the control unit 3102 generates reply information that includes "1", and outputs the generated reply information to the input/output unit 3101.

(3) Storage Unit 3103

The storage unit 3103 is composed of a hard disk unit, and pre-stores the registration table 3105 internally.

As shown in FIG. 22, the registration table 3105 includes enterprise identifiers ID_2000 (3106), ID_2500 (3107), ID_2699 (3108), and so on. These enterprise identifiers included in the registration table 3105 are information for uniquely identifying network service enterprises with which the communications enterprise can perform proxy settlement. In other words, the enterprise identifiers registered in the registration table 3105 are information for identifying trusted network service enterprises. The communications enterprise performs proxy settlement for trusted network services enterprises and does not perform proxy settlement for network services enterprises that are not trusted.

Note that the registration server 3100 does not have to be possessed by the same communications enterprise as the mobile telephone charge management server 3000, but may be possessed by another independent organization. The organization may be, for instance, an organization that accredits enterprises that provide quality network service. In such a case, the mobile telephone charge management server 3000 and the registration server 3100 perform communication via the network 6000 instead of being connected via the LAN.

4. Mobile Telephone 1 (4100), Mobile Telephone 2 (4200), Mobile Telephone 3 (4300)

The following describes structure of the mobile telephone 1 (4100), the mobile telephone 2 (4200) and the mobile telephone 3 (4300). The mobile telephone 1 (4100), the mobile telephone 2 (4200) and the mobile telephone 3 (4300) are portable telephones owned by different family members of one home. Here, it is assumed that these telephones all receive service from the same communications enterprise.

4-1 Mobile Telephone 1 (4100)

Figure 23:
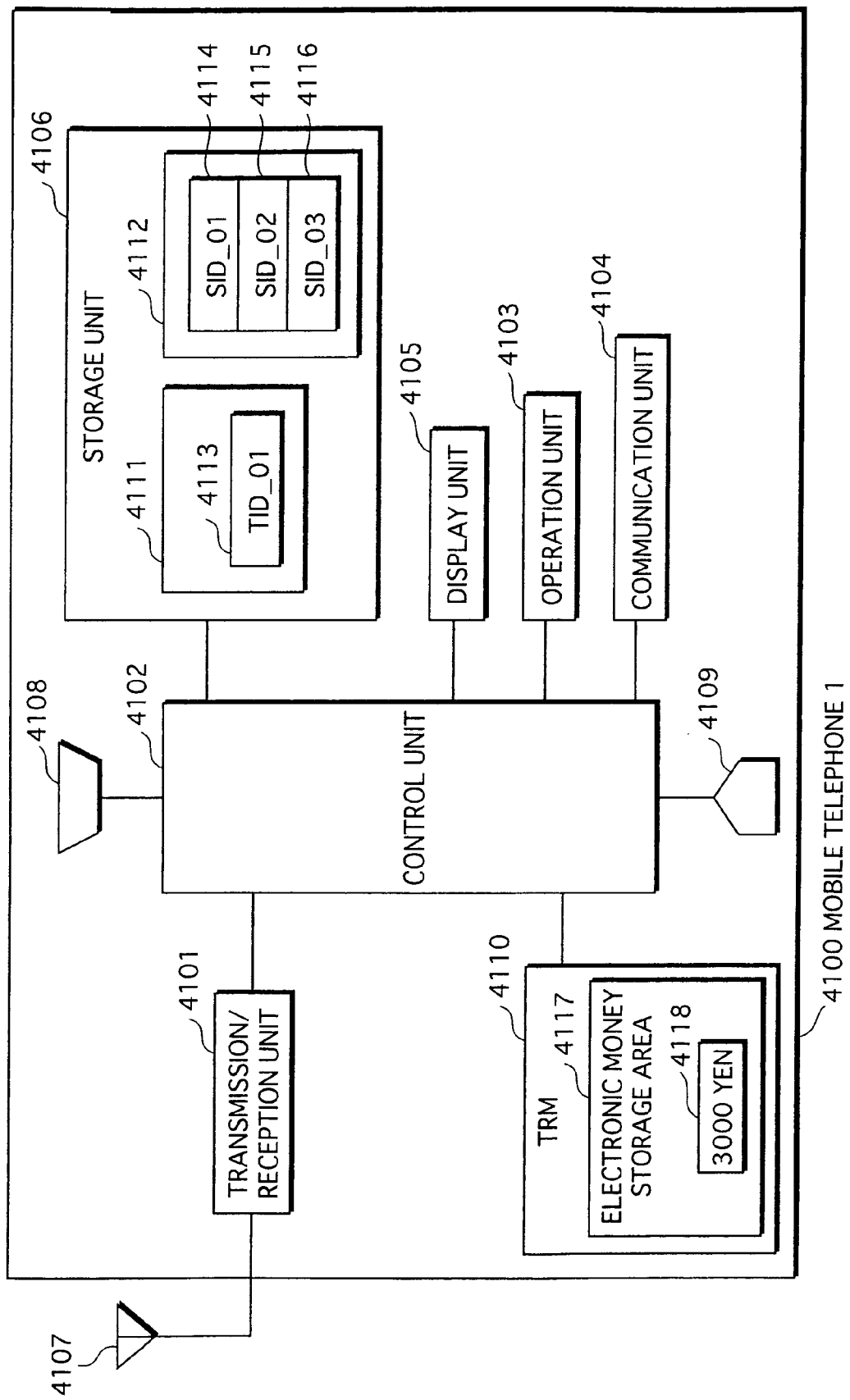
FIG. 23 is a function block diagram showing the structure of a mobile telephone 1 (4100) functionally.

FIG. 23 is a function block diagram showing the structure of the mobile telephone 1 (4100) functionally.

As shown in FIG. 23, the mobile telephone 1 (4100) is composed of a transmission/reception unit 4101, a control unit 4102, an operation unit 4103, a communication unit 4104, a display unit 4105, a storage unit 4106, an antenna 4107, a speaker 4108, a microphone 4109 and a TRM 4110. The TRM 4110 includes an electronic money storage area 4117 in which is stored electronic money information 4118 showing "3000 yen". The electronic money information 4118 is information stored in the electronic money storage area 4117 using the electronic money deposit apparatus 7000, as with the mobile telephone 40a in the second embodiment.

The mobile telephone 1 (4100) has basically the same compositional elements as the mobile telephone 40a shown in FIG. 12. In particular, the transmission/reception unit 4101, the operation unit 4103, the communication unit 4104, the display unit 4105, the antenna 4107, the speaker 4108, the microphone 4109 and the TRM 4110 have the same structure and functions as the transmission/reception unit 401a, the operation unit 403a, the communication unit 404a, the display unit 405a, the antenna 407a, the speaker 408a, the microphone 409a and the TRM 410a that are compositional elements of the mobile telephone 40a, and therefore descriptions thereof are omitted here.

(1) Control Unit 4102

The control unit 4102 is composed of a microprocessor, a ROM, a RAM and so on, and controls the mobile telephone 1 (4100) overall. The following description focuses on functions that differ from the control units of the mobile telephones described in the first to third embodiments.

(a) The control unit 4102 receives a license ticket and an enterprise identifier from the license ticket distribution server 2000. Here, a specific example is described of the control unit 4102 receiving the license ticket 231 shown in FIG. 4 and the enterprise identifier "ID_2000". The control unit 4102 extracts the ticket number "NO_1" and the content charge "1000 yen" from the received license ticket 231. The control unit 4102 reads its own internally-stored email address "matsushita@xx.xxx" and the internally-managed date "2005/3/22".

The control unit 4102 generates the license ticket docket 4130 shown in FIG. 24 from the ticket number "NO_1", the content charge "1000 yen", the email address "matsushita@xx.xxx", the date "2005/3/22" and the received enterprise identifier "ID_2000". The control unit 4102 transmits the generated license ticket docket 4130 via the transmission/reception unit 4101, the antenna 4107, the gateway server 4000 and the network 6000 to the mobile telephone charge management server 3000.

(b) Here, when the mobile telephone charge management server 3000 judges that proxy settlement is not possible for the license ticket docket 4130 transmitted to the mobile telephone charge management server 3000, the control unit 4102 receives information to that effect via the network 6000, the gateway server 4000, the antenna 4107 and the transmission/reception unit 4101 from the mobile telephone charge management server 3000.

In this case, the control unit 4102 generates electronic money transmission information that includes the electronic money information "1000 yen" output from the TRM 4110 and the ticket number "NO_1" extracted from the license ticket 231, in the same way as the control unit 402a described in the second embodiment. The control unit 4102 transmits the generated electronic money transmission information via the communication unit 4104 to the license ticket distribution server 2000.

(c) The following describes license ticket transmission processing. On receiving a license ticket form the license ticket distribution server 2000, the control unit 4102 reads TID_01 (4113), which is the device ID of the mobile telephone 1 (4100), from a device ID storage area 4111 of the storage unit 4106. The control unit 4102 generates a ticket transmission request that includes the read TID_01 (4113). The ticket transmission request does not include a license ticket, but is information showing that transmission of a license ticket is being requested.

The control unit 4102 transmits the generated ticket transmission request via the communication unit 4104 to one of the home server 1 (5100), the home server 2 (5200) and the home server 3 (5300). When the control unit 4102 receives a signal showing refusal of the transmission request via the transmission/reception unit 4101 from the home server to which the ticket transmission request was transmitted, the control unit 4102 does not perform license ticket transmission with that home server. On the other hand, when the home server to which the ticket transmission request was transmitted permits transmission of the license ticket, the control unit 4102 receives a ticket reception request that includes the device ID of the home server via the communication unit 4104 from the home server.

Having received the ticket reception request, the control unit 4102 extracts the device ID of the home server from the received ticket reception request. The control unit 4102 also reads all the registered device IDs from a valid device information area 4112 in the storage unit 4106.

The control unit 4102 judges whether a device ID that matches the device ID extracted from the ticket reception request exists among the device IDs read from the valid device information area 4112. When a matching device ID does not exist, the control unit 4102 transmits a signal showing refusal of transmission of the license ticket, via the communication unit 4104 to the home server. When a matching device ID exists, the control unit 4102 transmits the license ticket received from the license ticket distribution server 2000, via the communication unit 4104 to the home server.

Specifically, as shown in FIG. 23, three device IDs (SID_01 (4114), SID_02 (4115) and SID_03 (4116)) are registered in the valid device information area 4112. Therefore, the control unit 4102 transmits the license ticket only if the device ID extracted from the ticket reception request is one of these three device IDs.

(2) Storage Unit 4106

The storage unit 4106 includes the device ID area 4111 and the valid device information area 4112.

The device ID area 4111 pre-stores TID_01 (4113) which is the device ID of the mobile telephone 1 (4100). TID_01 (4113) is, for instance, a unique manufacturing number written in the device ID area 4111 at the time of manufacturing the mobile telephone 1 (4100), or the telephone number of the mobile telephone 1 (4100).

The valid device information area 4112 pre-stores information for identifying one or more home servers to which transmission is permitted of a license ticket that the mobile telephone 1 (4100) has received from the license ticket distribution server 2000. As shown in FIG. 23, SID_01 (4114), which is the device ID of the home server 1 (5100), SID_02 (4115), which is the device ID of the home server 2 (5200), and SID_03 (4116), which is the device ID of the home server 3 (5300), are registered in the valid device information area 4112. The home servers 1 (5100), 2 (5200) and 3 (5300) are described later. Note that the device IDs are assumed to be pre-registered in the valid device information area 4112 by a user operation.

4-2 Mobile Telephone 2 (4200)

The mobile telephone 2 (4200) is a mobile telephone possessed by a different family member to the user who possesses the mobile telephone 1 (4100).

Figure 25:
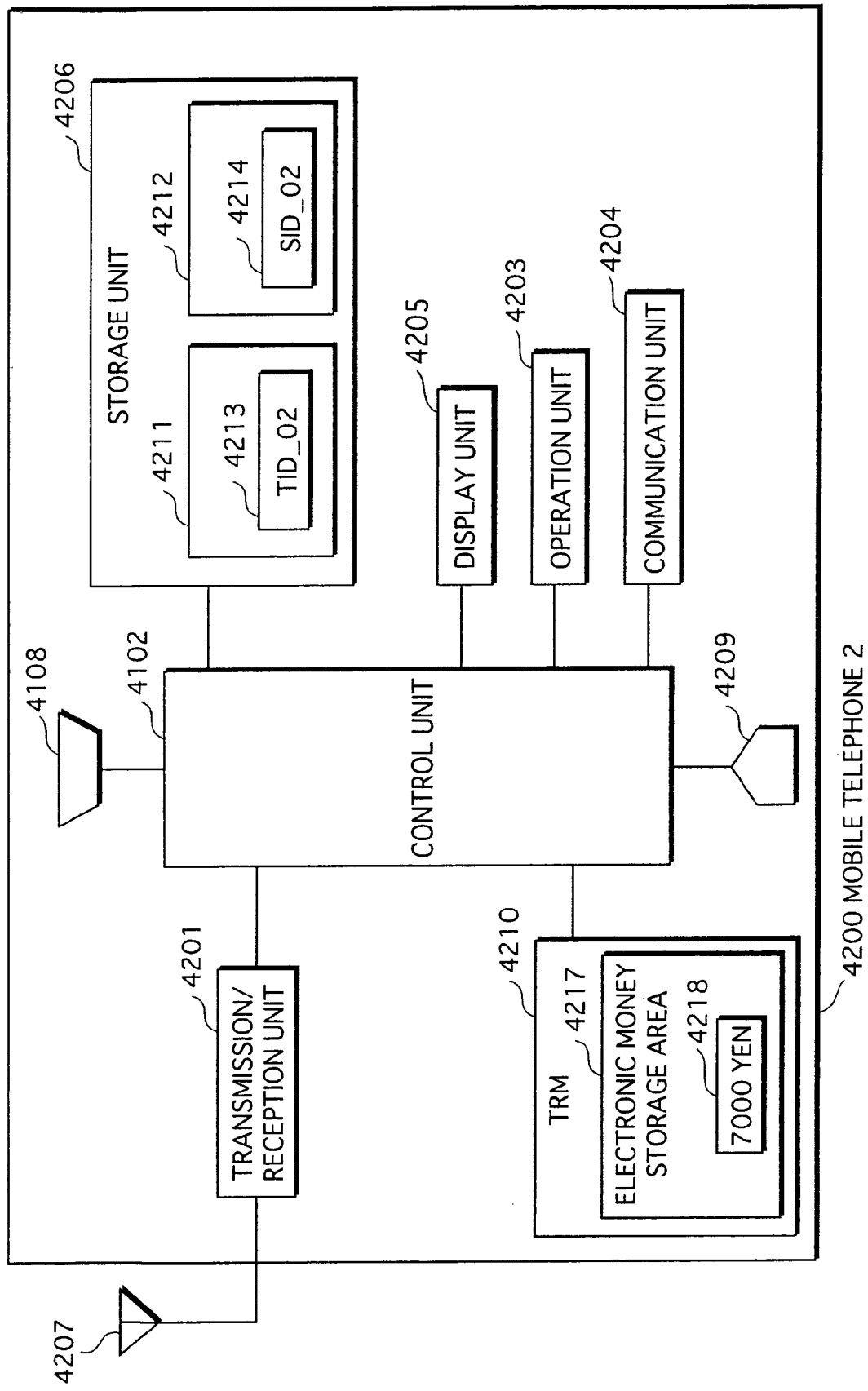
FIG. 25 is a function block diagram showing the structure of a mobile telephone 2 (4200) functionally.

FIG. 25 is a function block diagram showing the structure of the mobile telephone 2 (4200) functionally.

As shown in FIG. 25, the mobile telephone 2 (4200) is composed of a transmission/reception unit 4201, a control unit 4202, an operation unit 4203, a communication unit 4204, a display unit 4205, a storage unit 4206, an antenna 4207, a speaker 4208, a microphone 4209 and a TRM 4210. The TRM 4210 includes an electronic money storage area 4217 in which is stored electronic money information 4218 showing "7000 yen". Note that the electronic money deposit apparatus 7000 is used to store the electronic money information 4218 in the electronic money storage area 4217.

Although the mobile telephone 2 (4200) has the same structure and functions as the mobile telephone 1 (4100), the information stored in the storage unit 4206 differs from the mobile telephone 1 (4100). As shown in FIG. 25, the storage unit 4206 has a device ID area 4211 and a valid device information area 4212.

The device ID area 4211 pre-stores TID_02 (4213) which is the device ID of the mobile telephone 2 (4200). As with TID_01, TID_02 (4213) is, for instance, a unique manufacturing number written in the device ID area 4211 at the time of manufacturing the mobile telephone 2 (4200), or the telephone number of the mobile telephone 2 (4200).

The valid device information area 4212 pre-stores information for identifying one or more home servers to which transmission is permitted of a license ticket that the mobile telephone 2 (4200) has received from the license ticket distribution server 2000. As shown in FIG. 25, SID_02 (4214), which is the device ID of a home server 2 (5200) (described later), is registered in the valid device information area 4212. Therefore, the mobile telephone 2 (4200) transmits a license ticket only when the device ID extracted from the ticket reception request matches SID_02.

Note that as with the mobile telephone 1 (4100), the device ID is assumed to be pre-registered in the valid device information area 4112 by a user operation.

4-3 Mobile Telephone 3 (4300)

The mobile telephone 3 (4300) is a mobile telephone possessed by a different family member to the user who possesses the mobile telephone 1 (4100) and to the user who possesses the mobile telephone 2 (4200).

Figure 26:
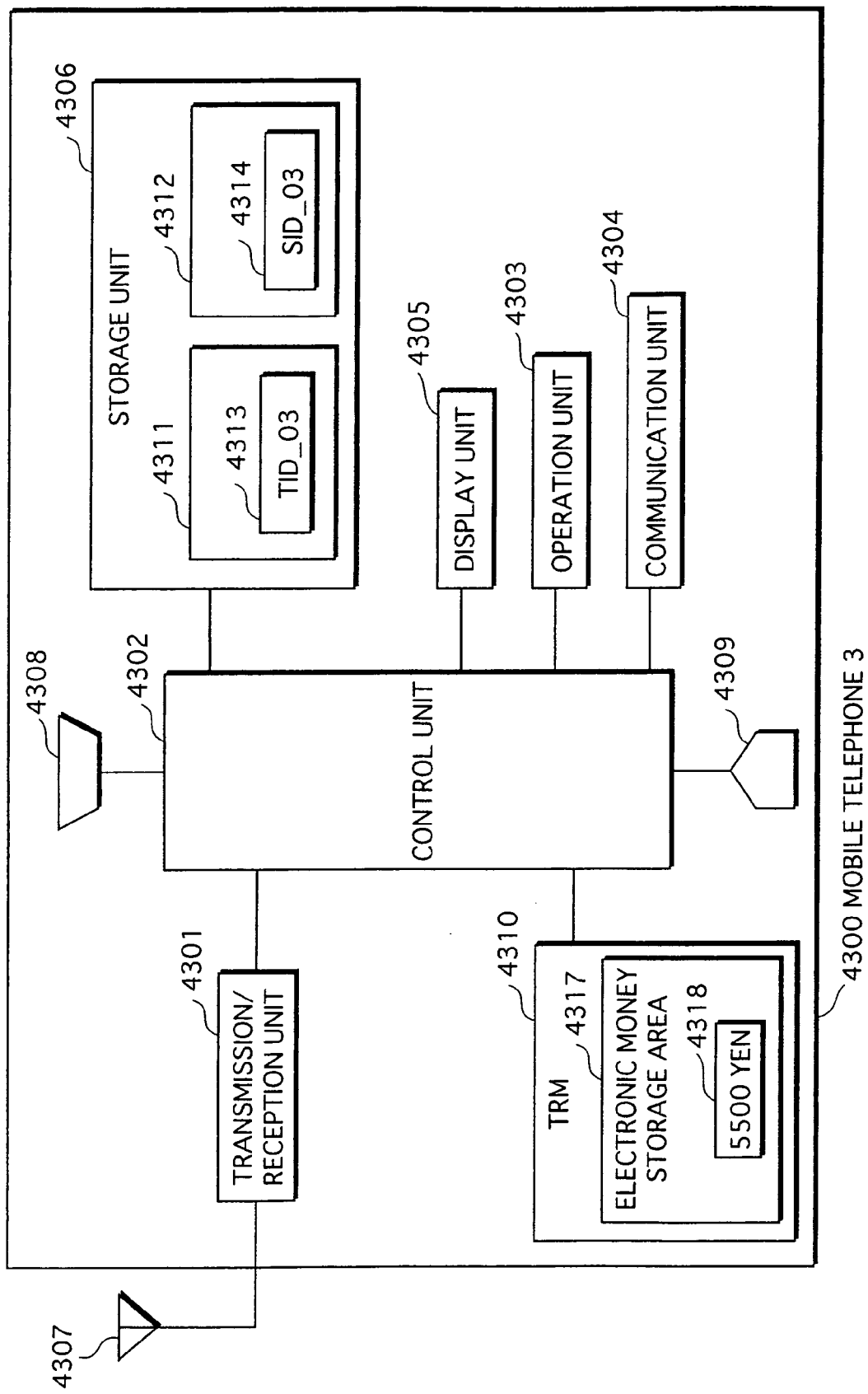
FIG. 26 is a function block diagram showing the structure of a mobile telephone 3 (4300) functionally.

FIG. 26 is a function block diagram showing the structure of the mobile telephone 3 (4300) functionally.

As shown in FIG. 26, the mobile telephone 3 (4300) is composed of transmission/reception unit 4301, a control unit 4302, an operation unit 4303, a communication unit 4304, a display unit 4305, a storage unit 4306, an antenna 4307, a speaker 4308, a microphone 4309 and a TRM 4310. The TRM 4310 includes an electronic money storage area 4317 in which is stored electronic money information 4318 showing "5500 yen". Note that the electronic money deposit apparatus 7000 is used to store the electronic money information 4318 in the electronic money storage area 4317.

Although the mobile telephone 3 (4300) has the same structure and functions as the mobile telephone 1 (4100) and the mobile telephone 2 (4200), the information stored in the storage unit 4306 differs from the mobile telephone 1 (4100) and the mobile telephone 2 (4200). As shown in FIG. 26, the storage unit 4306 has a device ID area 4311 and a valid device information area 4312.

The device ID area 4311 pre-stores TID_03 (4313) which is the device ID of the mobile telephone 3 (4300). As with TID_01 and TID_02, TID_03 (4313) is, for instance, a unique manufacturing number written in the device ID area 4311 at the time of manufacturing the mobile telephone 3 (4300), or the telephone number of the mobile telephone 3 (4300).

The valid device information area 4312 pre-stores information for identifying one or more home servers to which transmission is permitted of a license ticket that the mobile telephone 3 (4300) has received from the license ticket distribution server 2000. As shown in FIG. 26, SID_03 (4314), which is the device ID of the home server 3 (5300) (described later), is registered in the valid device information area 4312. Therefore, the mobile telephone 3 (4300) transmits a license ticket only when the device ID extracted from the ticket reception request matches SID_03.

Note that as with the mobile telephone 1 (4100) and the mobile telephone 2 (4200), the device ID is assumed to be pre-registered in the valid device information area 4312 by a user operation.

5. Home Server 1 (5100), Home Server 2 (5200) and Home Server 3 (5300)

The following describes the structure of the home server 1 (5100), the home server 2 (5200) and the home server 3 (5300).

5-1 Home Server 1 (5100)

Figure 27:
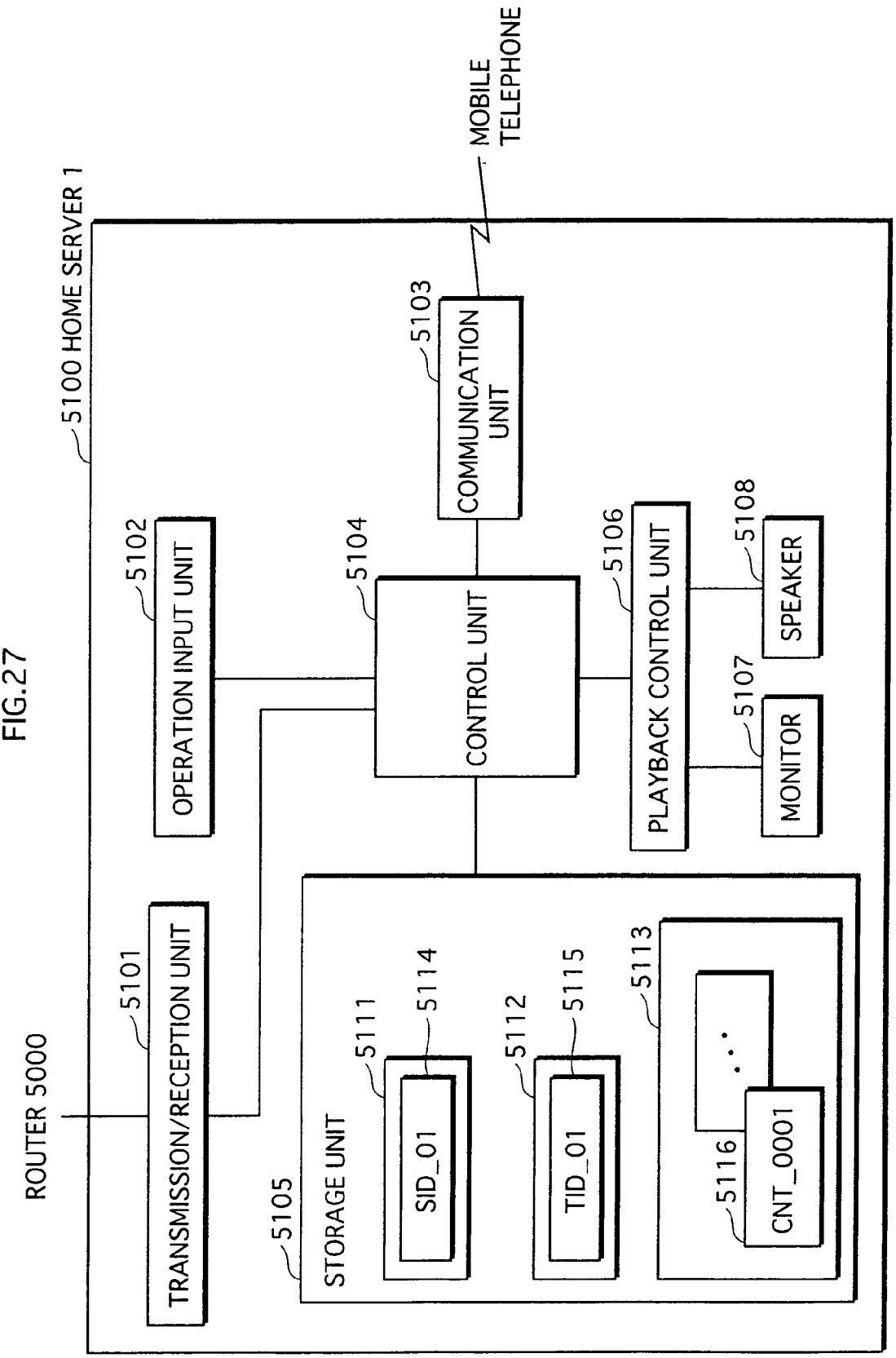
FIG. 27 is a function block diagram showing the structure of a home server 1 (5100) functionally.

FIG. 27 is a function block diagram showing the structure of the home server 1 (5100) functionally. As shown in FIG. 27, the home server 1 (5100) is composed of a transmission/reception unit 5101, an operation input unit 5102, a communication unit 5103, a control unit 5104, a storage unit 5105, a playback control unit 5106, a monitor 5107 and a speaker 5108.

As with the home server 50 described in the first embodiment, the home server 1 (5100), is a computer system composed of a microprocessor, a ROM, a RAM, a hard disk unit, a network connection unit, a display unit, a keyboard, a mouse, and so on, and is assumed to be a personal computer in the present case. Note that the home server 1 (5100) is not limited to being a personal computer, but may be a hard disk recorder or any other kind of apparatus that obtains and plays content.

Note that the home server 1 (5100) is assumed to be installed in a room in a home.

(1) Transmission/Reception Unit 5101

The transmission/reception unit 5101 is the network connection unit, and has a function of connecting to the network 6000 via the router 5000.

The transmission/reception unit 5101 receives, from the control unit 5104, a content request that includes a content ID. The transmission/reception unit 5101 transmits the received content request via the router 5000 and the network 6000 to the content distribution server 1000. Furthermore, the transmission/reception unit 5101 receives, from the content distribution server 1000, encrypted content corresponding to the content request, and outputs the received encrypt content to the control unit 5104.

(2) Operation Input Unit 5102

The operation input unit 5102 is composed of a keyboard, a mouse and so on. The operation input unit 5102 receives a selection of content by the keyboard and the mouse being operated by a user. Specifically, while viewing the content distributor's website displayed on the monitor 5107, the user selects the desired content. The website displayed on the monitor 5107 shows, for instance, a title, a subtitle, performers, a creator, a comment, and corresponding license ticket information (ticket number, number of times viewable, price) for each of a plurality of contents. The user uses the mouse or the like to select a title of one of the contents displayed on the monitor 5107.

The operation input unit 5102 obtains the content ID of the selected content, and outputs the obtained content ID to the control unit 5104.

(3) Communication Unit 5103

The communication unit 5103 has a function of performing short-range wireless communication with the mobile telephone 1 (4100), the mobile telephone 2 (4200) and the mobile telephone 3 (4300).

The communication unit 5103 receives a ticket transmission request transmitted by one of the mobile telephones using short-range wireless communication. On receiving the ticket transmission request, the communication unit 5103 outputs the received ticket transmission request to the control unit 5104. The communication unit 5103 also receives a license ticket from the mobile telephone, and outputs the received license ticket to the control unit 5104.

(4) Control Unit 5104

The control unit 5104 is composed of a microprocessor, a ROM, a RAM and so on, and controls the home server 1 (5100) overall.

The control unit 5104 receives a content ID from the operation input unit 5102. On receiving the content ID, the control unit 5104 generates a content request that includes the received content ID, and transmits the generated content request via the router 5000 and the network 6000 to the content distribution server 1000. Furthermore, the control unit 5104 receives encrypted content that has been generated by encrypting the content that has the content ID, from the content distribution server 1000 via the network 6000, the router 5000 and the transmission/reception unit 5101. The control unit 5104 stores the encrypted content in a content area 5113 of the storage unit 5105.

As one example, the control unit 5104 transmits a content request that includes the content ID "ID_0001" to the content distribution server 1000, and receives encrypted content "CNT_0001" that has been generated by encrypting content identified by the content ID "ID_0001" from the content distribution server 1000.

Furthermore, the control unit 5104 receives a ticket transmission request via the communication unit 5103 from the mobile telephone. The control unit 5104 extracts the device ID of the mobile telephone from the received ticket transmission request. The control unit 5104 also reads all the registered device IDs from the valid device information area 5112 of the storage unit 5105.

The control unit 5104 judges whether a device ID that matches the device ID extracted from the ticket reception request exists among the device IDs read from the valid device information area 5112. When a matching device ID does not exist, the control unit 5104 transmits a signal showing refusal of transmission of the license ticket, via the communication unit 5104 to the mobile telephone.

When a matching device ID exists, the control unit 5104 reads the SID_01 (5114), which is the device ID of the home server 1 (5100), from a device ID area 5111 of the storage unit 5105. The control unit 5104 generates a ticket reception request that includes the read SID_01 (5114). The control unit 5104 transmits the generated ticket reception request via the communication unit 5103 to the mobile telephone.

As shown in FIG. 27, TID_01 (5115), which is the device ID of the mobile telephone 1 (4100), is stored in the valid device information area 5112. Therefore, the home server 1 (5100) transmits the ticket reception request only when the device ID extracted from the ticket transmission request is TID_01 (5115).

Furthermore, the control unit 5104 receives the license ticket via the communication unit 5103 from the mobile telephone 1 (4100). The control unit 5104 extracts the content key and the copyright information from the received license ticket, and outputs the extracted content key and copyright information to the playback control unit 5106.

(5) Storage Unit 5105

Specifically, the storage unit 5105 is made up of a hard disk unit and the like. As shown in FIG. 27, the storage unit 5105 is composed of the device ID area 5111, the valid device information area 5112 and a content area 5113.

The device ID area 5111 pre-stores SID_01 (5114), which is the device ID of the home server 1 (5100). SID_01 (4113) is, for instance, a unique manufacturing number written in the device ID area 5111 at the time of manufacturing the home server 1 (5100), or the network address of the home server 1 (5100).

The valid device information area 5112 pre-stores information for identifying one or more mobile telephones that are communication parties from which reception of a license ticket is permitted. As shown in FIG. 27, TID_01 (5115), which is the device ID of the mobile telephone 1 (4100), is registered in the valid device information area 5112. Note that the device ID is assumed to be pre-registered in the valid device information area 5112 by a user operation.

The content area 5113 is an area for storing encrypted content. The content area 5113 receives, from the control unit 5104, encrypted content that the control unit 5104 has obtained via the transmission/reception unit 5101, the router 5000 and the network 6000 from the content distribution server 1000, and stores the received encrypted content. As shown in FIG. 27, the content area 5113 stores a plurality of encrypted contents such as encrypted content CNT_0001. Note that the encrypted content CNT_0001 is data that has been generated by encrypting content data identified by the content ID "ID_0001" with use of an encryption algorithm E.

(6) Playback Control Unit 5106

The playback control unit 5106 is composed of a decryption circuit, a video decoder, an audio decoder, and so on.

The playback control unit 5106 receives encrypted content, a content key and copyright information from the control unit 5104. Within the scope of the received copyright information, the playback control unit 5106 applies a decryption algorithm D to the encrypted content using the content key as the decryption key, thereby generating content. Note that the decryption algorithm D is an algorithm for converting a cipher text generated according to an encryption algorithm E into a plaintext.

Furthermore, the playback control unit 5106 separates video data and audio data from the generated content, and by decoding the video data and the audio data, generates a video signal and an audio signal, respectively. The playback control unit 5106 outputs the generated video signal to the monitor 5107 and the audio signal to the speaker 5108.

(7) Monitor 5107 and Speaker 5108

The monitor 5107 receives the video signal from the playback control unit 5106, and outputs received video signal.

The speaker 5108 receives the audio signal from the playback control unit 5106, and outputs the audio signal.

5-2 Home Server 2 (5200).

The home server 2 (5200) is assumed to be installed in a different room of the home to the room in which the home server 1 (5100) is installed.

Figure 28:
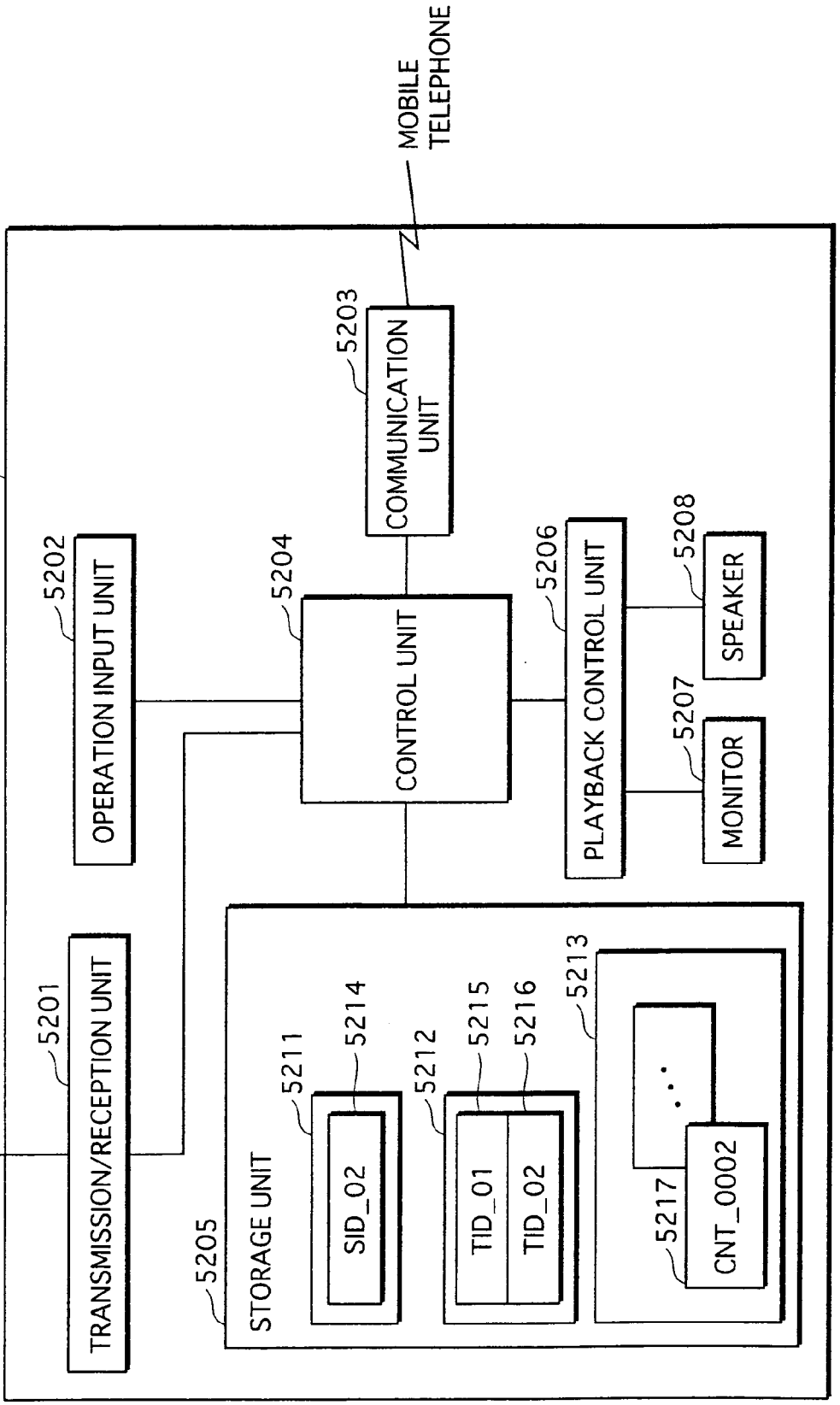
FIG. 28 is a function block diagram showing the structure of a home server 2 (5200)

FIG. 28 is a function block diagram showing the structure of the home server 2 (5200) functionally.

As shown in FIG. 28, the home server 2 (5200) is composed of a transmission/reception unit 5201, an operation input unit 5202, a communication unit 5203, a control unit 5204, a storage unit 5205, a playback control unit 5206, a monitor 5207 and a speaker 5208.

Although the home server 2 (5200) has the same structure and functions as the home server 1 (5100), the information stored in the storage unit 5205 is different to that in the home server 1 (5100). As shown in FIG. 28, the storage unit 5205 has a device ID area 5211, a valid device information storage area 5212 and a content area 5213.

The device ID area 5211 pre-stores SID_02 (5214) that is the device ID of the home server 2 (5200). As with SID_02 (5213), SID_01 (5214) is, for instance, a unique manufacturing number written in the device ID area 5211 at the time of manufacturing the home server 2 (5200), or the network address of the home server 2 (5200).

The valid device information storage area 5212 pre-stores information for identifying one or more mobile telephones that are communication parties from which reception of a license ticket is permitted. As shown in FIG. 28, TID_01 (5215), which is the device ID of the mobile telephone 1 (4100), and TID_02 (5216), which is the device ID of the mobile telephone 2 (4200), are registered in the valid device information area 5212. Therefore, the home server 2 (5200) transmits a ticket reception request if the device ID extracted from the ticket transmission request is TID_01 (5215) or TID_02 (5216). Note that as with the home server 1 (5100), the device IDs are assumed to be pre-registered in the valid device information area 5212 by a user operation.

The content area 5213 is an area for storing encrypted content. As shown in FIG. 28, the content area 5213 stores a plurality of encrypted contents such as encrypted content CNT_0002. Note that the encrypted content CNT_0002 is data that has been generated by encrypting content data identified by the content ID "ID_0002" with use of the encryption algorithm E.

5-3 Home Server 3 (5300)

The home server 3 (5300) is assumed to be installed in a different room of the home to the rooms in which the home server 1 (5100) and the home server 2 (5200) are installed.

Figure 29:
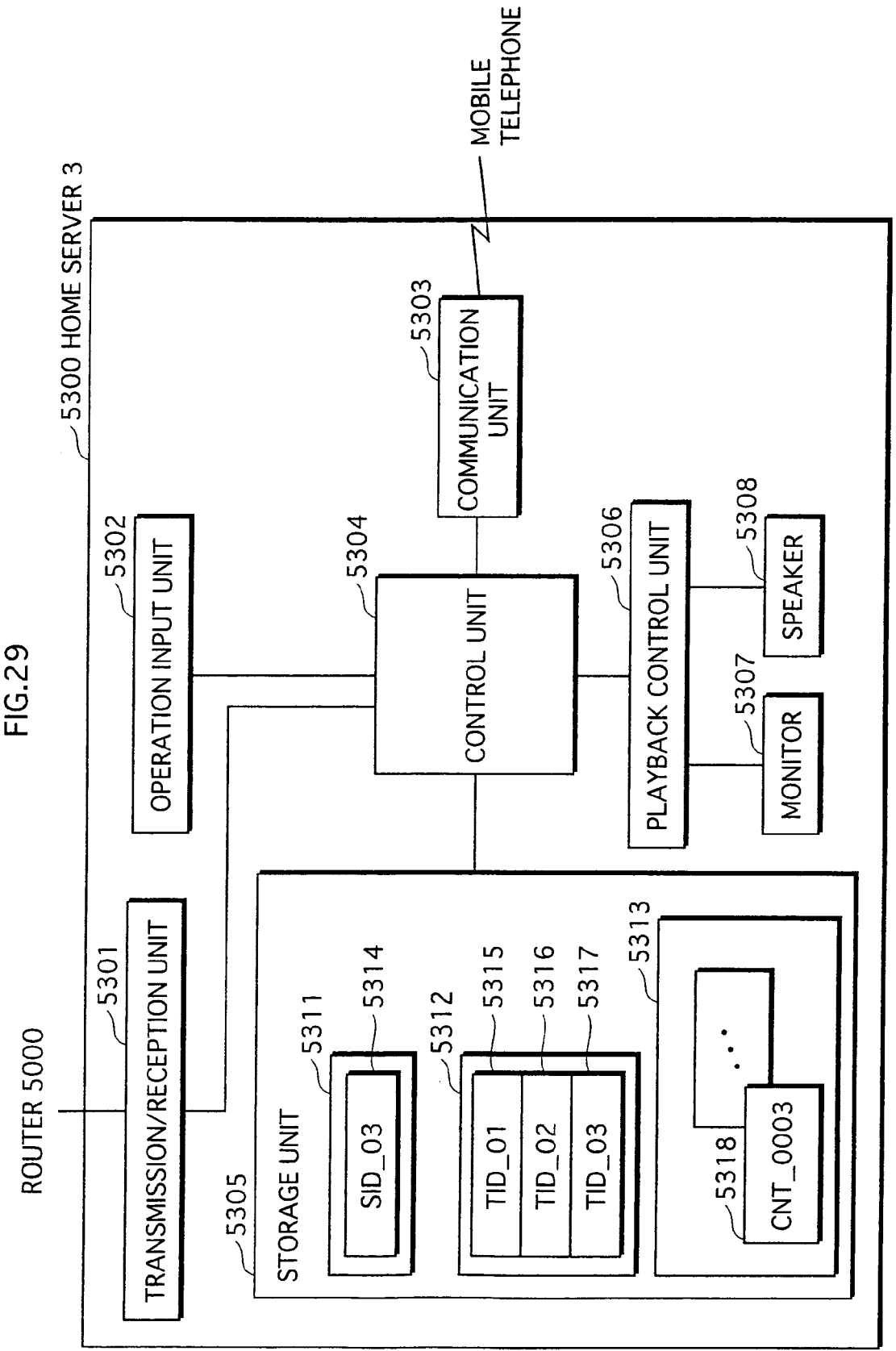
FIG. 29 is a function block diagram showing the structure of a home server 3 (5300)

FIG. 29 is a function block diagram showing the structure of the home server 3 (5300) functionally.

As shown in FIG. 29, the home server 3 (5300) is composed of a transmission/reception unit 5301, an operation input unit 5302, a communication unit 5303, a control unit 5304, a storage unit 5305, a playback control unit 5306, a monitor 5307 and a speaker 5308.

Although the home server 3 (5300) has the same structure and functions as the home server 1 (5100) and the home server 2 (5200), the information stored in the storage unit 5305 is different to the home server 1 (5100) and the home server 2 (5200). As shown in FIG. 29, the storage unit 5305 has a device ID area 5311, a valid device information storage area 5312 and a content area 5313.

The device ID area 5311 pre-stores SID_03 (5314) that is the device ID of the home server 3 (5300). As with SID_01, SID_03 (5314) is, for instance, a unique manufacturing number written in the device ID area 5311 at the time of manufacturing the home server 3 (5300), or the network address of the home server 3 (5300).

The valid device information storage area 5312 pre-stores information for identifying one or more mobile telephones that are communication parties from which reception of a license ticket is permitted. As shown in FIG. 29, TID_01 (5315), which is the device ID of the mobile telephone 1 (4100), and TID_02 (5316), which is the device ID of the mobile telephone 2 (4200), and TID_03 (5317), which is the device ID of the mobile telephone 3 (4300), are registered in the valid device information area 5312. Therefore, the home server 3 (5300) transmits a ticket reception request only if the device ID extracted from the ticket transmission request is TID_01 (5315), TID_02 (5316) or TID_03 (5317). Note that as with the home server 1 (5100), the device IDs are assumed to be pre-registered in the valid device information area 5312 by a user operation.

The content area 5313 is an area for storing encrypted content. As shown in FIG. 29, the content area 5313 stores a plurality of encrypted contents such as encrypted content CNT_0003. Note that the encrypted content CNT_0003 is data that has been generated by encrypting content data identified by the content ID "ID_0003" with use of the encryption algorithm E.

6. Electronic Money Deposit Apparatus 7000

Since the electronic money deposit apparatus 7000 has the same structure and functions as the electronic money deposit apparatus 30a described in the second embodiment, a description thereof is omitted.

<Operations>

The following describes operations of the settlement system 4.

1. Overall System Operations

Overall operations of the settlement system 4 are the same as the overall operations of the settlement system 2 shown in FIG. 13. The settlement system 4 first performs deposit processing for depositing electronic money information in the TRMs of the mobile telephone 1 (4100), the mobile telephone 2 (4200) and the mobile telephone 3 (4300) (step S201), and then performs content usage processing such as content distribution, license ticket distribution, decryption and playback (step S202).

Note that a description of operations for the deposit processing at step S201 is omitted since this processing is the same as that shown in the flowchart in FIG. 14, with the electronic money deposit apparatus 30a being replaced with the electronic money deposit apparatus 7000, and the mobile telephone 40a being replaced with the mobile telephone 1 (4100), the mobile telephone 2 (4200) and the mobile telephone 3 (4300).

2. Operations for Content Usage Processing

Figure 30:
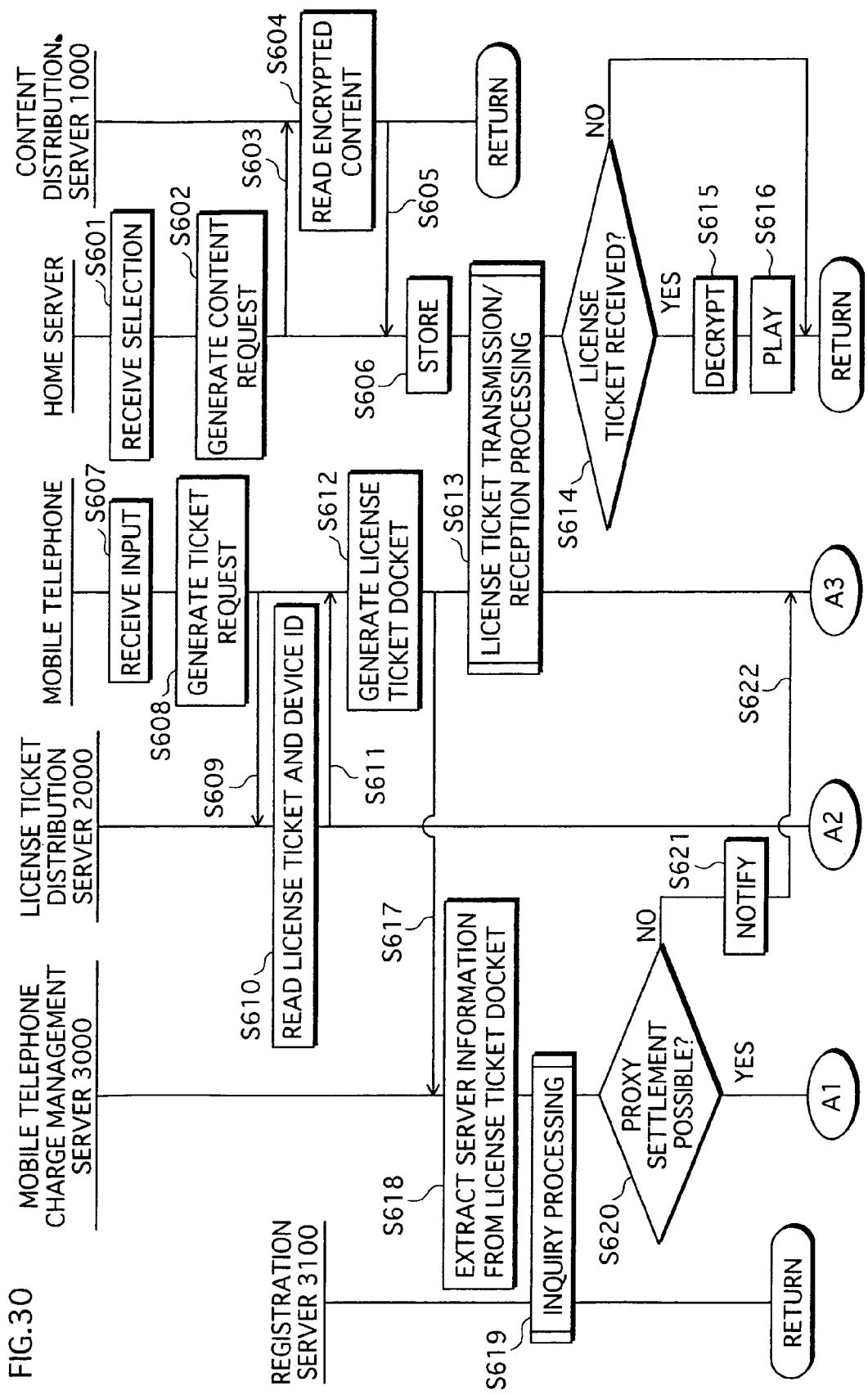
FIG. 30 is a flowchart showing operations for content usage in the settlement system 4, and continues in FIG. 31.
Figure 31:
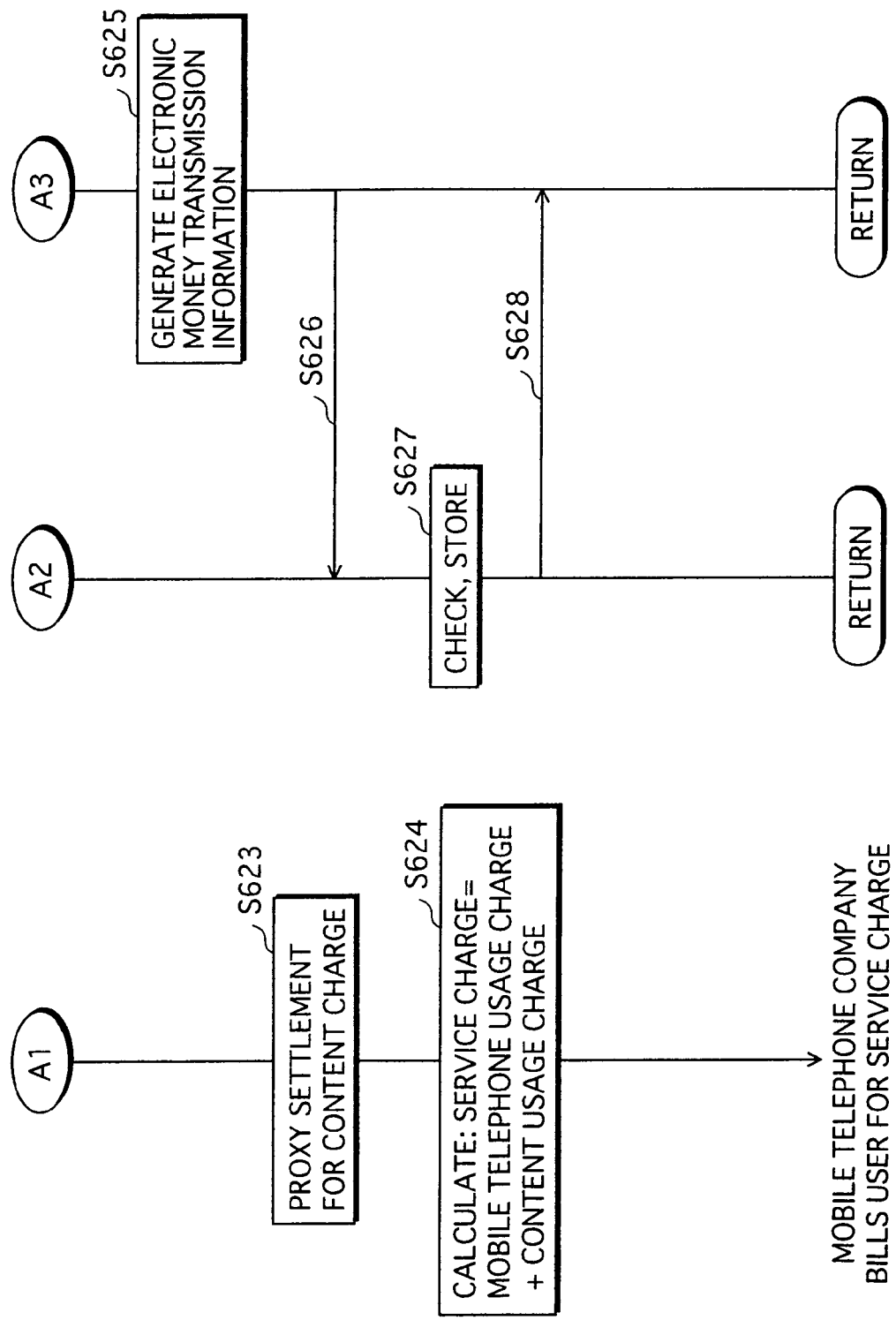
FIG. 31 is a flowchart showing operations for content usage in the settlement system 4, and continues from FIG. 30.

FIG. 30 and FIG. 31 are flowcharts showing operations of the settlement system 4 in content usage processing. The operations shown here are the details of step S202 of FIG. 13. Note that in FIG. 30 and FIG. 31, "mobile telephone" is used as a common name for the mobile telephone 1 (4100), the mobile telephone 2 (4200) and the mobile telephone 3 (4300), and "home server" is used as a common name for the home server 1 (5100), the home server 2 (5200) and the home server 3 (5300).

While viewing the content distributor's website using the home server, the user selects contents that he/she wishes to use. The home server receives the selection of content according user input (step S601).

The home server generates a content request that includes the content ID that identifies the content of which the selection was received (step S602), transmits the generated content request via the router 5000 and the network 6000 to the content distribution server 1000, and the content distribution server 1000 receives the content request (step S603).

The content distribution server 10 reads the content ID from the received content request, and reads the encrypted content identified by the read content ID from the content storage area (step S604). The content distribution server 1000 transmits the read encrypted content to the home server, and the home server receives the encrypted content (step S605). The home server 50 stores the received encrypted content internally (step S606).

Meanwhile, while viewing the content distributor's website displayed on the home server, the user inputs the license ticket number corresponding to the content selected at step S601 into the mobile telephone by pressing the buttons or the like.

The mobile telephone receives input of the ticket number (step S607), and generates a ticket request that includes the received ticket number (step S608). The mobile telephone transmits the generated ticket request via the gateway server 4000 and the network 6000 to the license ticket distribution server 2000, and the license ticket distribution server 2000 receives the ticket request (step S609).

The license ticket distribution server 2000 reads the ticket number from the received ticket request, and reads the license ticket that includes the read ticket number from the license ticket storage unit 2004. The license ticket distribution server 2000 also reads its own device ID "ID_2000" from the device ID storage unit 2010 (step S610).

The license ticket distribution server 2000 transmits the read license ticket and the ID_2000 via the network 6000 and the gateway server 4000 to the mobile telephone, and the mobile telephone receives the license ticket and the ID_2000 (step S611).

The mobile telephone generates a license ticket docket (see FIG. 24) showing that it has received the license ticket from the license ticket distribution server 2000 and that it is requesting proxy settlement for the license ticket (step S612). The mobile telephone transmits the generated license ticket docket via the gateway server 4000 and the network 6000 to the mobile telephone charge management server 3000, and the mobile telephone charge management server 3000 receives the license ticket docket (step S617).

Meanwhile, the mobile telephone and the home server perform transmission and reception processing of the license ticket that the mobile telephone received from the license ticket distribution server 2000 at step S611 (step S613).

If the home server does not receive the license ticket (NO at step S614), the processing returns to the processing of FIG. 13. If the home server receives the license ticket (YES at step S614), the home server decrypts the encrypted content stored at step S606, with use of the content key included in the license ticket (step S615). The home server plays the decrypted content within the scope of the copyright information in the license ticket (step S616).

Having received the license ticket docket from the mobile telephone at step S617, the mobile telephone charge management server 3000 performs inquiry processing with the registration server 3100 (step S619), and when proxy settlement is possible (YES at step S620), performs proxy settlement for the content charge (step S623). The mobile telephone charge management server 3000 subsequently adds the mobile telephone usage charge, which is made up of a call charge, a packet communication charge and the like, to the content charge for which proxy settlement was made at step S623, to calculate a service charge, and generates a bill 240 such as shown in FIG. 6 (step S624).

The communications enterprise subsequently bills the user for the service charge, based on the bill generated at step S624.

If, at step S620, proxy settlement is not possible (NO at step S620), the mobile telephone charge management server 3000 notifies the mobile telephone to that effect (step S621), and the mobile telephone receives the notification to the effect that proxy settlement is not possible (step S622).

Having received the notification to the effect that proxy settlement is not possible, the mobile telephone reads electronic money information equivalent to the content charge from the TRM, and generates electronic money transmission information that includes the electronic money information and the ticket number (step S625). The mobile telephone transmits the electronic money transmission information to the license ticket distribution server 2000 using short-range wireless communication, and the license ticket distribution server 2000 receives the electronic money transmission information (step S626).

The license ticket distribution server 2000 checks the contents of the electronic money received at step S626, and stores the electronic money included in the electronic money transmission information in the TRM (step S627). The license ticket distribution server 2000 subsequently transmits a reception confirmation signal showing that it has received the electronic money information, to the mobile telephone, and the mobile telephone receives the reception confirmation information (step S628).

3. Operations for License Ticket Transmission/Reception Processing

Figure 32:
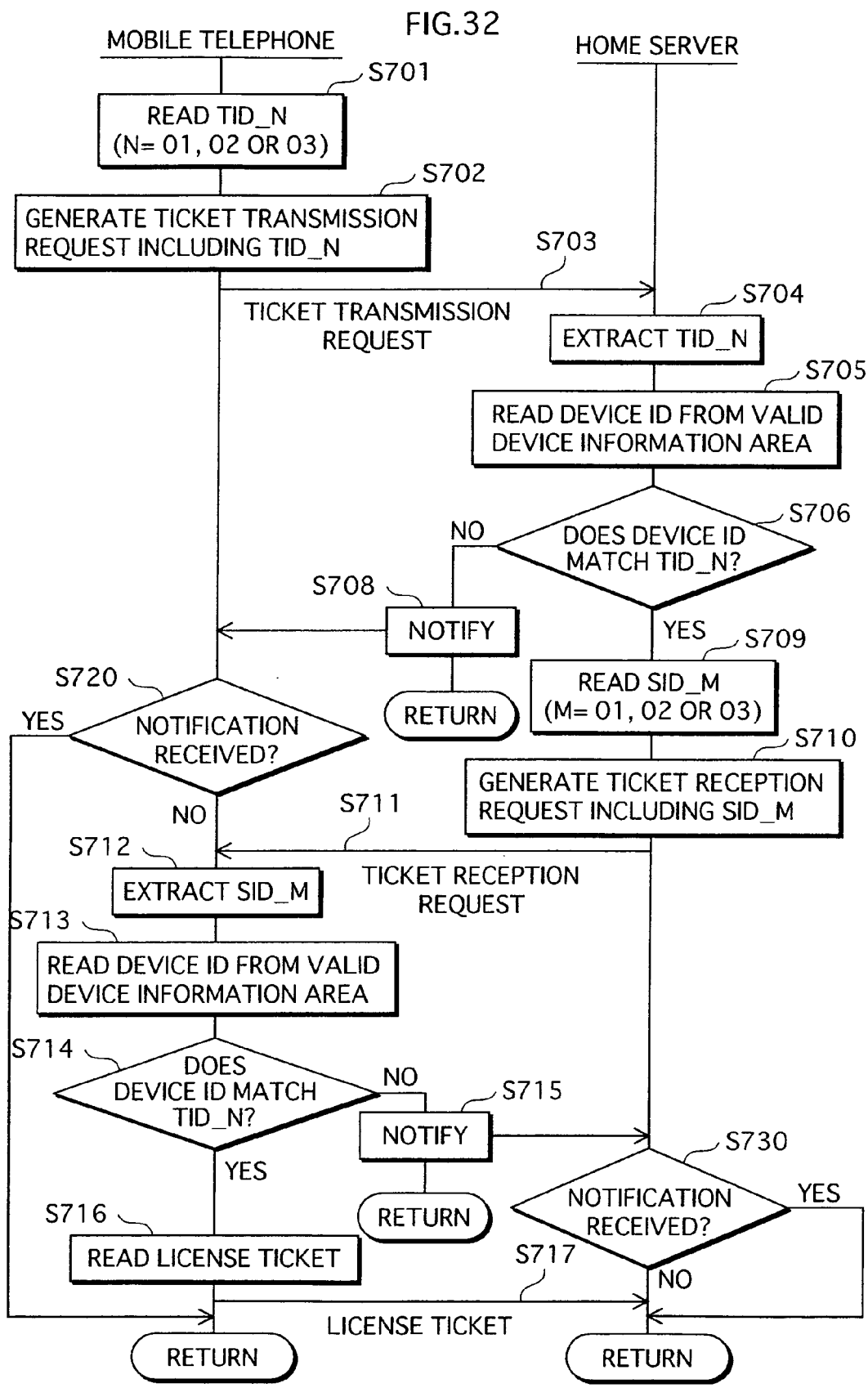
FIG. 32 is a flowchart showing operations for license ticket transmission/reception processing in the settlement system 4.

FIG. 32 is a flowchart showing operations of the mobile telephone and the home server in license ticket transmission and reception processing. Note that the operations shown here are the details of step S613 of FIG. 30.

The mobile telephone reads its own ID TID_N (where N is 01, 02 or 03) (step S701). The mobile telephone generates a ticket transmission request that includes the read TID_N (step S702), transmits the generated ticket transmission request to the home server using short-range radio communication, and the home server receives the ticket transmission request (step S703).

The home server extracts the TID_N from the received ticket transmission request (step S704), reads all the device IDs stored in the valid device information storage area (step S705), and judges whether or not a device ID exists that matches TID_N extracted at step S704. When a device ID that matches TID_N does not exist (NO at step S706), the home server transmits notification to that effect to the mobile telephone (step S708), and returns to the processing of FIG. 30.

When a device ID that matches TID_N exists (YES at step S706), the home server reads its own device ID SID_M (where M=01, 02 or 03) (step S709). The home server generates a ticket reception request that includes its own device ID SID_M (step S710), and transmits the generated ticket reception request to the mobile telephone using short-range radio communication (step S711).

When the mobile telephone has received notification from the home server at step S708 (YES at step S720), it returns to the processing in FIG. 30. When the mobile telephone has not received notification from the home server at step S708 (NO at step S720), it receives the ticket reception request transmitted at step S711.

The mobile telephone extracts SID_M from the received ticket reception request (step S712), reads all the device IDs stored in the valid device storage area (step S713), and judges whether or not a device ID exists that matches SID_M extracted at step S712. When a device ID that matches SID_M does not exist (NO at step S714), the mobile telephone transmits notification to that effect to the home server (step S715), and returns to the processing in FIG. 30.

When a device ID exists that matches SID_M extracted at step S712 (YES at step S714), the mobile telephone reads the license ticket received at step S611 (step S716), and transmits the read license ticket to the home server (step S717).

If the home server has received notification from the mobile telephone at step S715 (YES at step S730), the mobile telephone returns to the processing of FIG. 30. If the home server has not received notification from the mobile telephone at step S715 (NO at step S730), the mobile telephone transmits the ticket reception request received at step S717.

4. Operations for Inquiry Processing

Figure 33:
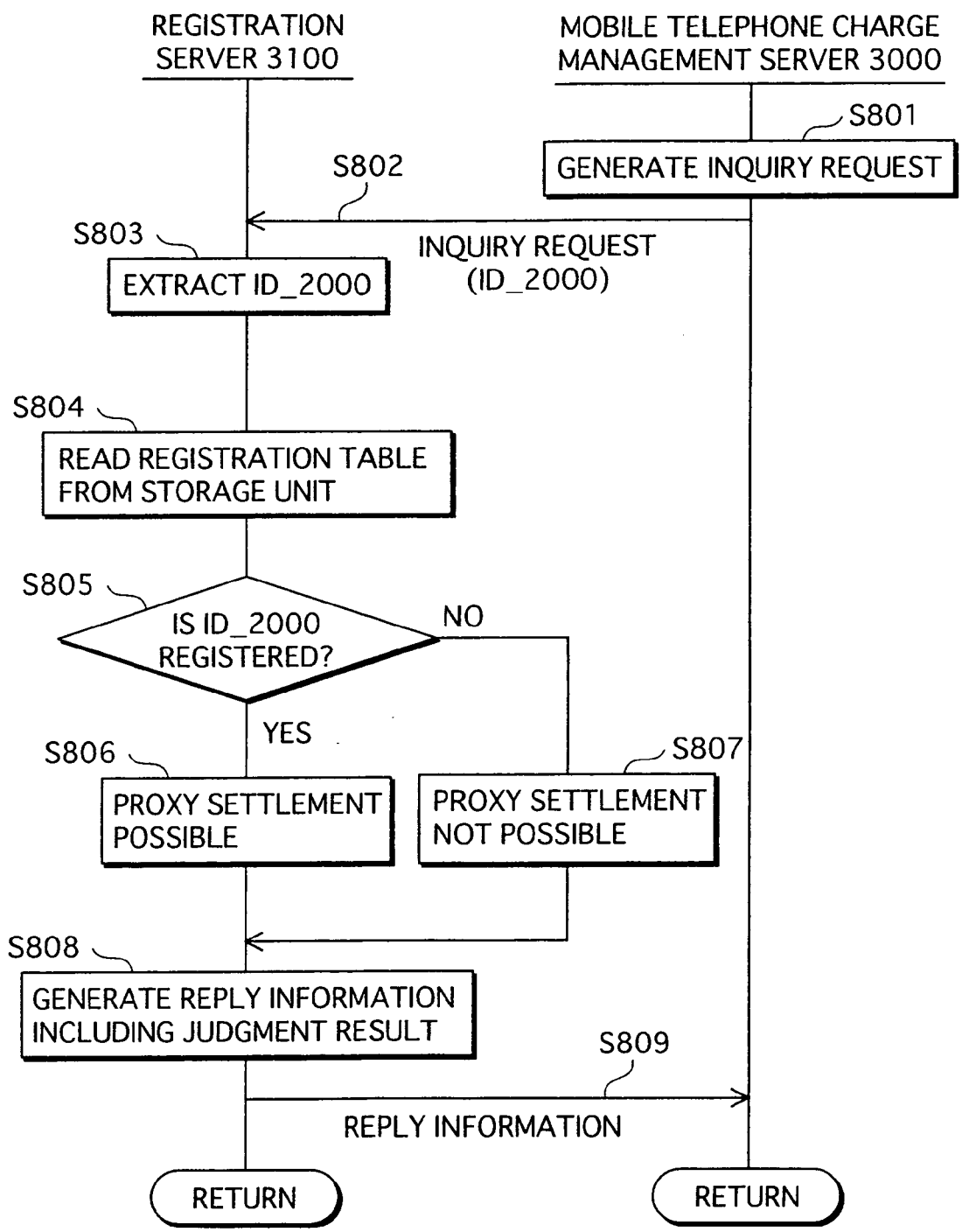
FIG. 33 is a flowchart showing operations for query processing in the settlement system 4.

FIG. 33 is a flowchart showing operations by the mobile telephone charge management server 3000 and the registration server 3100 in inquiry processing. Note that operations shown here are the details of step S619 of FIG. 30.

The mobile telephone charge management server 3000 generates an inquiry request that includes the enterprise identifier "ID_2000" included in the license ticket docket (step S801). The mobile telephone charge management server 3000 transmits the generated inquiry request via a LAN to the registration server 3100, and the registration server 3100 receives the inquiry request (step S802).

The registration server 3100 extracts the enterprise identifier ID_2000 from the received inquiry request (step S803), and reads the registration table 3105 from the storage unit (step S804). The registration server 3100 judges whether an enterprise identifier that matches ID_2000 is registered in the registration table 3105.

When an enterprise identifier that matches ID_2000 is registered (YES at step S805), the registration server 3100 judges that proxy settlement is possible (step S806). When an enterprise identifier that matches ID_2000 is not registered (NO at step S805), the registration server 3100 judges that proxy settlement is not possible (step S807).

The registration server 3100 generates reply information that includes the judgment result of step S806 or step S807 (step S808). The registration server 3100 transmits the generated reply information to the mobile telephone charge management server 3000, and the mobile telephone charge management server 3000 receives the reply information (step S809).

<Conclusion>

Summarizing the above, the present invention is a settlement system in which a communications enterprise which provides service to a mobile information terminal performs proxy settlement for goods purchased by a user using the mobile information terminal, the settlement system including: a goods provision apparatus that receives a purchase request from the mobile information terminal, and provides the goods to the mobile information terminal; the mobile information terminal that transmits the purchase request for the goods to the goods provision apparatus, and transmits, to a settlement apparatus owned by the communications enterprise, settlement request information showing a request for proxy settlement for the goods; and the settlement apparatus that, upon receiving the settlement request information, performs proxy settlement for the goods with the provider of the goods, and performs settlement for the service and settlement for the goods with the user.

According to this structure, it is unnecessary to transmit/receive the settlement request information between the goods provision apparatus and the settlement apparatus because the settlement request information is transmitted/received between the mobile information terminal and the settlement apparatus. Therefore, the user is able to use the proxy settlement service without relying on the enterprise that provides the goods that he/she wishes to purchase.

Here, the settlement system may further includes a playback apparatus that plays content, wherein the goods are a license ticket that shows a playback right for content, the mobile information terminal receives the license ticket from the goods provision server, and outputs the received license ticket to the playback apparatus, and the playback apparatus receives the license ticket from the mobile information terminal, and plays the content based on the received license ticket.

According to this structure, the user is able to use the proxy settlement service without relying on the content distributor.

One possible example is a content distributor or the like that has only recently gone into business has a relatively low degree of trust in society. Proxy settlement for a license ticket is possible with the present system even in a case in which the user wishes to have content distributed from such a content distributor. If the settlement for content or a license ticket showing usage rights for content can be performed easily by proxy settlement, the content distribution service will be even more readily embraced by users.

Furthermore, the present invention is a mobile information terminal used in purchasing goods, wherein the mobile information terminal transmits a purchase request for the goods to an external goods provision apparatus, transmits settlement request information that shows a request for proxy settlement for the goods, to a settlement apparatus owned by a communications enterprise that provides service to the mobile information terminal, and performs settlement for the service and settlement for the goods with the settlement apparatus.

According to this structure, the settlement request information is transmitted from the mobile information terminal to the settlement apparatus possessed by the communications enterprise, the user is able to use proxy settlement service without relying on the enterprise that provides the goods that he/she wishes to purchase.

Here, the goods may be a license ticket that shows a playback right for the content, the mobile information terminal may receive the license ticket, transmit, to the settlement apparatus, settlement request information that shows a request for proxy settlement of the license ticket, and transmit the received license ticket to an external playback apparatus that plays the content.

According to this structure, the user is able to use proxy settlement service for the received license ticket without relying on the content distributor.

Here, the license ticket may include key information for decrypting encrypted content that has been generated by encrypting content, and the mobile information terminal may transmit the license ticket to the playback apparatus using short-range radio communication.

According to this structure, the user is able to purchase, as the goods, key information for decrypting encrypted content, and is able to use the proxy settlement service of the communications enterprise.

Here, the license ticket may include copyright information that shows how many times the content can be played.

According to this structure, the user is able to purchase, as the goods, key information for decrypting encrypted content and copyright information showing how many times the content can be played, and is able to use the proxy settlement service of the communications enterprise.

Here, the mobile information terminal may, on receiving the license ticket, transmit the settlement request information which includes ticket identification information and price information to the settlement apparatus, the ticket identification information being for identifying the license ticket and the price information showing a cost for the license information.

According to this structure, the settlement apparatus is able to perform proxy settlement for the license ticket reliably due to the ticket identification information and the price information being included in the settled information that the mobile information terminal transmits to the settlement apparatus.

Furthermore, the present invention is a mobile information terminal that includes a storage area that is tamper-resistant and that cannot be read or tampered with from outside, wherein the mobile telephone obtains a license ticket showing a playback right for content, performs proxy settlement for the license ticket with use of electronic money stored in the storage area, and outputs the obtained license ticket.

According to this structure, settlement for the license ticket showing playback rights for the content is performed using the user's mobile information terminal, without going through a credit card company or the like. Therefore, the system can also be embraced by users who have concerns such as the leaking of personal information from credit card companies.

Here, the mobile information terminal may further include a radio unit for performing communication by short-range radio communication, wherein the mobile information terminal performs settlement by transmitting, via the radio unit, electronic money information to an apparatus that transmits the license ticket, and outputs the license ticket to an external playback apparatus that plays the content.

According to this structure, since the mobile information terminal transmits the electronic money using short-range radio communication, the risk that the electronic money information will be stolen by a third party is low.

Here, the license ticket may include key information for decrypting the encrypted content, and the mobile information terminal may further store encrypted content that has been generated by encrypting the content with use of the key information, decrypt the encrypted content with use of the obtained license ticket, and play the decrypted content.

According to this structure, the user is able to use the mobile information terminal to use the content.

Here, the encrypted content may be recorded on a portable memory card, and the mobile information terminal may read the encrypted content from the memory card, and decrypt the encrypted content using the key information included in the license ticket as a decryption key.

According to this structure, the user is able to use the mobile information terminal to use content stored on a portable memory card.

Furthermore, the present invention is a settlement apparatus used by a communications enterprise that provides service to a mobile information terminal to perform settlement for the service, wherein the settlement apparatus receives, from the mobile terminal, settlement request information showing a request for proxy settlement relating to goods other than service provided by the communications enterprise, performs proxy settlement for the goods with a provider of the goods based on the received settlement request information, and performs settlement for the service and settlement for the goods with a user of the mobile information terminal.

According to this structure, the communications enterprise performs proxy settlement having received settlement request information transmitted by the mobile information terminal that subscribes to the communications enterprise's service. Therefore, the communications enterprise can provide the proxy settlement service to the user without detailed investigations into whether or not the enterprise that provides the goods to the user's mobile information terminal can be trusted.

Furthermore, the present invention is a settlement system, including: a reception unit that receives, from a mobile information terminal, settlement request information showing a request for proxy settlement relating to a usage right for content purchased from a server apparatus using the mobile information terminal; a judgment unit that, on the reception unit receiving settlement receiving the settlement request information, judges, based on identification information that identifies a provider of the content, whether or not proxy settlement relating to the usage right for the content is permitted; a proxy settlement unit that, when the judgment unit judges that proxy settlement is permitted, performs proxy settlement relating to the usage right for the content with the server apparatus; and a settlement unit that performs settlement relating to the usage right for the content with a user of the mobile information terminal.

According to this structure, even if settlement request information is received, the settlement system performs proxy settlement only after judging whether or not to perform proxy settlement and determining that proxy settlement is permitted. Therefore, the risk involved with settlement is relatively low compared with if proxy settlement is performed with respect to all received settlement request information.

Furthermore, when a request is made to the settlement system for proxy settlement and the proxy settlement is permitted, settlement is performed without going through a credit card company or the like. Therefore, the system can also be embraced by users who have concerns such as the leaking of personal information from credit card companies.

Here, the judgment unit may include: a storage sub-unit that stores good provider information that identifies a trusted content provider; and an obtaining sub-unit that obtains the identification information from the settlement request information; and a determination sub-unit that determines whether or not the identification information matches the good provider information, and determines that proxy settlement is permitted when the determination is affirmative, and determines that proxy settlement is not permitted when the determination is negative.

According to this structure, since the settlement system performs proxy settlement only with trusted content providers, a highly secure system can be constructed.

Here, the identification information may be an identifier of the server apparatus, and the good provider identification information may be an identifier of a server apparatus possessed by a trusted content provider.

According to this structure, the settlement system judges whether or not to perform proxy settlement based on the identifier of the server apparatus that provides the content. Therefore, the settlement system performs proxy settlement only with trusted content providers, and a highly secure system can be constructed.

Here, the identification information may be a network address of the server apparatus, and the good provider identification information may be a network address of a server apparatus possessed by a trusted content provider.

According to the stated structure, the settlement system judges whether or not to perform proxy settlement based on the network address of the server apparatus that provides the content. Therefore, the settlement system performs proxy settlement only with trusted content providers, and a highly secure system can be constructed.

Here, the settlement system may include a notification unit that, when the determination sub-unit determines that proxy settlement is not permitted, notifies the mobile information terminal to that effect.

According to this structure, by the settlement system notifying the mobile information terminal that proxy settlement is not possible in such a case, the user is able to know that settlement should be performed using means other than proxy settlement.

Here, the settlement system may be composed of a settlement apparatus and a registration apparatus that are possessed by a communication enterprise that provides service to the mobile information terminal, wherein the settlement apparatus includes the reception unit; an inquiry unit that extracts the identification information from the received settlement request information, transmits the extracted identification information to the registration server, and inquires whether or not proxy settlement for the content is permitted; and the settlement unit, and the registration server includes the judgment unit.

According to the stated structure, even if settlement request information is received, the settlement apparatus performs proxy settlement only after inquiring to the registration server as to whether or not to perform proxy settlement and determining that proxy settlement is permitted. Therefore, the risk involved with settlement is relatively low compared with if proxy settlement is performed with respect to all received settlement request information.

Here, the judgment unit may include: a storage sub-unit that stores good provider information that identifies a trusted content provider; and a reception sub-unit that receives the identification information from the settlement request information; a determination sub-unit that determines whether or not the identification information matches the good provider information, and determines that proxy settlement is permitted when the determination is affirmative, and determines that proxy settlement is not permitted when the determination is negative; and a transmission sub-unit operable to transmit a result determined by the determination unit to the mobile information terminal.

Here, the identification information may be an identifier of the server apparatus, and the good provider identification information may be an identifier of a server apparatus possessed by a trusted content provider.

Here, the identification information may be a network address of the server apparatus, and the good provider identification information may be a network address of a server apparatus possessed by a trusted content provider.

Here, the settlement system may include a notification unit that, when the determination sub-unit determines that proxy settlement is not permitted, notifies the mobile information terminal to that effect.

Furthermore, the present invention is a license settlement system in which settlement for a usage right of content purchased by a user using a mobile information terminal is performed, the license settlement system including: a server apparatus that receives a purchase request from the mobile information terminal and provides content mobile information terminal; the mobile information terminal that transmits the purchase request for the content to the server apparatus, and transmits settlement request information that shows a request for proxy settlement for the content, to a settlement apparatus owned by a communications enterprise that provides service to the mobile information terminal; and the settlement apparatus that receives the settlement request information, judges whether or not to permit proxy settlement for the content, and when proxy settlement is judged to be permitted, performs proxy settlement for the content with the server apparatus and performs proxy settlement for the content with the user.

According to the stated structure, even if settlement request information is received, the settlement apparatus performs proxy settlement only after judging whether or not to perform proxy settlement and determining that proxy settlement is permitted. Therefore, the risk involved with settlement is relatively low compared with if proxy settlement is performed with respect to all received settlement request information.

Here, when judging not to permit proxy settlement, the settlement apparatus may notify the mobile information terminal to that effect, and the mobile information terminal may store electronic money in a storage area that is tamper-resistant and that cannot be read or tampered with from outside, and, when the information is received from the settlement apparatus, perform settlement for the content with use of the electronic money.

According to the stated structure, settlement for the license ticket showing playback rights for the content is performed using the user's mobile information terminal if proxy settlement by the settlement apparatus is not permitted, without going through a credit card company or the like. Therefore, the system can also be embraced by users who have concerns such as the leaking of personal information from credit card companies.

Modifications

Although the present invention has been described based on the first embodiment through to the fourth embodiment, the present invention is by no means limited to the described embodiments, and cases such as the following are included in the present invention.

(1) Although in the described embodiments the present invention is structured such that the user purchases a license ticket using the mobile telephone, the apparatus used by the user is not limited to being a mobile telephone, and may be a mobile information terminal such as a PDA (personal digital assistant) or a notebook computer, or an information terminal such as a desk top computer.

(2) Although in the described embodiments the license ticket is structured to include key information for decrypting content and copyright information showing how many times the content can be played, it is sufficient in the present invention for the license ticket to include at least the key information.

As one example, copyright information that shows how may times the content can be played, a copy restriction, or the like may be included in the license ticket in addition to the key information.

(3) Although the goods provided to the user are a license ticket relating to content in the described embodiments, the goods provided to the user in the present invention are by no means limited to being a license ticket, and any kind of goods may be provided with the present invention. Note that "goods" includes the concept of "service".

Furthermore, although the structure described in the embodiments is one in which the user receives provision of goods by the mobile telephone receiving the license ticket transmitted by the license ticket distribution server via the network, the provision of the goods is by no means limited to being via a network such as the described.

As one example, a case in which the apparatus that provides the goods to the user is an automatic vending machine instead of a license ticket distribution server and the goods provided to the user is canned coffee instead of a license ticket is included in the present invention.

(4) The following describes the aforementioned example in detail.

A settlement system 5 is described with use of FIG. 34 as a modification example of the present invention.

As shown in FIG. 34, the settlement system 5 is composed of a vending machine 20c, a mobile telephone change management server 30c and a mobile telephone 40c. The mobile telephone change management server 30c is connected to a network 60, and the mobile telephone 40c is able to connect to the network 60 via a gateway (not illustrated). Furthermore, the automatic vending machine 20c and the mobile telephone 40c are able to communicate with each other using short-range radio communication such as infrared communication.

The user transmits a purchase request for desired canned coffee to the automatic vending machine 20c by operating the buttons on an operation face of the mobile telephone 40c. On receiving the purchase request, the automatic vending machine 20c provides the canned coffee corresponding to the purchase request to the user. At this time, the automatic vending machine 20c transmits goods provision settlement information showing that canned coffee was provided to the user to the mobile telephone 40c. The goods provision settlement information includes information for specifying the enterprise that operates the automatic vending machine 20c and the price of the canned coffee provided to the user.

On receiving the goods provision settlement information, the mobile telephone 40c adds identification information such as its own telephone number or email address to the received goods provision settlement information, thereby generating settlement request information. The mobile telephone 40c transmits the generated settlement request information to the mobile telephone charge management server 30c via the network 60.

On receiving the settlement request information from the mobile telephone 40c, the mobile telephone charge management server 30c performs proxy settlement for the canned coffee provided to the user with the enterprise that operates the automatic vending machine 20c. In addition, the mobile telephone charge management server 30c bills the user for the charge of the canned coffee for which proxy settlement was made, together with other charges such as call charges and packet communication charges.

(5) In the present invention, a plurality of enterprises that provide content and license tickets to users may exist. In such a case, an enterprise code that specifies the enterprise may be incorporated in the ticket number of the license ticket.

With such a structure, the mobile telephone charge management server is able to specify the enterprise with which to perform proxy settlement because the enterprise code that specifies the enterprise is also included in the license ticket docket transmitted by the mobile telephone to the mobile telephone charge management server.

(6) The described embodiments may have a structure such that the home server obtains the encrypted content not from the content distribution server via the network 60, but from a portable recording medium on which the encrypted content is stored.

With such a structure, even if the home server is a device that cannot connect to the network 60, it is able to obtain the content key necessary for decrypting the encrypted content from the mobile telephone, decrypt the content using the obtained content key, and play the content. Furthermore, if the home server is in a state of being unable to connect to the network 60, it is able to obtain the content key from the mobile telephone, and decrypt and play the content.

(7) Settlement for the content charge in the first embodiment is structured such that the user is billed for the content charge together with the mobile telephone usage charge once a month. However, the user may be billed for the content usage charge separately to the mobile telephone usage charge.

(8) In the above embodiments, there is no limitation on the order in which (a) the processing for the home server to obtain encrypted content from the content distribution server and (b) the processing for the mobile telephone to obtain the license ticket from the license ticket distribution server are performed.

(9) In the second and third embodiments, the mobile telephone and the license ticket distribution server are structured so as to perform transmission/reception of the electronic money information via short-range radio communication, and transmission/reception of the ticket request and the license ticket via the network 60.

With this structure, the user is able to receive the license ticket via the network even if he/she is far apart from the license ticket distribution server as long as settlement has been made with the electronic money information stored in the mobile telephone.

However, it is not a requirement of the present invention that the license ticket is transmitted/received via the network. Instead, the license ticket may be transmitted/received via short-range radio communication.

(10) Furthermore, the license ticket distribution server in the second and third embodiments functions as a center for managing license tickets, is located in a convenience store, a shop or the like, and also functions as an information terminal (a so-called kiosk terminal) that communicates electronic money with user terminals. However, a case in which the license ticket distribution server is two independent apparatuses, in other words a center and a kiosk terminal, is included in the present invention.

The following describes a system in which the license ticket distribution server is composed of a center and a kiosk terminal.

The center manages a license ticket table such as that shown in FIG. 4.

The kiosk terminal is located at a convenience store or the like, and is connected to the center via a network. In other words, the kiosk terminal is located as an online terminal (client terminal) of the center. The kiosk terminal includes a touch panel that receives requests according to user operations and displays the received requests, a radio unit that performs short-range radio communication with mobile telephone, and a network communication unit that transmits received requests to the center.

The kiosk terminal receives a license ticket request (license order) input according to a user operating the touch panel, and transmits the received license order to the center via the network. In addition, the kiosk terminal receives electronic money information of an amount corresponding to the license order from the user's mobile telephone according to short-range radio communication.

On receiving the license order, the center reads an internally-managed license ticket, and transmits the read license ticket to the user's mobile telephone via the network. The mobile telephone receives the license ticket transmitted by the center.

Note that the method used for the mobile telephone to receive the license ticket may instead be one by which on receiving the license order the center reads an internally-managed license ticket, and transmits the read license ticket to the kiosk terminal via the network. On receiving the license ticket from the center, the kiosk terminal may transmit the received license ticket to the mobile telephone using short-range radio communication, and the mobile telephone may receive the license ticket from the kiosk terminal.

A structure in which a plurality of kiosk terminals are located in respective convenience stores or shops and perform network communication with one center is of course included in the present invention.

(11) The TRM in the mobile telephones in the described second and third embodiments may be structured as an integrated memory card and TRM. In such a case, it is not imperative for processing for depositing electronic money information to be performed using short-range radio communication. An example of a possible structure is one in which the memory card is detachable from the mobile telephone, and the memory card that has been removed from the mobile telephone is inserted in an electronic money deposit apparatus and electronic money information is deposited in the TRM.

(12) The second and third embodiments have a structure in which the processing for depositing electronic money information in the TRM is performed offline by the mobile telephone and the electronic money deposit apparatus. However, the processing for depositing electronic money information in the TRM is not limited to being performed offline such as that described, but may be performed online. A system in which depositing is performed online as one such as the following.

A specific application is activated in the mobile telephone, and an electronic money deposit screen in displayed on the display unit. The user operates the operation unit while viewing the screen, and inputs a his/her password, a deposit amount, and so on. The input information is transmitted to an electronic money information deposit center or the like using the network connection function of the mobile telephone. The deposit center performs deposit processing based on the information transmitted by the mobile telephone, and transmits deposit completion notification to the mobile telephone. On receiving the deposit completion information, the mobile telephone deposits electronic money information in the TRM.

In the present invention, the mobile telephone charge management sever may be an electronic money information deposit center. The mobile telephone pays the content charge relating to a received license ticket using the electronic money information deposited in the TRM according to online depositing. The mobile telephone charge management server may be structured to bill for the mobile telephone usage charges such as call charges and the amount deposited by online depositing.

(13) Furthermore, in the second and third embodiments, there is no limitation on the order in which (a) the processing for the mobile telephone to pay the content charge relating to the license ticket with the electronic money information and (b) the processing for the mobile telephone to receive the license ticket from the license ticket distribution server are performed.

(14) The present invention is not limited to the structure described in the embodiments in which the content keys and the content are in one-to-one correspondence, and the content keys and the content may be in one-to-many correspondence. In such a case, the license ticket may include key information for encrypting the content key.

(15) The content key included in the license ticket transmitted by the license ticket distribution server may be an encrypted content key. The home server may be structured so as to receive the license ticket via the mobile telephone, read the encrypted content key from the received license ticket, decrypt the content key, and decrypt the content using the decrypted content key. Note that the encryption algorithm use here is not restricted to any particular encryption algorithm.

(16) In the present invention, the encryption algorithm used to encrypt the content is not limited to a secret key encryption method, and may be a public key encryption method.

(17) The present invention may be structured such that the TRM of the mobile telephone incorporates a debit card function. In such a case, the license ticket docket is transmitted directly to a bank terminal, not via the communications enterprise.

(18) Although the mobile telephone charge management server 3000 and the registration server 3100 are realized as respectively independent apparatuses in the fourth embodiment, the mobile telephone charge management server 3000 and the registration server 3100 may be realized as one apparatus. Furthermore, although the mobile telephone charge management server 3000 and the registration server 3100 are connected via a LAN in the fourth embodiment, this structure is not essential in the present invention, and a structure with which the mobile telephone charge management server 3000 and the registration server 3100 communicate via the network 6000 is included in the present invention.

(19) Although the mobile telephone charge management server 3000 has a structure with which the goods provider's apparatus identifier or manufacturing number is used to judge whether or not proxy settlement is permitted, the present invention is not limited to a structure that uses an apparatus identifier or manufacturing number. A structure that uses the network address of the apparatus is possible.

(20) The following is a case of processing that is an example of a modification of the fourth embodiment is included in the present invention.

When receiving the license ticket from the mobile telephone, the home server receives identification information of the mobile telephone in correspondence with the mobile telephone. The home server stores the received identification information and license ticket in correspondence.

Next, when using the license ticket, the home server requests communication with the mobile telephone, and receives identification information from the mobile telephone. In other words, the home server receives identification information of the mobile telephone that is the mobile telephone possessed by the user who is attempting to use the license ticket and view the content.

The home server judges whether the received identification information matches the identification information stored in correspondence with the license ticket, and controls such that usage of the license ticket is permitted if the identification information matches, and usage of the license ticket is prohibited if the identification information does not match.

This structure has an effect of preventing an unauthorized user who has not purchased a license ticket from using the license ticket and viewing the content.

(21) In the fourth embodiment, the mobile telephone is structured such that it is permitted only to transmit the license ticket to a home server that is pre-registered in the mobile telephone, in order to prevent transmission of the license ticket to an unauthorized home server. However, in the present invention, the method used to prevent transmission of the license ticket to an unauthorized home server is not limited to the stated method. A structure such as the following may be used.

The mobile telephone generates a ticket request that includes the identification information of the home server pre-registered in the mobile telephone, and transmits the generated ticket request to the license ticket distribution server. The license ticket distribution server incorporates the identification information of the home server into the license ticket corresponding to the ticket request information, and transmits the license ticket to the home server.

The home server refuses reception of a license ticket for which a ticket transmission request has been received from the mobile telephone if the identification information of that home server is not included in the ticket transmission request.

This structure prevents unauthorized acts such as the mobile telephone transmitting the license ticket via another mobile telephone to a home server that is not permitted to receive the license ticket.

(22) In the fourth embodiment, notification that proxy settlement is not possible is performed if proxy settlement is judged to not be possible, after the mobile telephone receives the license ticket docket from the mobile telephone charge management server 3000. However, the procedure for notification that proxy settlement is not possible is not limited to this procedure.

An example of a possible structure is one in which the mobile telephone receives one more enterprise identifiers of enterprises with which proxy settlement is not possible from the mobile telephone charge management server 3000 before receiving the license ticket docket. In this case, when a license ticket is received from the license ticket distribution server 2000, if the enterprise identifier received together with a license ticket matches any of the enterprise identifiers of the enterprises with which proxy settlement is not possible, the mobile telephone performs settlement using electronic money, and if the enterprise identifier does not match, the mobile telephone transmits a license ticket docket to the mobile telephone charge management server 3000.

(23) In the described embodiments, the concept of "electronic money information" is not limited to a monetary value. Electronic money information may be any information that can used as compensation to purchase the goods, examples of this information being electronic vouchers, discount coupons, and incentive points.

(24) In the embodiment, the apparatus that uses the content is not limited to being a playback apparatus that plays content. The apparatus may be, for instance, a recording apparatus that records content received from the content distribution server to another apparatus or another recording medium, or may be a game machine or the like.

(25) The present invention includes a case of a structure with which, in the fourth embodiment, when a device ID is registered to the valid device information area of the storage area of any of the mobile telephones or any of the home servers, the legitimacy of the operator is authenticated according to password input or the like.

Furthermore, a structure in which, in the fourth embodiment, a device ID registered in the valid device information area is deleted and a new device ID is registered is included in the present invention. Furthermore, a structure in which the legitimacy of the operator is authenticated according to password input or the like when deleting a registered device ID or newly registering a device ID is included in the present invention.

(26) The present invention may be methods shown by the above. Furthermore, the methods may be a computer program realized by a computer, and may be a digital signal of the computer program.

Furthermore, the present invention may be a computer-readable recording medium such as a flexible disk, a hard disk, a CD-ROM, an MO, a DVD, a DVD-ROM, a DVD-RAM, a BD (Blu-ray Disc) or a semiconductor memory, that stores the computer program or the digital signal. Furthermore, the present invention may be the computer program or the digital signal recorded in any of the aforementioned recording media.

Furthermore, the present invention may be the computer program or the digital signal transmitted on a electric communication network, a wireless or wired communication network, or a network of which the Internet is representative.

Furthermore, the present invention may be a computer system that includes a microprocessor and a memory, the memory storing the computer program, and the microprocessor operating according to the computer program.

Furthermore, by transferring the program or the digital signal to the recording medium, or by transferring the program or the digital signal via a network or the like, the program or the digital signal may be executed by another independent computer system.

(27) The present invention may be any combination of the above-described embodiment and modifications.

INDUSTRIAL APPLICABILITY

The present invention can be used in an industry that distributes content to users, as a system for easily performing settlement relating to content between users and content distributors.

The invention claimed is:

1. A content usage system, comprising:
an information terminal;
a content usage apparatus;
a settlement apparatus; and
a server apparatus configured to transmit content usage information to the information terminal, the content usage information relating to usage of content;
the information terminal comprising:
 a processor;
 a reception unit configured to receive, from the server apparatus, (i) the content usage information including a usage right for the content and charge information showing a usage amount of the content, and (ii) an identifier that identifies a provider of the content;
 a generation unit configured to generate, using the processor, settlement request information including the charge information and the identifier;
 a transmission unit configured to transmit the generated settlement request information to a settlement apparatus of a communications enterprise that provides communication service to the information terminal;
 a storage unit configured to store identification information that identifies an apparatus permitted to receive the content usage information from the information terminal;
 a judgment unit configured to judge, using the processor, whether or not to transfer the content usage information to a content usage apparatus that is the request-source and to use the content by comparing the identification information stored in the storage unit with identification information that identifies the content usage apparatus; and
 a transfer unit configured to transfer the content usage information to the content usage apparatus in a case in which a result of the judgment by the judgment unit is affirmative;
the content usage apparatus comprising:
 a content obtaining unit configured to obtain the content;
 a content usage information reception unit configured to receive the content usage information from the information terminal; and
 a content usage unit configured to use the content in accordance with the usage information; and
the settlement apparatus comprising:
 a settlement apparatus processor;
 a reception unit configured to receive the settlement request information from the information terminal;
 a proxy settlement unit configured to perform, using the settlement apparatus processor, proxy settlement for the content usage information for a content distribution server that distributes the content, in a case in which proxy settlement relating to the received settlement request information is permitted; and
 a settlement unit configured to perform, using the settlement apparatus processor, settlement for both the communication service and the content usage information for the information terminal in a case in which the proxy settlement is performed.

2. An information terminal for use with a content usage apparatus, and which transfers content usage information relating to usage of content, comprising:
a processor;
a reception unit configured to receive, from an external server apparatus, (i) the content usage information including a usage right for the content and charge information showing a usage amount of the content, and (ii) an identifier that identifies a provider of the content;

a generation unit configured to generate, using the processor, settlement request information including the charge information and the identifier;

a transmission unit configured to transmit the generated settlement request information to a settlement apparatus of a communications enterprise that provides communication service to the information terminal;

a storage unit configured to store identification information that identifies an apparatus permitted to receive the content usage information from the information terminal;

a judgment unit configured to judge, using the processor, whether or not to transfer the content usage information to a content usage apparatus that is the request-source and to use the content by comparing the identification information stored in the storage unit with identification information that identifies the content usage apparatus; and a transfer unit to transfer the content usage information to the content usage apparatus in a case in which a result of the judgment by the judgment unit is affirmative.

3. The information terminal of claim 2, further comprising:
an electronic money storage unit that is tamper-resistant, which is a state of being unable to be read or tampered with from outside, and that is configured to store electronic money information therein;

a not-possible notification reception unit configured to receive proxy settlement not-possible information from the settlement apparatus indicating that the settlement apparatus has judged that proxy settlement is not possible; and an electronic money settlement unit configured to perform, using the processor, settlement for the content usage information with use of the electronic money information stored in the storage unit in a case in which the not-possible notification reception unit receives the proxy settlement not-possible information.

4. The information terminal of claim 2, further comprising:
a permission reception unit configured to receive, from the content usage apparatus, a signal indicating that transmission of the content usage information is permitted, wherein
the transfer unit transfers the content usage information to the content usage apparatus in a case in which the result of the judgment by the judgment unit is affirmative and the permission reception unit has received the signal.

5. The information terminal of claim 4, further comprising:
an electronic money storage unit that is tamper-resistant, which is a state of being unable to be read or tampered with from outside, and that is configured to store electronic money information therein, a not-possible notification reception unit configured to receive proxy settlement not-possible information from the settlement apparatus indicating that the settlement apparatus has judged that proxy settlement is not possible; and an electronic money settlement unit configured to perform, using the processor, settlement of the content usage information with use of the electronic money information stored in the electronic money storage unit, in place of the processing by the transmission unit, in a case in which the not-possible notification reception unit receives the proxy settlement not-possible information.

6. The information terminal of claim 2, wherein
the content usage information includes identification information of an apparatus to which transmission of the content usage information is permitted, and
the transfer unit further comprises:
an identification information reception sub-unit configured to receive, from the content usage apparatus, usage apparatus identification information that identifies the content usage apparatus;
a judgment sub-unit configured to judge, using the processor, whether or not the received usage apparatus identification information matches the identification information included in the usage information; and
an output sub-unit configured to output the content usage information to the content usage apparatus in a case in which a result of the judgment by the judgment sub-unit is affirmative.

7. A control method for controlling an information terminal that transfers content usage information relating to usage of content, wherein
the information terminal comprises:
a processor; and
a storage unit configured to store identification information that identifies an apparatus permitted to receive the content usage information,
the control method comprising:
a reception step of receiving, from an external server apparatus, (i) the content usage information including a usage right for the content and charge information showing a usage amount of the content, and (ii) an identifier that identifies a provider of the content;
a generation step of generating, using the processor, settlement request information including the charge information and the identifier;
a transmission step of transmitting the generated settlement request information to a settlement apparatus of a communications enterprise that provides communication service to the information terminal;
a judgment step of judging, using the processor, whether or not to transfer the content usage information to a content usage apparatus that is the request-source and to use the content by comparing the identification information stored in the storage unit with identification information that identifies the content usage apparatus; and
a transfer step of transferring the content usage information to the content usage apparatus in a case in which a result of the judgment in the judgment step is affirmative.

8. A non-transitory computer-readable recording medium on which is recorded a computer program to be used in an information terminal that transfers content usage information relating to usage of content, wherein
the information terminal comprises:
a processor; and
a storage unit configured to store identification information that identifies an apparatus permitted to receive the content usage information,
the computer program causing the information terminal to perform a method comprising:
a reception step of receiving, from an eternal server apparatus, (i) the content usage information including a usage right for the content and charge information showing a usage amount of the content, and (ii) an identifier that identifies a provider of the content;

a generation step of generating, using the processor, settlement request information including the charge information and the identifier;

a transmission step of transmitting the generated settlement request information to a settlement apparatus of a communications enterprise that provides communication service to the information terminal;

a judgment step of judging, using the processor, whether or not to transfer the content usage information to a content usage apparatus that is the request-source and to use the content by comparing the identification information stored in the storage unit with identification information that identifies the content usage apparatus; and a transfer step of transferring the content usage information to the content usage apparatus in a case in which a result of the judgment in the judgment step is affirmative.

9. The content usage system of claim 1, further comprising:
a registration server that stores at least one identification information piece that identifies a content distribution server with which the proxy settlement is possible, and is configured to judge whether or not the proxy settlement is possible upon receiving a request from the settlement apparatus and to transmit a result of the judgment to the settlement apparatus, wherein the transmission unit in the information terminal is configured to transmit identification information identifying the content distribution server that distributes the content by including the identification information in the settlement request information, and the proxy settlement unit in the settlement apparatus is configured to transmit the identification information included in the settlement request information to the registration server and to request the registration server to judge whether or not the proxy settlement relating to the settlement request information is possible.

10. The content usage system of claim 1, wherein
the reception unit in the information terminal is configured to receive the content usage information including permission identification information that identifies a content usage apparatus capable of using the content usage information, the transfer unit in the information terminal is configured to output a content usage information transmission request including the permission identification information included in the content usage information received by the reception unit, and to transmit the content usage information to the content usage apparatus in reply to the content usage information transmission request only in a case in which permission for reception is notified by the content usage apparatus, and the content usage information reception unit in the content usage apparatus is configured to check, upon receiving the content usage information transmission request from the information terminal, whether (i) the permission identification information included in the received content usage information transmission request matches (ii) identification information that identifies the content usage apparatus, and to notify the information terminal of the permission for reception only in a case in which (i) and (ii) match.

11. The content usage system of claim 1, wherein
the content usage information reception unit in the content usage apparatus is configured to receive an identifier of the information terminal along with the content usage information, and to store the received content usage information in a storage area in correspondence with the identifier, and the content usage unit in the content usage apparatus is configured to receive the identifier again from the information terminal when using the content, judge whether or not (i) the identifier stored in the storage area matches (ii) the received identifier, and to use the content only in a case in which (i) and (ii) match.

12. The content usage system of claim 1, wherein
the content usage apparatus further comprises:
a first valid device information storage unit configured to pre-store identification information that identifies an information terminal from which the content usage apparatus is capable of receiving the usage information, the information terminal further comprises
a second valid device information storage unit configured to pre-store identification information that identifies a content usage apparatus to which the information terminal is capable of transmitting the usage information, the transfer unit in the information terminal is configured to output a content usage information transmission request including identification information of the information terminal to the usage apparatus, the content usage information reception unit in the content usage apparatus is configured to judge, upon receiving the content usage information transmission request from the information terminal, whether or not the identification information included in the content usage information transmission request is stored in the first valid device information storage, and to transmit a content usage information reception request including identification information of the content usage apparatus to the information terminal only in a case in which the identification information included in the content usage information transmission request is stored in the first valid device information storage, the transfer unit in the information terminal is configured to judge, upon receiving the content usage information transmission request from the content usage apparatus, whether or not the identification information included in the content usage information reception request is stored in the second valid device information storage unit, and to transmit the content usage information to the content usage apparatus only in a case in which the identification information included in the content usage information reception request is stored in the second valid device information storage unit.

13. The information terminal of claim 1, wherein
the reception unit further receives, from the settlement apparatus, an identifier that identifies a provider of the content not permitted to perform the proxy settlement, and stores the received identifier in the storage unit, the information terminal further comprises an identifier judgment unit configured to judge, using the processor, whether or not the identifier received from the server apparatus matches the identifier stored in the storage unit, and the transmission unit transmits the generated settlement request information to the settlement apparatus in a case in which a result of the judgment by the identifier judgment unit is negative.

* * * * *